(12) United States Patent
Broda

(10) Patent No.: US 7,899,879 B2
(45) Date of Patent: Mar. 1, 2011

(54) METHOD AND APPARATUS FOR A REPORT CACHE IN A NEAR REAL-TIME BUSINESS INTELLIGENCE SYSTEM

(75) Inventor: Tal Broda, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1096 days.

(21) Appl. No.: 10/391,544

(22) Filed: Mar. 17, 2003

(65) Prior Publication Data
US 2008/0046536 A1 Feb. 21, 2008

Related U.S. Application Data

(63) Continuation-in-part of application No. 10/237,559, filed on Sep. 6, 2002.

(60) Provisional application No. 60/410,989, filed on Sep. 16, 2002.

(51) Int. Cl.
G06F 15/16 (2006.01)
G06F 13/00 (2006.01)
G06F 12/08 (2006.01)
H04L 12/18 (2006.01)

(52) U.S. Cl. ............. 709/217; 711/137; 711/3; 711/118; 707/1; 707/2; 707/4

(58) Field of Classification Search .................. 709/217; 711/137, 3, 118; 707/1, 2, 4
See application file for complete search history.

(56) References Cited

U.S. PATENT DOCUMENTS

| 5,010,478 A | 4/1991 | Deran |
| 5,033,009 A | 7/1991 | Dubnoff |
| 5,283,894 A | 2/1994 | Deran |
| 5,510,980 A | 4/1996 | Peters |
| 5,553,215 A | 9/1996 | Kaethler |
| 5,592,608 A | 1/1997 | Weber et al. |

(Continued)

FOREIGN PATENT DOCUMENTS
WO    WO 01/63466 A2    8/2001

OTHER PUBLICATIONS

"Report of Novelty Search", Patentec, dated Apr. 3, 2004.

(Continued)

*Primary Examiner* — Philip C Lee
(74) *Attorney, Agent, or Firm* — Kilpatrick Townsend & Stockton LLP

(57) ABSTRACT

A method of optimizing the delivery of a set of data elements from a first device to a second device. The method includes retrieving from a data source the set of data elements, including a first subset of the set of data elements, a second subset of the set of data elements, and a third subset of the set of data elements. The method also includes transferring the first subset of the set of data elements to the second device. The method further includes selecting a forth subset of the set of data elements, wherein the forth subset can be comprised of data elements from the first subset and the second subset; or wherein the forth subset can be comprised of data elements from the second subset and the third subset. The method also includes transferring a forth subset of the set of data elements to the second device.

19 Claims, 45 Drawing Sheets

U.S. PATENT DOCUMENTS

| | | | |
|---|---|---|---|
| 5,615,362 A | 3/1997 | Jensen et al. |
| 5,654,726 A | 8/1997 | Mima et al. |
| 5,717,895 A | 2/1998 | Leedom et al. |
| 5,721,847 A | 2/1998 | Johnson |
| 5,754,774 A | 5/1998 | Bittinger et al. |
| 5,758,337 A | 5/1998 | Hammond |
| 5,765,164 A | 6/1998 | Prasad et al. |
| 5,778,372 A | 7/1998 | Cordell et al. |
| 5,781,911 A | 7/1998 | Young et al. |
| 5,784,275 A | 7/1998 | Sojoodi et al. |
| 5,787,409 A | 7/1998 | Seiffert et al. |
| 5,809,267 A | 9/1998 | Moran et al. |
| 5,812,840 A | 9/1998 | Shwartz |
| 5,831,609 A | 11/1998 | London et al. |
| 5,831,615 A | 11/1998 | Drews et al. |
| 5,857,201 A | 1/1999 | Wright, Jr. et al. |
| 5,862,325 A | 1/1999 | Reed et al. |
| 5,864,669 A | 1/1999 | Osterman et al. |
| 5,890,174 A | 3/1999 | Khanna et al. |
| 5,893,126 A | 4/1999 | Drews et al. |
| 5,893,150 A * | 4/1999 | Hagersten et al. ............ 711/139 |
| 5,898,434 A | 4/1999 | Small et al. |
| 5,918,009 A | 6/1999 | Gehani et al. |
| 5,922,044 A | 7/1999 | Banthia |
| 5,926,177 A | 7/1999 | Hatanaka et al. |
| 5,928,327 A | 7/1999 | Wang et al. |
| 5,930,794 A | 7/1999 | Linenbach et al. |
| 5,943,620 A | 8/1999 | Boltz et al. |
| 5,974,236 A | 10/1999 | Sherman |
| 6,023,694 A | 2/2000 | Kouchi et al. |
| 6,025,844 A | 2/2000 | Parsons |
| 6,035,324 A | 3/2000 | Chang et al. |
| 6,038,558 A | 3/2000 | Powers et al. |
| 6,055,548 A | 4/2000 | Comer et al. |
| 6,070,197 A | 5/2000 | Cobb et al. |
| 6,073,242 A | 6/2000 | Hardy et al. |
| 6,075,530 A | 6/2000 | Lucas et al. |
| 6,088,481 A | 7/2000 | Okamoto et al. |
| 6,092,102 A | 7/2000 | Wagner |
| 6,094,681 A | 7/2000 | Shaffer et al. |
| 6,112,236 A | 8/2000 | Dollin et al. |
| 6,141,659 A | 10/2000 | Barker et al. |
| 6,170,019 B1 | 1/2001 | Dresel et al. |
| 6,175,859 B1 | 1/2001 | Mohler |
| 6,182,116 B1 | 1/2001 | Namma et al. |
| 6,189,069 B1 | 2/2001 | Parkes et al. |
| 6,201,539 B1 | 3/2001 | Miller et al. |
| 6,204,846 B1 * | 3/2001 | Little et al. .................... 715/784 |
| 6,205,474 B1 | 3/2001 | Hurley |
| 6,208,990 B1 | 3/2001 | Suresh et al. |
| 6,233,578 B1 | 5/2001 | Machihara et al. |
| 6,239,797 B1 | 5/2001 | Hills et al. |
| 6,240,444 B1 | 5/2001 | Fin et al. |
| 6,243,698 B1 | 6/2001 | Powers et al. |
| 6,243,713 B1 | 6/2001 | Nelson et al. |
| 6,256,649 B1 | 7/2001 | Mackinlay et al. |
| 6,256,676 B1 | 7/2001 | Taylor et al. |
| 6,260,114 B1 | 7/2001 | Schug |
| 6,269,393 B1 | 7/2001 | Yost et al. |
| 6,292,803 B1 | 9/2001 | Richardson et al. |
| 6,301,601 B1 | 10/2001 | Helland et al. |
| 6,304,546 B1 | 10/2001 | Natarajan et al. |
| 6,314,463 B1 | 11/2001 | Abbott et al. |
| 6,317,737 B1 | 11/2001 | Gorelik et al. |
| 6,336,135 B1 | 1/2002 | Niblett et al. |
| 6,341,312 B1 | 1/2002 | French et al. |
| 6,348,933 B1 | 2/2002 | Walls et al. |
| 6,363,363 B1 | 3/2002 | Haller et al. |
| 6,393,421 B1 | 5/2002 | Paglin |
| 6,397,217 B1 * | 5/2002 | Melbin ........................... 707/10 |
| 6,430,576 B1 | 8/2002 | Gates et al. |
| 6,430,604 B1 | 8/2002 | Ogle et al. |
| 6,449,344 B1 | 9/2002 | Goldfinger et al. |
| 6,467,052 B1 | 10/2002 | Kaler et al. |
| 6,480,847 B1 | 11/2002 | Linenbach et al. |
| 6,501,956 B1 | 12/2002 | Weeren et al. |
| 6,513,047 B1 | 1/2003 | Talley |
| 6,519,568 B1 | 2/2003 | Harvey et al. |
| 6,519,601 B1 | 2/2003 | Bosch |
| 6,523,046 B2 | 2/2003 | Liu et al. |
| 6,532,465 B2 | 3/2003 | Hartley et al. |
| 6,535,227 B1 | 3/2003 | Fox et al. |
| 6,542,165 B1 | 4/2003 | Ohkado |
| 6,567,796 B1 | 5/2003 | Yost et al. |
| 6,567,814 B1 | 5/2003 | Bankier et al. |
| 6,574,618 B2 | 6/2003 | Eylon et al. |
| 6,574,639 B2 | 6/2003 | Carey et al. |
| 6,591,277 B2 | 7/2003 | Spence et al. |
| 6,591,278 B1 | 7/2003 | Ernst |
| 6,598,167 B2 | 7/2003 | Devine et al. |
| 6,606,596 B1 | 8/2003 | Zirngibl et al. |
| 6,640,234 B1 | 10/2003 | Coffen et al. |
| 6,647,272 B1 | 11/2003 | Asikainen |
| 6,651,055 B1 | 11/2003 | Kilmer et al. |
| 6,651,142 B1 | 11/2003 | Gorelik et al. |
| 6,654,790 B2 | 11/2003 | Ogle et al. |
| 6,664,978 B1 | 12/2003 | Kekic et al. |
| 6,668,173 B2 | 12/2003 | Greene |
| 6,678,719 B1 | 1/2004 | Stimmel |
| 6,687,360 B2 | 2/2004 | Kung et al. |
| 6,701,485 B1 | 3/2004 | Igra et al. |
| 6,714,982 B1 | 3/2004 | McDonough et al. |
| 6,731,314 B1 | 5/2004 | Cheng et al. |
| 6,745,193 B1 | 6/2004 | Horvitz et al. |
| 6,766,418 B1 | 7/2004 | Alexander et al. |
| 6,775,267 B1 | 8/2004 | Kung et al. |
| 6,775,298 B1 | 8/2004 | Aggarwal |
| 6,782,424 B2 | 8/2004 | Yodaiken |
| 6,789,083 B2 * | 9/2004 | Thelen .......................... 707/101 |
| 6,792,456 B1 | 9/2004 | Hellerstein et al. |
| 6,807,562 B1 | 10/2004 | Pennock et al. |
| 6,807,583 B2 | 10/2004 | Hrischuk et al. |
| 6,832,341 B1 | 12/2004 | Vijayan |
| 6,839,737 B1 | 1/2005 | Friskel |
| 6,870,830 B1 | 3/2005 | Schuster et al. |
| 6,898,625 B2 | 5/2005 | Henry et al. |
| 6,901,592 B2 | 5/2005 | Mar et al. |
| 6,907,422 B1 * | 6/2005 | Predovic ........................ 707/2 |
| 6,915,457 B1 | 7/2005 | Miller |
| 6,920,607 B1 * | 7/2005 | Ali et al. .................... 715/501.1 |
| 6,937,713 B1 | 8/2005 | Kung et al. |
| 6,938,221 B2 | 8/2005 | Nguyen |
| 6,941,345 B1 | 9/2005 | Kapil et al. |
| 6,941,351 B2 | 9/2005 | Vetrivelkumaran et al. |
| 6,954,757 B2 | 10/2005 | Zargham et al. |
| 6,954,902 B2 | 10/2005 | Noma et al. |
| 6,996,768 B1 | 2/2006 | Elo et al. |
| 7,003,568 B1 | 2/2006 | Chikada et al. |
| 7,003,731 B1 | 2/2006 | Rhoads et al. |
| 7,024,474 B2 | 4/2006 | Clubb et al. |
| 7,028,092 B2 | 4/2006 | MeLampy et al. |
| 7,031,314 B2 * | 4/2006 | Craig et al. .................. 370/392 |
| 7,032,006 B2 * | 4/2006 | Zhuk ............................ 709/206 |
| 7,035,923 B1 | 4/2006 | Yoakum et al. |
| 7,058,953 B2 | 6/2006 | Willard et al. |
| 7,096,432 B2 | 8/2006 | Huapaya et al. |
| 7,113,964 B1 | 9/2006 | Bequet et al. |
| 7,120,139 B1 | 10/2006 | Kung et al. |
| 7,139,797 B1 | 11/2006 | Yoakum et al. |
| 7,171,473 B1 | 1/2007 | Eftis et al. |
| 7,174,339 B1 | 2/2007 | Wucherer et al. |
| 7,177,909 B2 | 2/2007 | Stark et al. |
| 7,197,565 B2 | 3/2007 | Abdelaziz et al. |

| | | | | | | |
|---|---|---|---|---|---|---|
| 7,221,658 B1 | 5/2007 | Armstrong et al. | | 2002/0178353 A1 | 11/2002 | Graham |
| 7,222,294 B2 | 5/2007 | Coffen et al. | | 2002/0184187 A1 | 12/2002 | Bakalash et al. |
| 7,233,979 B2 | 6/2007 | Dickerman et al. | | 2002/0194393 A1 | 12/2002 | Hrischuk et al. |
| 7,243,124 B1 | 7/2007 | Gardner et al. | | 2002/0198985 A1 | 12/2002 | Fraenkel et al. |
| 7,243,127 B2 | 7/2007 | Tabayoyon, Jr. et al. | | 2003/0004742 A1 | 1/2003 | Palmer et al. |
| 7,243,130 B2 | 7/2007 | Horvitz et al. | | 2003/0023691 A1 | 1/2003 | Knauerhase |
| 7,269,627 B2 | 9/2007 | Knauerhase | | 2003/0028597 A1 | 2/2003 | Salmi et al. |
| 7,272,660 B1 | 9/2007 | Powers et al. | | 2003/0028682 A1 | 2/2003 | Sutherland |
| 7,275,215 B2 | 9/2007 | Werndorfer et al. | | 2003/0028683 A1 | 2/2003 | Yorke et al. |
| 7,283,805 B2 | 10/2007 | Agrawal | | 2003/0037103 A1 | 2/2003 | Salmi et al. |
| 7,284,034 B2 | 10/2007 | Matsa et al. | | 2003/0037113 A1 | 2/2003 | Petrovykh |
| 7,296,217 B1 | 11/2007 | Earnshaw et al. | | 2003/0071850 A1 | 4/2003 | Geidl |
| 7,299,257 B2 | 11/2007 | Boyer et al. | | 2003/0074393 A1 | 4/2003 | Peart |
| 7,310,532 B2 | 12/2007 | Knauerhase et al. | | 2003/0088633 A1 | 5/2003 | Chiu et al. |
| 7,313,593 B1 | 12/2007 | Pulito et al. | | 2003/0093585 A1 | 5/2003 | Allan |
| 7,313,617 B2 | 12/2007 | Malik et al. | | 2003/0101201 A1 | 5/2003 | Saylor et al. |
| 7,353,455 B2 | 4/2008 | Malik | | 2003/0101223 A1 | 5/2003 | Pace et al. |
| 7,359,938 B1 | 4/2008 | Davies et al. | | 2003/0105837 A1 | 6/2003 | Kamen et al. |
| 7,373,428 B1 | 5/2008 | Armstrong et al. | | 2003/0112948 A1 | 6/2003 | Brown et al. |
| 7,379,963 B1 | 5/2008 | Khare et al. | | 2003/0115186 A1 | 6/2003 | Wilkinson et al. |
| 7,386,588 B2 | 6/2008 | Mousseau et al. | | 2003/0120805 A1 | 6/2003 | Couts et al. |
| 7,389,351 B2 | 6/2008 | Horvitz | | 2003/0126136 A1 | 7/2003 | Omoigui |
| 7,392,478 B2 | 6/2008 | Aureglia et al. | | 2003/0154177 A1 | 8/2003 | Holland et al. |
| 7,401,158 B2 | 7/2008 | Beauchamp et al. | | 2003/0158873 A1 | 8/2003 | Sawdon et al. |
| 7,406,569 B2 * | 7/2008 | van de Waerdt ............... 711/137 | | 2003/0182428 A1 | 9/2003 | Li et al. |
| 7,412,481 B2 | 8/2008 | Nicholls et al. | | 2003/0182461 A1 | 9/2003 | Stelting et al. |
| 7,412,486 B1 | 8/2008 | Petrack et al. | | 2003/0187971 A1 | 10/2003 | Uliano et al. |
| 7,412,518 B1 | 8/2008 | Duigou et al. | | 2003/0204741 A1 | 10/2003 | Schoen et al. |
| 7,412,645 B2 | 8/2008 | Kotler et al. | | 2003/0208543 A1 | 11/2003 | Enete et al. |
| 7,415,502 B2 | 8/2008 | Vishik et al. | | 2003/0217081 A1 | 11/2003 | White et al. |
| 7,426,059 B2 | 9/2008 | Broda et al. | | 2003/0217142 A1 | 11/2003 | Bobde et al. |
| 7,433,922 B2 | 10/2008 | Engstrom | | 2003/0220860 A1 | 11/2003 | Heytens et al. |
| 7,436,947 B2 | 10/2008 | Ordille et al. | | 2003/0229722 A1 | 12/2003 | Beyda |
| 7,454,423 B2 | 11/2008 | Powers et al. | | 2003/0235279 A1 | 12/2003 | Richomme |
| 7,487,437 B2 | 2/2009 | Aureglia et al. | | 2004/0002958 A1 | 1/2004 | Seshadri et al. |
| 7,552,204 B2 | 6/2009 | Bobde et al. | | 2004/0003090 A1 | 1/2004 | Deeds |
| 7,627,666 B1 | 12/2009 | DeGiulio et al. | | 2004/0010543 A1 | 1/2004 | Grobman |
| 7,631,047 B1 | 12/2009 | Adamczyk | | 2004/0019695 A1 | 1/2004 | Fellenstein et al. |
| 7,664,817 B2 | 2/2010 | Watanabe et al. | | 2004/0024822 A1 | 2/2004 | Werndorfer et al. |
| 7,668,917 B2 | 2/2010 | Netsch et al. | | 2004/0030762 A1 | 2/2004 | Silverthorne et al. |
| 2001/0034733 A1 | 10/2001 | Prompt et al. | | 2004/0039776 A1 | 2/2004 | Ballard |
| 2001/0039616 A1 | 11/2001 | Kumagai et al. | | 2004/0039800 A1 | 2/2004 | Black et al. |
| 2001/0040945 A1 | 11/2001 | Fujino et al. | | 2004/0049477 A1 | 3/2004 | Powers et al. |
| 2001/0049683 A1 | 12/2001 | Yoshikawa | | 2004/0054802 A1 | 3/2004 | Beauchamp et al. |
| 2001/0049721 A1 | 12/2001 | Blair et al. | | 2004/0060001 A1 | 3/2004 | Coffen et al. |
| 2002/0013853 A1 | 1/2002 | Baber et al. | | 2004/0073596 A1 | 4/2004 | Kloninger et al. |
| 2002/0032602 A1 | 3/2002 | Lanzillo et al. | | 2004/0087300 A1 | 5/2004 | Lewis |
| 2002/0038217 A1 | 3/2002 | Young | | 2004/0146044 A1 | 7/2004 | Herkerdorf et al. |
| 2002/0056000 A1 | 5/2002 | Coussement | | 2004/0152477 A1 | 8/2004 | Wu et al. |
| 2002/0057678 A1 | 5/2002 | Jiang et al. | | 2004/0254998 A1 | 12/2004 | Horvitz |
| 2002/0059425 A1 | 5/2002 | Belfiore et al. | | 2005/0004984 A1 | 1/2005 | Simpson |
| 2002/0059472 A1 | 5/2002 | Wollrath et al. | | 2005/0055329 A1 | 3/2005 | Bakalash et al. |
| 2002/0065894 A1 | 5/2002 | Dalal et al. | | 2005/0086211 A1 | 4/2005 | Mayer |
| 2002/0075303 A1 | 6/2002 | Thompson et al. | | 2005/0102294 A1 | 5/2005 | Coldewey |
| 2002/0078208 A1 | 6/2002 | Crump et al. | | 2005/0102611 A1 | 5/2005 | Chen |
| 2002/0083067 A1 | 6/2002 | Tamayo et al. | | 2005/0125377 A1 | 6/2005 | Kotler et al. |
| 2002/0083072 A1 | 6/2002 | Steuart | | 2005/0144114 A1 | 6/2005 | Ruggieri et al. |
| 2002/0083118 A1 | 6/2002 | Sim | | 2005/0187982 A1 | 8/2005 | Sato |
| 2002/0095465 A1 | 7/2002 | Banks et al. | | 2006/0089939 A1 | 4/2006 | Broda et al. |
| 2002/0103909 A1 | 8/2002 | Devine et al. | | 2006/0161540 A1 * | 7/2006 | Schmitz et al. .................... 707/4 |
| 2002/0107864 A1 | 8/2002 | Battas et al. | | 2006/0206589 A1 | 9/2006 | Lentini et al. |
| 2002/0107905 A1 | 8/2002 | Roe et al. | | 2008/0043256 A1 | 2/2008 | Broda et al. |
| 2002/0107957 A1 | 8/2002 | Zargham et al. | | 2008/0046505 A1 | 2/2008 | Netsch et al. |
| 2002/0116362 A1 | 8/2002 | Li et al. | | 2008/0046506 A1 | 2/2008 | Broda |
| 2002/0116461 A1 | 8/2002 | Diacakis et al. | | 2008/0046510 A1 | 2/2008 | Beauchamp et al. |
| 2002/0120697 A1 | 8/2002 | Generous et al. | | 2008/0046556 A1 | 2/2008 | Nicholls et al. |
| 2002/0120765 A1 | 8/2002 | Boehmke | | 2008/0046568 A1 | 2/2008 | Broda et al. |
| 2002/0138640 A1 | 9/2002 | Raz et al. | | 2008/0046803 A1 | 2/2008 | Beauchamp et al. |
| 2002/0143710 A1 | 10/2002 | Liu | | 2008/0046837 A1 | 2/2008 | Beauchamp et al. |
| 2002/0147777 A1 | 10/2002 | Hackbarth et al. | | 2008/0077656 A1 | 3/2008 | Broda |
| 2002/0152402 A1 | 10/2002 | Tov et al. | | 2008/0148289 A1 | 6/2008 | Nicholls et al. |
| 2002/0165849 A1 | 11/2002 | Singh et al. | | | | |

| | | |
|---|---|---|
| 2008/0155020 A1 | 6/2008 | Beauchamp et al. |
| 2009/0031205 A1 | 1/2009 | Aureglia et al. |
| 2009/0037803 A1 | 2/2009 | Bauchot |

OTHER PUBLICATIONS

"Steel-Belted Radius/Enterprise Edition", Funk Software, Inc., 2004.
"Scripting Support for Web Page Printing Sample," Microsoft Corporation, 2004.
"Jabber: About: Technology Overview", Jabber Software Foundation, Dec. 12, 2003.
"Report of Novelty Search," by Patentec, dated Oct. 16, 2003.
Jan Smith, "Browser Basics: Printing", Feb. 3, 2003.
Perfetti, Christine and Jared M. Spool, "Macromedia Flash: A New Hope for Web Applications", User Interface Engineering, 2002.
Aaron Weiss, "The Document Object Model Dissected", Jupitermedia Corporation, 2002.
"Protecting the Enterprise from Rogue Protocols", Akonix Systems, Inc., 2002.
"Informatica Applications: Leverage your Enterprise Information for Better Decision Making", Informatica Corporation, 2002.
"Informatica Applications:. Informatica Customer Relationship Analytics", Informatica Corporation, 2002.
"Brocade Rapidly Implements Customer and Sales Analytics", Informatica Corporation, 2002.
Howlett, Dennis and Keith Rodgers, "Delivering Value Back to the Business: A Guide to Successful Portal Selection and Implementation", TIBCO Software, 2002.
"Sametime for iSeries 2.5", Lotus Software, IBM Corporation, 2002.
"Business Intelligence Software: Engendering a Quiet Revolution in the Business Place", MicroStrategy, Dec. 20, 2002.
"Print Without Pop Up Window Using Javascript," Experts Exchange, posted Nov. 3, 2002.
"Adding Printer Capabilities," Interactivetools.Com, posted Oct. 19, 2002.
Bob Woods, "CypherGuard Secures MSN, Windows IM", Instant Messaging Planet, JupiterMedia Corporation, Oct. 3, 2002.
"Business Transformation Through End-to-End Integration", IBM, Aug. 2002.
"The Sagent Analytic Advantage", Sagent Technology Inc., May 2002.
Thomas Loo and Martin Honnen, "How Can I Print a Document That is not Currently Loaded Into a Frame or Window," Synop Software, Apr. 24, 2002.
Jake Howlett, "Further Control of Printing," Codestore, Jan. 3, 2002.
Hugh J. Watson, "Recent Developments in Data Warehousing", Communications of the Association for Information Systems, vol. 8, 2001.
"The Business Intelligence Industry's Leading Products and Services", Business Objects, 2001.
Stephen Brewster, "Windowing Systems", Glasgow Interactive Systems Group, 2001.
Steve Cimino, "How Can I Print a Web Page in ASP?", Internet.Com Corp., posted Jul. 27, 2001.
"Express Communicator", White Paper, ACD Systems Ltd., May 2001.
"Business Rules: Powering Business and E-Business", White Paper, ILOG, May 2001.
"A Data Warehousing Tutorial", Paretoanalysts, Dec. 27, 2001.
"The Sagent Performance Story", Sagent Technology, Inc., Oct. 2001.
"Achieving Global Business Visibility with the webMethods Integration Platform", webMethods, Inc., Sep. 2001.
Bernstein, Philip A. and Erhard Rahm, "Data Warehouse Scenarios for Model Management", Microsoft Corporation, 2000.
"Implementing the RosettaNet eBusiness Standard: Automating High-tech Supply Chains using BusinessWare for RosettaNet", Vitria Technology Inc., 2000.
Wang, Wenjie and Jiaying Pan, "Instant Messaging Insight", Computer Science Department, New York University, Nov. 22, 2000.
"X Window System: Getting Started", Stanford University, Oct. 26, 2000.

"JavaScript: MSIE 5 Unable to Print Child Window," Experts Exchange, posted Jun. 7, 2000.
Andrew Nosenko, "Scripting Support for Web Page Printing," Microsoft Corporation, Mar. 28, 2000.
Mark Day et al., "A Model for Presence and Instant Messaging", Network Working Group, Request for Comments 2778, The Internet Society, Feb. 2000.
"The Basics of Browser", Santa Clara County Office of Education Internet Institute (SCCOE), 1999.
Ramu Movva and William Lai, "MSN Messenger Service 1.0 Protocol," Internet Draft, Aug. 1999. (19 pages).
Randy Corke, "Keeping Data Warehouses Current: Automating Incremental Updates With Data Movement", DM Direct, May 1999.
Moran, Brian and Russ Whitney, "Getting to Know OLAP and MDX", Windows IT Pro, Instant Doc #5112, Apr. 1999.
Mark Handley et al., "SIP: Session Initiation Protocol", Network Working Group, Request for Comments 2543, The Internet Society, Mar. 1999.
"MQSeries link for R/3", International Business Machines Corporation, 1998.
Michael Tsai, "The Personal Computing Paradigm", ATPM Inc., 1998.
Arno Schoedl, "Issues for Implementing User Interface Software", Georgia Institute of Technology, Sep. 26, 1998.
Tristan Richardson and Kenneth R. Wood, "The RFB Protocol," ORL Cambridge, Jul. 16, 1998. (26 pages).
Allan Christian Long et al., "PDA and Gesture Use in Practice: Insights for Designers of Pen-based User Interfaces", University of California at Berkeley, 1997.
"Middleware —The Essential Component for Enterprise Client/Server Applications", International Systems Group, Inc., Feb. 1997.
Nicolas Pioch, "A Short IRC Primer", Jan. 1, 1997.
Constantine Stephanidis et al., "Design Representations and Development Support for User Interface Adaptation", Institute of Computer Science Foundation for Research and Technology, 1995.
Allen Gwinn, "Simple Network Paging Protocol —Version 3 —Two-Way Enhanced," Network Working Group, Oct. 1995. (23 pages).
"An Introduction to Messaging and Queuing", IBM Corp, Jun. 1995.
"Relational OLAP: An Enterprise-Wide Data Delivery Architecture", MicroStrategy, Incorporated, 1994.
Jarkko Oikarinen and Darren Reed, "Internet Relay Chat Protocol," Nerwork Working Group, May 1993. (58 pages).
"Guidelines for Implementing and Using the NBS Data", Federal Information Processing Standards, Publication 74, Apr. 1, 1981.
"ILOG Views 2D Graphics: the C++ Library For Interactive 2D Graphics", ILOG.
Ff "Sametime 3 Features and Benefits", IBM publication, date unknown (1 page).
U.S. Appl. No. 10/289,142, filed Nov. 5, 2002, Nicholls et al.
U.S. Appl. No. 10/289,155, filed Nov. 5, 2002, Netsch et al.
U.S. Appl. No. 10/289,231, filed Nov. 5, 2002, Powers et al.
U.S. Appl. No. 10/390,945, filed Mar. 17, 2003, Broda et al.
U.S. Appl. No. 10/390,978, filed Mar. 17, 2003, Beauchamp et al.
U.S. Appl. No. 10/391,073, filed Mar. 17, 2003, Beauchamp et al.
U.S. Appl. No. 10/391,128, filed Mar. 17, 2003, Broda et al.
U.S. Appl. No. 10/452,665, filed May 30, 2003, Broda.
U.S. Appl. No. 11/763,134, filed Jun. 14, 2007, Broda.
Using Microsoft Excel 97 Manual. Bestseller Edition. Que Corporation, 1997.
Microsoft Excel Print Screen Images (figs. 1-6).
"Introduction to Dynamic HTML," printed from Microsoft.com. 2007.
Excel 2000, publ. by Microsoft in 1999, screen captures pp. 1-12.
Extensible Markup Language (XML) 1.0 (Second Edition), Oct. 6, 2000, printed from w3.org.
Office Action dated Jan. 4, 2008, issued in U.S. Appl. No. 10/391,073.
Office Action dated Feb. 1, 2008, issued in U.S. Appl. No. 10/237,559.
Office Action dated Feb. 5, 2008, issued in U.S. Appl. No. 11/299,441.
Office Action dated Nov. 30, 2007, issued in U.S. Appl. No. 10/289,162.

Office Action dated Jan. 28, 2008 issued in U.S. Appl. No. 10/289,155.

Ünal, A., "Electronic Commerce and Multi-enterprise Supply/Value/Business Chains," Information Sciences, Aug. 2000, pp. 63-68, vol. 127, Issues 1-2, NH Elsevier.

Karn, P. et al., "The ESP Triple DES Transform," Network Working Group, Request for Comments: 1851, Category: Experimental, Sep. 1995, pp. 1-11.

Goldsmith, D. et al., "UTF-7: A Mail-Safe Transformation Format of Unicode," Network Working Group, Request for Comments: 2152, Obsoletes: RFC 1642, Category: Informational, May 1997, pp. 1-15.

Dabke, P, "Enterprise Integration Via Corba-Based Information Agents," IEEE Internet Computing, Sep./Oct. 1999, pp. 49-57, vol. 3, Issue 5.

Habraken, J. "Ten Minute Guide to Microsoft Excel 2002," Sep. 27, 2001, Que, Section, "Lesson 6, Performing Calculations with Functions.".

Roman, S. "Writing Excel Macros with VBA: Second Edition," Jun. 25th, 2002, Chapter 6: Functions and Subroutines.

Anton, Jesse et al., "Web Catching for Database Applications with Oracle Cache", Jun. 4-6, 2002, pp. 594-599.

Office Action for U.S. Appl. No. 10/289,155, dated Jul. 28, 2008, 12 pages total.

Office Action of U.S. Appl. No. 10/289,231, dated Nov. 6, 2008, 10 pages total.

Office Action of U.S. Appl. No. 10/289,231 dated Apr. 30, 2009, 10 pages total.

Office Action for U.S. Appl. No. 10/390,978, dated Mar. 5, 2009, 19 pages total.

Office Action for U.S. Appl. No. 10/390,978, dated Sep. 4, 2009, 24 pages total.

Office Action for U.S. Appl. No. 10/391,073, dated Sep. 12, 2008, 10 pages total.

Office Action for U.S. Appl. No. 10/391,073, dated Feb. 12, 2009, 8 pages total.

Final Office Action for U.S. Appl. No. 10/391,073, dated Jul. 30, 2009, 9 pages total.

Advisory Action for U.S. Appl. No. 10/391,073, dated Sep. 18, 2009, 3 pages total.

Office Action for U.S. Appl. No. 10/391,128, dated Oct. 6, 2008, 20 pages total.

Final Office Action for U.S. Appl. No. 10/391,128, dated May 13, 2009, 18 pages total.

Office Action for U.S. Appl. No. 10/391,128, dated Oct. 27, 2009, 20 pages total.

Office Action for U.S. Appl. No. 11/299,441, dated Sep. 11, 2009, 22 pages total.

Office Action for U.S. Appl. No. 10/390,978, dated Sep. 1, 2005, 15 pages total.

Final Office Action for U.S. Appl. No. 10/390,978, dated May 18, 2006, 13 pages total.

Office Action for U.S. Appl. No. 10/390,978, dated Feb. 21, 2007, 16 pages total.

Final Office Action for U.S. Appl. No. 10/390,978, dated Jun. 25, 2007, 17 pages total.

Office Action for U.S. Appl. No. 10/390,978, dated Jan. 9, 2008, 5 pages total.

Final Office Action for U.S. Appl. No. 10/390,978, dated Sep. 3, 2008, 17 pages total.

Advisory Action for U.S. Appl. No. 10/390,978, dated Nov. 3, 2008, 3 pages total.

Final Office Action for U.S. Appl. No. 10/390,978, dated Sep. 4, 2009, 24 pages total.

Office Action for U.S. Appl. No. 10/390,978, dated Dec. 14, 2009, 25 pages total.

Office Action of U.S. Appl. No. 10/289,231, dated Dec. 9, 2005, 17 pages total.

Final Office Action of U.S. Appl. No. 10/289,231, dated Apr. 11, 2006, 15 pages total.

Office Action of U.S. Appl. No. 10/289,231, dated Nov. 30, 2006, 13 pages total.

Final Office Action of U.S. Appl. No. 10/289,231, dated Apr. 16, 2007, 15 pages total.

Office Action of U.S. Appl. No. 10/289,231, dated Apr. 15, 2008, 12 pages total.

Final Office Action of U.S. Appl. No. 10/289,231, dated Dec. 14, 2009, 9 pages total.

Office Action for U.S. Appl. No. 10/289,155, dated May 18, 2006; 11 pages total.

Final Office Action for U.S. Appl. No. 10/289,155, dated Mar. 27, 2007; 12 pages total.

Advisory Action for U.S. Appl. No. 10/289,155, dated May 31, 2007; 3 pages total.

Office Action for U.S. Appl. No. 10/289,155, dated Aug. 6, 2007; 11 pages total.

Advisory Action for U.S. Appl. No. 10/289,155, dated Apr. 14, 2008; 3 pages total.

Final Office Action for U.S. Appl. No. 10/289,155, dated Jan. 6, 2009; 11 pages total.

Notice of Allowance for U.S. Appl. No. 10/289,155, dated Jun. 11, 2009; 9 pages total.

Notice of Allowance for U.S. Appl. No. 10/289,155, dated Sep. 29, 2009; 7 pages total.

Office Action for U.S. Appl. No. 10/391,128, dated Jul. 20, 2007, 9 pages total.

Final Office Action for U.S. Appl. No. 10/391,128, dated Mar. 19, 2008, 12 pages total.

Advisory Action for U.S. Appl. No. 10/391,128, dated Jul. 21, 2008, 3 pages total.

Advisory Action for U.S. Appl. No. 10/391,128, dated Jul. 20, 2009, 3 pages total.

Office Action for U.S. Appl. No. 10/452,665, dated Dec. 7, 2006, 8 pages total.

Final Office Action for U.S. Appl. No. 10/452,665, dated May 9, 2007, 7 pages total.

Final Office Action for U.S. Appl. No. 11/299,441, dated Oct. 3, 2008, 18 pages total.

Advisory Action for U.S. Appl. No. 11/299,441, dated Dec. 16, 2008, 3 pages total.

Office Action for U.S. Appl. No. 11/299,441, dated Feb. 4, 2009, 19 pages total.

Office Action for U.S. Appl. No. 11/299,441, dated Jan. 5, 2010, 27 pages total.

Office Action for U.S. Appl. No. 10/391,073, dated Feb. 8, 2007; 7 pages total.

Final Office Action for U.S. Appl. No. 10/391,073, dated Jun. 21, 2007; 7 pages total.

Advisory Action for U.S. Appl. No. 10/391,073, dated October 28, 2008; 3 pages total.

Office Action for U.S. Appl. No. 10/391,073, dated January 19, 2010; 9 pages total.

Office Action for U.S. Appl. No. 11/763,134, dated Jun. 3, 2010; 21 pages total.

Office Action for U.S. Appl. No. 10/289,231, dated Apr. 12, 2010, 12 pgs.

Office Action for U.S. Appl. No. 10/390,978, dated Jun. 17, 2010, 28 pgs.

Final Office Action for U.S. Appl. No. 10/391,073, dated Jun. 17, 2010; 9 pgs.

Advisory Action for U.S. Appl. No. 10/391,073, dated Aug. 23, 2010; 2 pgs.

Office Action for U.S. Appl. No. 10/391,128, dated Oct. 27, 2009, 20 pages total.

Final Office Action for U.S. Appl. No. 10/391,128, dated Jul. 7, 2010, 25 pages total.

Final Office Action for U.S. Appl. No. 11/299,441, dated Jun. 25, 2010, 28 pages total.

Final Office Action for U.S. Appl. No. 10/390,978, dated Jun. 17, 2010, 28 pages total.

Office Action of U.S. Appl. No. 10/289,139 dated Dec. 9, 2005, 14 pages total.

Final Office Action of U.S. Appl. No. 10/289,139 dated Apr. 11, 2006, 16 pages total.

Office Action of U.S. Appl. No. 10/289,139 dated Nov. 30, 2006, 14 pages total.

Notice of Allowance of U.S. Appl. No. 10/289,139 dated May 1, 2007, 6 pages total.
Office Action of U.S. Appl. No. 10/289,142 dated Dec. 20, 2005, 9 pages total.
Final Office Action of U.S. Appl. No. 10/289,142 dated Apr. 24, 2006, 12 pages total.
Office Action of U.S. Appl. No. 10/289,142 dated Dec. 4, 2006, 9 pages total.
Final Office Action of U.S. Appl. No. 10/289,142 dated May 30, 2007, 10 pages total.
Notice of Allowance of U.S. Appl. No. 10/289,142 dated Jan. 4, 2008, 9 pages total.
Notice of Allowance of U.S. Appl. No. 10/289,142 dated May 2, 2008, 5 pages total.
Office Action of U.S. Appl. No. 10/390,945 dated Feb. 9, 2007, 8 pages total.
Final Office Action of U.S. Appl. No. 10/390,945 dated Jul. 5, 2007, 9 pages total.
Notice of Allowance of U.S. Appl. No. 10/390,945 dated Jan. 9, 2008, 7 pages total.
Notice of Allowance of U.S. Appl. No. 10/390,945 dated Jun. 9, 2008, 7 pages total.
Office Action of U.S. Appl. No. 10/289,162 dated Dec. 21, 2005, 12 pages total.
Final Office Action of U.S. Appl. No. 10/289,162 dated Apr. 20, 2007, 8 pages total.
Notice of Allowance of U.S. Appl. No. 10/289,162 dated Nov. 30, 2007, 12 pages total.
Notice of Allowance of U.S. Appl. No. 10/289,162 dated Apr. 16, 2008, 17 pages total.
Office Action of U.S. Appl. No. 12/039,471 dated Dec. 11, 2009, 13 pages total.
Final Office Action of U.S. Appl. No. 12/039,471 dated Jun. 24, 2010, 20 pages total.
Advisory Action of U.S. Appl. No. 12/039,471 dated Sep. 8, 2010, 2 pages total.
Office Action of U.S. Appl. No. 10/237,559 dated Jan. 31, 2005, 11 pages total.
Office Action of U.S. Appl. No. 10/237,559 dated Aug. 8, 2005, 11 pages total.
Final Office Action of U.S. Appl. No. 10/237,559 dated Dec. 30, 2005, 10 pages total.
Office Action of U.S. Appl. No. 10/237,559 dated Jan. 11, 2007, 10 pages total.
Final Office Action of U.S. Appl. No. 10/237,559 dated Aug. 15, 2007, 13 pages total.
Advisory Action of U.S. Appl. No. 10/237,559 dated Oct. 25, 2007, 3 pages total.
Office Action of U.S. Appl. No. 10/237,559 dated Feb. 1, 2008, 12 pages total.
Notice of Allowance of U.S. Appl. No. 10/237,559 dated Aug. 21, 2008, 9 pages total.
Office Action of U.S. Appl. No. 12/035,376 dated Sep. 15, 2010, 9 pages total.

* cited by examiner

| TABLE ID | PIT BOSS | CURRENT DEALER | PAYOUT |
|---|---|---|---|
| 1 | JONES | BROWN | $2,000 |
| 2 | JONES | MILLER | $400 |
| 4 | WILLIAMS | VANDENBERG | $10,000 |

FIG. 3B

| PLAYER NAME | TYPE | CURRENT LOCATION | NOTES |
|---|---|---|---|
| BILL SMITH | HIGH ROLLER | SLOT MACHINE #1 | |
| JANE TAYLOR | MEDIUM PLAYER | TABLE #2 | |
| ADAM CLARK | ORDINARY | NOT PLAYING | |

FIG. 3C

| USER ID | PREFERRED NOTIFICATIONS | PERMISSIONS |
|---------|------------------------|-------------|
| 001 | EMAIL | |
| 002 | IM TYPES | |
| 002 | GROOVE | |

FIG. 3D

| SLOT MACHINE ID | RESPONSIBLE PIT BOSS | CURRENT PLAYER ID | TIME IDLE | PAYOUT OVER TIME | NUMBER OF PLAYS TO WIN |
|---|---|---|---|---|---|
| 1 | JONES | ID | 5 MINUTES | $5,000 | 200 |
| 2 | JONES | NONE | 2 HOURS | $10,000 | 400 |
| 3 | WILLIAMS | NO CARD | 2 MINUTES | $25,000 | 800 |

```
[1]   ProcessMessagesFromServer(Message message)
[2]   {
[3]           // message is a datagram sent by the specific instant message in order to notify a client of
              an event. Common components of message are type, presence information, status
              information, communication address, etc.

[4]           switch(message.type)
[5]           {
[6]                   // if the message type is a user status, then process the message

[7]                   case: UserStatuses
[8]                           Process_User_status_messages(message)
[9]                           break
[10]                  case:... //all the other messages that come from the server
[11]                  default:
[12]                          ...
[13]          }
[14]  }

[15]  Process_User_status_messages(collection userStatusObjects)
[16]  {
[17]          // parse the user status message
[18]          HashOfUserObjects.update(userStatusObjects)

// notify any running processes that are communicating with the user of any changes in
              user status
              NotifyOfUserChanges(userStatusObjects)
[19]  }
```

FIG. 10B

```
[1]   Boolean IsUserPresent(string user, (optional degree of presence) = defaultDegree)
[2]   {
[3]           ///Check if user is present
[4]           if(!HashOfUserObjects.contains(user))
[5]           {
[6]                   throw(indeterminate Exception)
[7]           }
[8]           if(HashOfUserObjects[user].degree > degree)
[9]           {
[10]                  return true
[11]          }
[12]          return false
[13]  }
```

FIG. 10C

```
[1]   RegisterInterestInUser(callback, string user, (optional degreeOfPresence)= defaultDegree)
[2]   {
[3]           CollectionOfInterestingUsers.add(user, degreeOfPresence, callback)
[4]   }
```

| Subcategory | Brand | Description | Year | Quarter | Sales | Cost |
|---|---|---|---|---|---|---|
| Salsa & Hot Sa | Fruit Weasel Sa | Raspberry Salsa | 2000 | Q4 | 51780.00 | 43850.00 |
| Salsa & Hot Sa | Texas Reds | Blast Furnace Ho | 2000 | Q4 | 14806.00 | 12638.00 |
| Salsa & Hot Sa | Gila Monster H | Raspberry Salsa | 2000 | Q4 | 17143.00 | 14512.00 |
| Salsa & Hot Sa | Texas Reds | Texas Twister Ho | 2000 | Q4 | 16392.00 | 13926.00 |
| Cheese | Vermont Specia | Baby Blue Chees | 2001 | Q1 | 31382.00 | 26776.00 |
| Cheese | Vermont Specia | Classic Brie | 2001 | Q1 | 37590.00 | 31866.00 |
| Cheese | Vermont Specia | Classic Cheddar | 2001 | Q1 | 37402.00 | 31992.00 |
| Cheese | Vermont Specia | Dill Cheddar | 2001 | Q1 | 27292.00 | 23010.00 |
| Cheese | Vermont Specia | Garlic Cheddar | 2001 | Q1 | 46359.00 | 39057.00 |
| Cheese | Vermont Specia | Premium Extra S | 2001 | Q1 | 50428.00 | 42985.00 |
| Cheese | Vermont Specia | Premium Smoke | 2001 | Q1 | 57445.00 | 49138.00 |
| Cheese | Vermont Specia | Sage Cheddar | 2001 | Q1 | 22089.00 | 18854.00 |
| Cheese | Wisconsin Che | Mesquite Smoke | 2001 | Q1 | 46359.00 | 39057.00 |
| Cheese | Wisconsin Che | Red Pepper Jack | 2001 | Q1 | 50428.00 | 42985.00 |
| Cheese | Wisconsin Che | Southwest Ched | 2001 | Q1 | 57445.00 | 49138.00 |
| Cheese | Wisconsin Che | Texas Jack | 2001 | Q1 | 22089.00 | 18854.00 |
| Condiments | Ballys Berry Far | Champagne Ras | 2001 | Q1 | 22089.00 | 18854.00 |
| Condiments | Ballys Berry Far | Champagne Ras | 2001 | Q1 | 46359.00 | 39057.00 |
| Condiments | Ballys Berry Far | Deep-Fried Dippi | 2001 | Q1 | 50428.00 | 42985.00 |
| Condiments | Ballys Berry Far | Honey Mustard F | 2001 | Q1 | 57445.00 | 49138.00 |
| Condiments | Ballys Berry Far | Horseradish | 2001 | Q1 | 22089.00 | 18854.00 |
| Condiments | Ballys Berry Far | Hot Raspberry M | 2001 | Q1 | 22089.00 | 18854.00 |

Tuesday, February 04, 2003
11:23:37 AM

METHOD AND APPARATUS FOR A REPORT CACHE IN A NEAR REAL-TIME BUSINESS INTELLIGENCE SYSTEM

This application claims the benefit under 35 USC 119(e) of U.S. Provisional Application No. 60/410,989, filed Sep. 16, 2002, entitled "Business Intelligent System" by inventors Powers and Gardner, and under 35 USC 120 of a commonly assigned U.S. patent application Ser. No. 10/237,559, filed Sep. 6, 2002 entitled "ENTERPRISE LINK FOR A SOFTWARE DATABASE," by inventors Powers and Gardner, both of which are incorporated by reference.

BACKGROUND OF THE INVENTION

The present invention relates in general to enterprise information systems. More particularly, the present invention relates to methods and apparatus for optimizing the delivery of data to a device.

Timely intelligence is critical to proper business decision making. Collecting and quickly analyzing information, however, is often difficult. In a dynamic marketplace, delayed delivery of intelligence can reduce both its reliability and relevancy. Substantial delays can even make the information, often acquired at considerable cost, completely worthless.

Intelligence is often extracted from OLTP applications and from specialized databases, called operational data stores. OLTP (online transaction processing) applications are those enterprise systems that manage a company's basic transactions, such as order entry and billing systems. Since they are commonly optimized for reading and writing, and not for querying, extracting information from an OLTP application can be sufficiently complex to require additional user training. Furthermore, while operational data stores generally archive OLTP information in a format for querying, they also generally do not maintain important historical information. For instance, an operational data store may store a current checking account balance, but not the individual daily balances over the previous month.

In addition, the queries themselves often take substantial time to execute, producing only static snapshots of the information. Observing the dynamic aspect of changing information is therefore difficult. A possible solution may be to sequentially execute and aggregate a series of queries. However, this solution can be both inefficient and ineffective, since manual manipulation still often delays the information delivery. That is, these queries must be first manually aggregated and summarized, before intelligence reports can be generated and delivered.

ETL (extraction, transformation, and loading) systems help by extracting, transforming, and aggregating the information. But latency inherently found in most distributed networks, coupled with considerable manual intervention that ETL systems often require, mean that critical information can still be received late.

Automatic notification is a possible solution. Many analytical products such as business intelligence (BI) and online analytical processing (OLAP) systems are capable of monitoring, scheduling, and broadcasting alerts via email or pager. These systems, however, cannot generally assure that the intended recipient promptly receives and reads the message. This presents a significant problem for time-sensitive information, where minutes or even seconds can make a difference.

To facilitate discussion, FIG. 1 shows a simplified functional diagram of distributed information architecture. The diagram can be divided into an enterprise data layer 160 and a client layer 162. Enterprise data layer 160 comprises elements that are primarily focused on accumulating, processing, and transforming operational data. Client layer 162 comprises elements that are primarily focused on rendering the processed data for a user.

OLTP (online transaction processing) applications 152 are commonly coupled to each other, as well as to other enterprise applications, through a dedicated messaging and queuing application (MQ), such as IBM's MQSeries. MQ provides an efficient communication channel for these applications, by storing and forwarding data messages, in a manner that is similar to email.

Commonly coupled to each OLTP application 152 is operational data store 154, such as an Oracle database. Through an API (application programming interface), transactional data can be transferred between the OLTP application and the database. Operational data store 154 consolidates that data from multiple sources and provides a near real-time, integrated view of volatile, current data. Since its purpose is to provide integrated data for operational purposes, operational data store 154 primarily has add, change, and delete functionality.

In order to conduct meaningful analysis, this information is often further placed in a more stable environment, optimized for random querying. ETL system 155 extracts the information from the appropriate data store 154, transforms and combines the data based on pre-defined constraints, and subsequently loads the data into data warehouse 156. A popular ETL technique, developed by Sagent, is the use of data flows.

Data flows are a series of rule-enabled transformations that are connected in data pipelines. They handle the tasks of joining, merging, comparing and splitting data and permit the separation of data into different logic paths, each of which can be further combined and split off to create more complex transformation sequences.

ETL data extractions often occur by either a bulk or a trickle method. In the bulk method, periodic snap shots of data in operational data store 154 are extracted and uploaded into data warehouse 156. This commonly occurs as a large batch file scheduled during a low system utilization period. In the trickle method, changes in operational data store 154 are continuously uploaded, or "trickled" into data warehouse 156. These updates are therefore frequent, smaller, and more current than in the bulk method. As in the case of OLTP 152 systems, ETL 155 can also use the MQ for data extraction.

Once the data is in data warehouse 156, it is available for OLAP 158 (online analytical processing). OLAP enables trained users to perform ad hoc analysis of data in multiple dimensions, such as with an OLAP cube. OLAP cubes provide multi-dimensional views of data, querying, and analytical capabilities. Furthermore, many OLAP products can schedule, run, publish, and broadcast reports, alerts and responses over the network, email, or personal digital assistant. Users often access OLAP 158 by thin client 162. Thin clients are applications that generally are integrated into the underlying client device, and generally require minimal modification. For instance, a thin client can be browser with a Macromedia Flash module installed.

Although OLAP analysis can provide valuable insight about business operations, critical information is often received late, even with automated reporting. Automated OLAP reporting often only has access to the information within data warehouse 156, which can be several processing stages behind OLTP 152. This delay can be substantial, reducing the information's value. Furthermore, these reports are often only static snapshots of information in data warehouse 156.

For example, a NASDAQ broker places an order into an OLTP 152 application called an electronic communications network, or ECN. The ECN matches customer buy and sell orders directly through the computer. In this case, an order to buy 100 shares of ABC at $18.75 was entered. This open order is stored in the ECN operational data store 154, subsequently extracted by ETL 155, and analyzed by OLAP 158. If the buy order amount is the then highest in the ECN, OLAP 158 forwards the information to thin client 164, NASDAQ quote montage, where it is immediately displayed on the familiar stock market ticker tape. And although this system delivers stock information to individual brokers with reasonably small latency, it is also not easily modified. The NASDAQ application is custom designed for the specific purpose of enabling stock trading. As such, it would be difficult to display additional data on the stock ticker, such as non-financial information, without substantial additional programming.

In view of the foregoing, there is desired a method and apparatus for optimizing the delivery of data to a device, in which relevant information is received in a timely manner, and in which that data is rendered in a dynamic format.

SUMMARY OF THE INVENTION

The invention relates, in one embodiment, to a method of optimizing the delivery of a set of data elements from a first device to a second device. The method includes retrieving from a data source the set of data elements, including a first subset of the set of data elements, a second subset of the set of data elements, and a third subset of the set of data elements. The method also includes transferring the first subset of the set of data elements to the second device. The method further includes selecting a forth subset of the set of data elements, wherein the forth subset can be comprised of data elements from the first subset and the second subset; or wherein the forth subset can be comprised of data elements from the second subset and the third subset. The method also includes transferring a forth subset of the set of data elements to the second device.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3B-E illustrate, in accordance with one embodiment of the present invention, several simplified de-normalized tables as would be used in an active data cache;

FIG. 10A-C illustrate, in accordance with one embodiment of the present invention, simplified pseudo-code as would be used by IM client;

FIGS. 16A-B illustrate, in accordance with one embodiment of the present invention, an active studio screen display showing a continuous columnar report;

FIGS. 17A-C illustrate, in accordance with one embodiment of the present invention, an active studio screen display in which a titled report is being rendered;

FIGS. 23-25 illustrate, in accordance with one embodiment of the present invention, an active studio screen display in which cross-tab data is efficiently displayed; and, FIG. 26 illustrates, in accordance with one embodiment of the present invention, a simplified UML class diagram of software classes that comprise the report cache application.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

In accordance with one embodiment of the present invention, an active data architecture is advantageously employed to facilitate the presence-aware delivery of timely data. That is, determining the type of device available to the user, and delivering the information in a format within the device's capabilities. In accordance with another embodiment of the present invention, information can be continuously extracted from data sources without the need for manual queries, or additional user training. In accordance with another embodiment of the present invention, information may be dynamically delivered in order to render streaming real-time or near real-time data and/or analytical results, whether graphically, textually, audibly, or otherwise.

Figure 2A:
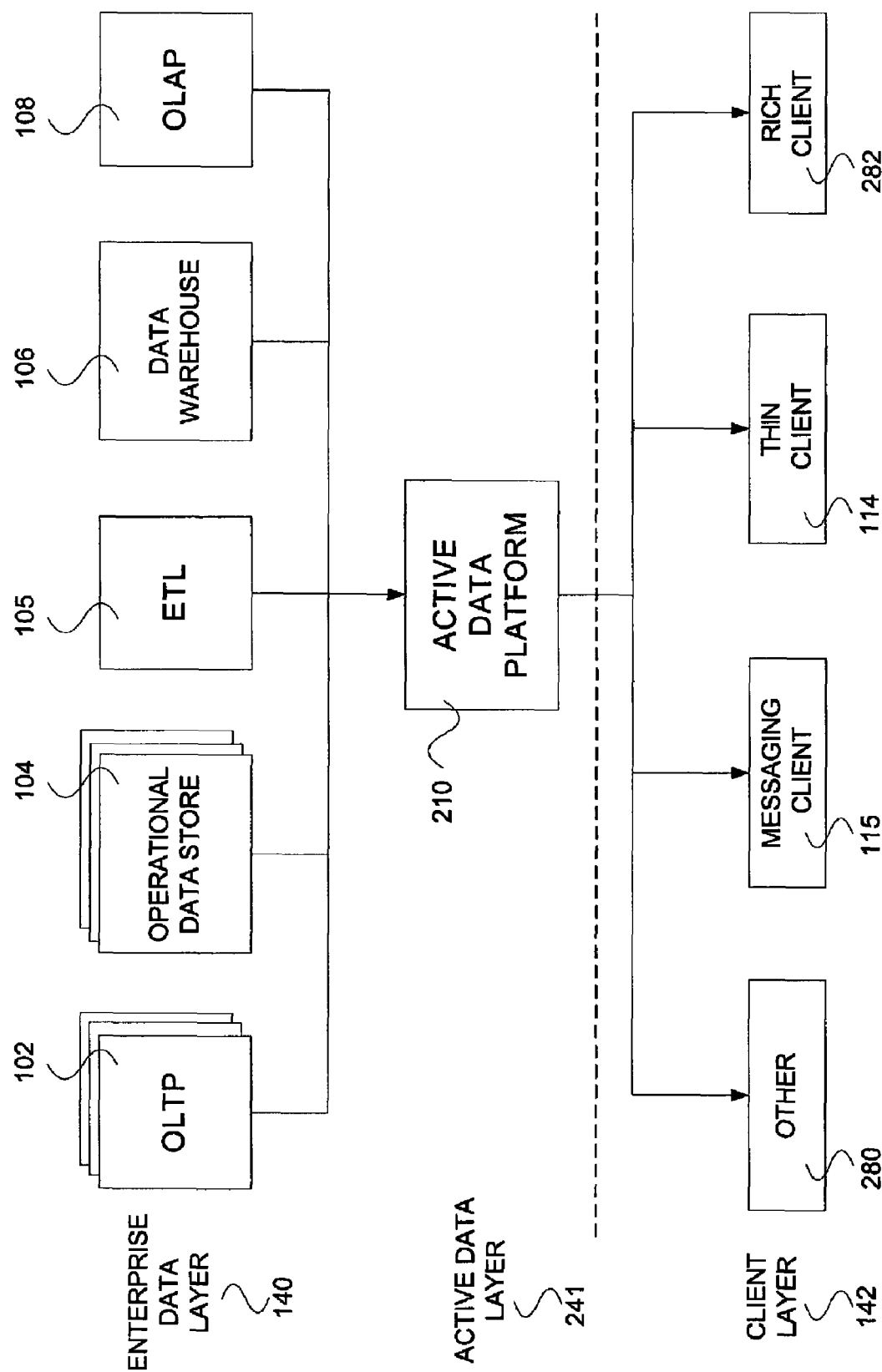
FIG. 2A-B illustrate, in accordance with one embodiment of the present invention, simplified functional diagrams of the active data platform.

Referring now to FIG. 2A, a simplified functional diagram of an active data platform is illustrated. Active data platform 210 comprises a suite of applications that allow a user to actively monitor continuously changing information, throughout enterprise data layer 140, according to a pre-defined set of rules. A rule may be a pre-defined procedure comprising the events to be monitored, and the subsequent action or transformation that may be required. These rules enable active data platform 210 to extract, combine, and transform data from various systems, as well as the MQ messages transferred among the applications, in a substantially contemporaneous manner. This processed information can then be transmitted in substantially near real-time to devices in client layer 142. For example, processed information can arrive at a client layer 142 device within 2-10 seconds of an event or transaction, or even sooner. Depending on the type of client device, this processed information can be received as a continuous data stream, a static report, or an alert. The processed information can also be stored in a data warehouse and compared with future information.

Figure 1:
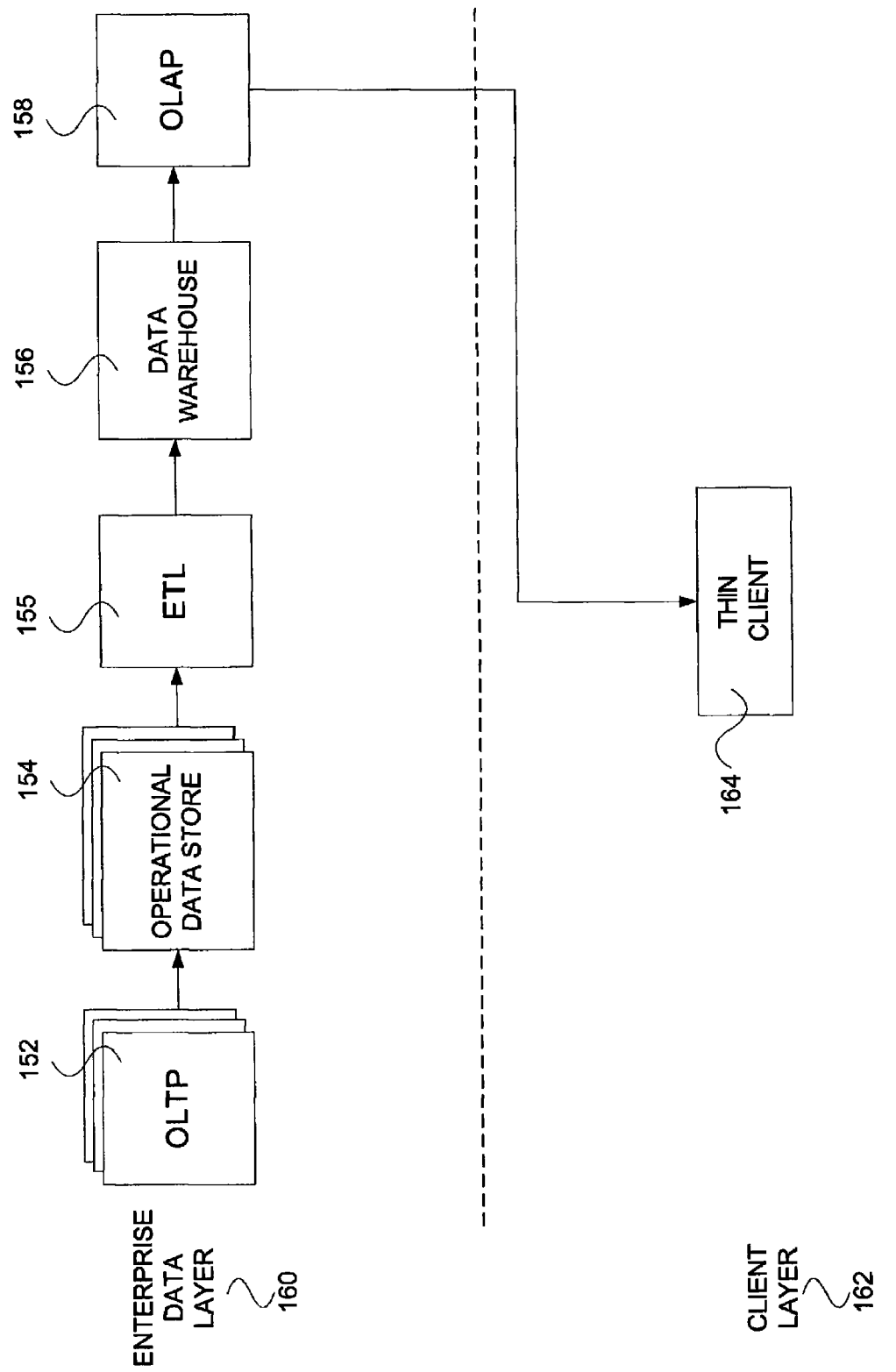
FIG. 1 illustrates a simplified functional diagram of distributed information architecture.

As in FIG. 1, OLTP 102 generates transactional information. Operational data store 104 consolidates that data from multiple sources and provides a near real-time, integrated continuously updated view of data. ETL system 105 extracts the information from the appropriate data store 104, transforms and combines the data based on pre-defined constraints, and subsequently loads the data into data warehouse 106 that is optimized for querying, or random data retrieval. The ETL extraction can occur in either a bulk or a trickle method. Once the data is in data warehouse 106, it is available for OLAP 108, or online analytical processing applications. OLAP enables trained users to perform ad hoc analysis of data in multiple dimensions, such as with an OLAP cube.

Through the use of browser technology, such as DHTML, thin client 114 and a rich client 282 provide the user with enhanced visualization functionality, such as the capability to graphically render streaming data. Thin client 114, in one embodiment, is called active viewer, and comprises a browser. Rich client 282, in another embodiment, is called active viewer pro, and comprises a browser with additionally installed software. DHTML is a combination of HTML, style sheets, and scripts, and allows web-pages to be animated. In addition, rich client 282 further allows for enhanced functionality, such as pen-based user input, secure instant messaging, robust printing capability, and the use of skins. Skins are configuration files that allow modification of the browser appearance. Messaging client 115, such as a SMS cell phone, or an instant messaging program, such as Yahoo Messenger or Windows Messenger, provides alert capability. These alerts, as well as static reports, can also be received through thin client 114, such as a browser. Other 280 represents those enterprise applications that have been programmatically coupled to active data platform 210, as a client.

In one embodiment, client applications in client layer 142 can reside on a Tablet PC. The Tablet PC represents the evolution of the business notebook personal computer. It marks a new direction for notebook PCs, adding pen-based technologies to existing notebook functionality and enabling Windows XP-compatible applications to take advantage of various input modes, such as pen and voice-based data. The Table PC will be among the most versatile PCs ever made, with high-powered and efficient processors, lightweight designs, and, for man, built-in wireless capability. All Tablet PCs will have keyboards, some permanently attached and others detachable. But the Tablet PC is more than just a great notebook. The real value of the Table PC is that it makes it possible for information workers to bring he power of their business PC into more places than ever before, and they can do it with the same software they use on their office PC or notebook today.

For example, betting transactions would be normally stored in a casino's game transaction system. Wanting to be extra-attentive to high-rollers, a casino would configure the active data platform to observe for any customer whose betting exceeds a specified threshold, upon which an alert would be sent to the closest pit boss. The pit boss would locate these customers and personally oversee that exceptional customer service was provided.

Figure 2B:
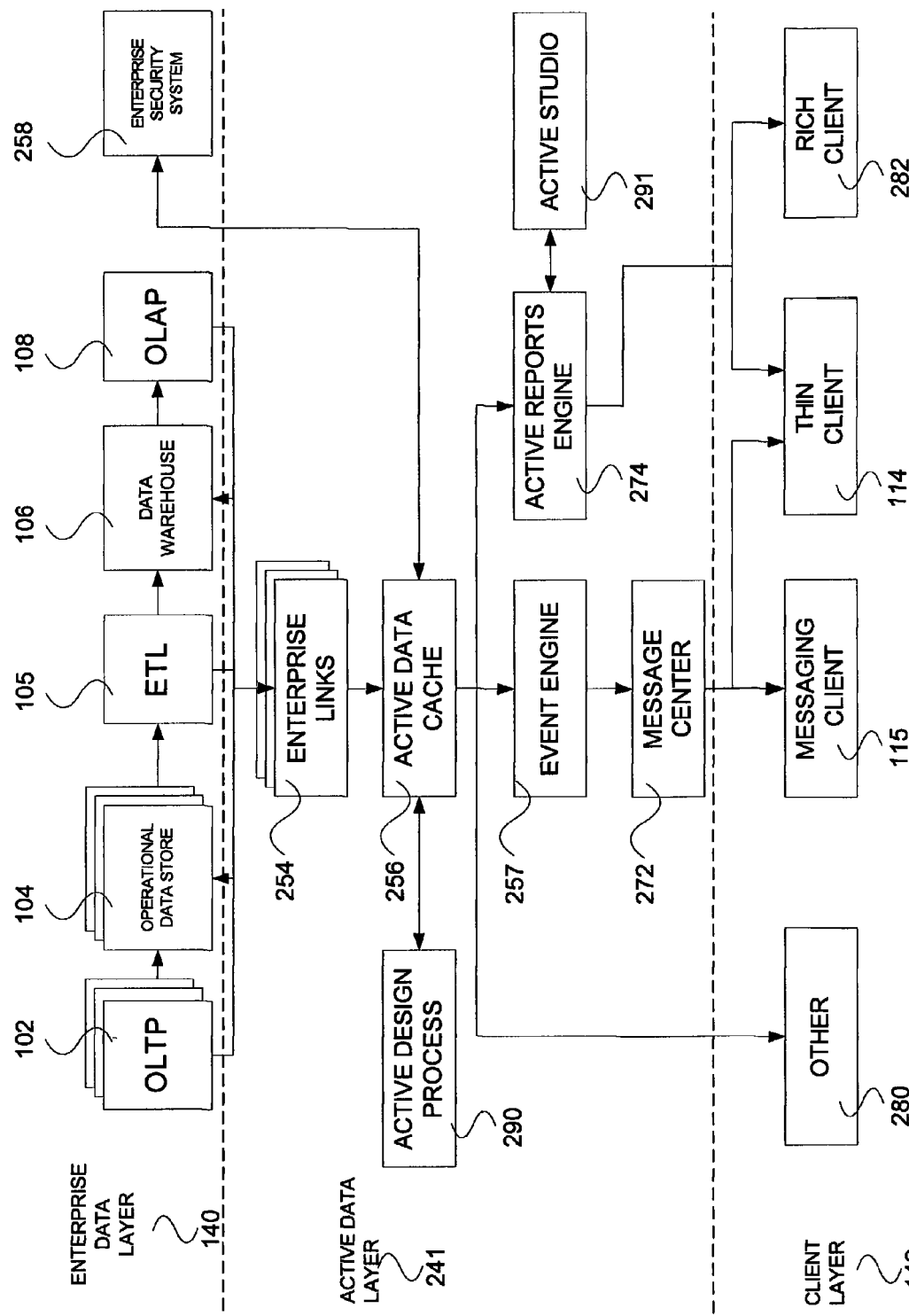

FIG. 2B illustrates, in accordance with one embodiment of the present invention, a simplified functional diagram displaying elements of the active data platform 210, shown in FIG. 2A. Enterprise links 254 comprises adaptors that allow active data cache 256 to be coupled to the applications in enterprise data layer 140. Furthermore, these adaptors can also selectively filter and transform incoming data for active data cache 256. For instance, adaptors in enterprise link 254 can allow active data cache 256 to connect to enterprise applications (i.e., SAP, Siebel, and PeopleSoft), databases (i.e., Oracle, Informix, Sybase, DB2, and SQL Server), legacy applications (i.e., IBM S/390 mainframes), OLTP (i.e. order entry, billing, payment, etc), and MQ applications (i.e., IBM MQSeries, Vitria, Tibco, etc.).

Active data cache 256 is the core repository for the active data platform. Unlike traditional databases, such as operational data store 104 and data warehouse 106, active data cache 256 stores data in a de-normalized format. Normalization is the practice of optimizing the database structure into multiple tables, eliminating data redundancy and improving scalability and maintainability.

Since active data cache 256 is primarily focused on automatic reporting, and not on querying, it generates substantially de-normalized tables representing each report or data stream. By logically placing these de-normalized tables near client layer 142, in a non-obvious fashion, fewer processing stages are required and latency is substantially reduced.

Database tables are not commonly de-normalized, since data is duplicated. In general, duplicated data tends to increase the likelihood of data corruption during updates. That is, multiple separate entries no longer match each other. Furthermore, de-normalized tables tend to be more difficult to query than normalized tables, since each individual data record may be substantially larger, and hence take longer to search. This is even more so if the table is not properly indexed. However, since ad-hoc querying is not a substantial requirement, and table joins are not necessary, normalization enables database tables within active data cache 256 to be optimized for the efficient creation of pre-defined reports and alerts. In one embodiment, a single de-normalized table is the source for each report.

Active design process 290 is powerful, intuitive suite of applications that allow a user to create rules, map onto message queues, manage security, define data objects, and configure enterprise link 254 processes and sources, based on simple drag-and-drop operations for the data streams, reports, and alerts. In addition to active design process 290 in active data layer 241, there is a corresponding active design process client in client layer 142, such as a web browser. In one embodiment, active design process 290 comprises an application entitled architect. Unlike traditional real time business intelligence applications, active design process 290 allows a user to dynamically add new data sources, or create new transformations and reports, without changing the system as a whole. That is, unlike the NASDAQ stock trading example previously shown, which is not easily modified, active design process 290 can easily tailor the active data platform to new applications and changing corporate infrastructures.

Active report engine 274 converts the raw information in active data cache 256 into charts, tables, and graphs for display on a device in the client layer 142. Active studio 291 is a presentation editor that allows a user to easily create and format specific graphical and textual active views of data, based on pre-defined templates. Common views are tables, pie graphs, bar graphs, line graphs, scatter graphs, columnar reports, form reports, geographic (map) views, crosstabs, and Excel integration. For instance, a user can create an hourly report in which gambling customers are aggregated into different groups based on the value of their accumulated betting that day. The user selects a bar graph for the report, and changes the fill color and font type to the user's preference. These views can be substantially active, changing in near real time as the underlying data changes, or the can be static, like a printed report.

Event engine 257 monitors the information in active data cache 256 for pre-determined changes, or events. Once an event occurs, such as a rising temperature in a chemical processing plant, message center 272 is notified, subsequently forwarding the appropriate message to messaging client 115, thin client 114, or rich client 282.

In one embodiment, message center 272 tracks the presence of client devices, as well as the status of users themselves, in order to substantially assure message delivery. This is in contrast to traditional messaging systems that cannot determine if messages are, in fact, delivered to intended recipients. Presence determines if the device is available on the network. Status determines if the intended recipient is available to read and respond to the instant message. Common status categories include descriptive information, such as "out to lunch", "busy", "away from desk", "important meeting", etc. For instance, the device may be turned on and available, but the intended recipient is in an important meeting and does not wish to be disturbed. The intended recipient sets the status to "important meeting" in order to notify message center 272, as well as any other subscribed user, that he will probably not respond to the alert until after the meeting. Message center 272 would then choose an alternative available recipient, based on an established notification rule.

For example, a casino's active data platform attempts to notify the nearest pit boss of a particularly prolific gaming customer. However, since the pit boss has a "busy" status, the casino manager is alerted instead, and subsequently walks over to greet the customer.

Enterprise security system 258 represents a company's existing security infrastructure, such as Steel-Belted Radius by Funk Software. Since operational information may be sensitive, active data cache 256 can be integrated into enterprise security system 258. In this way users are authenticated before information is transmitted to client layer 142 devices.

Figure 3A:
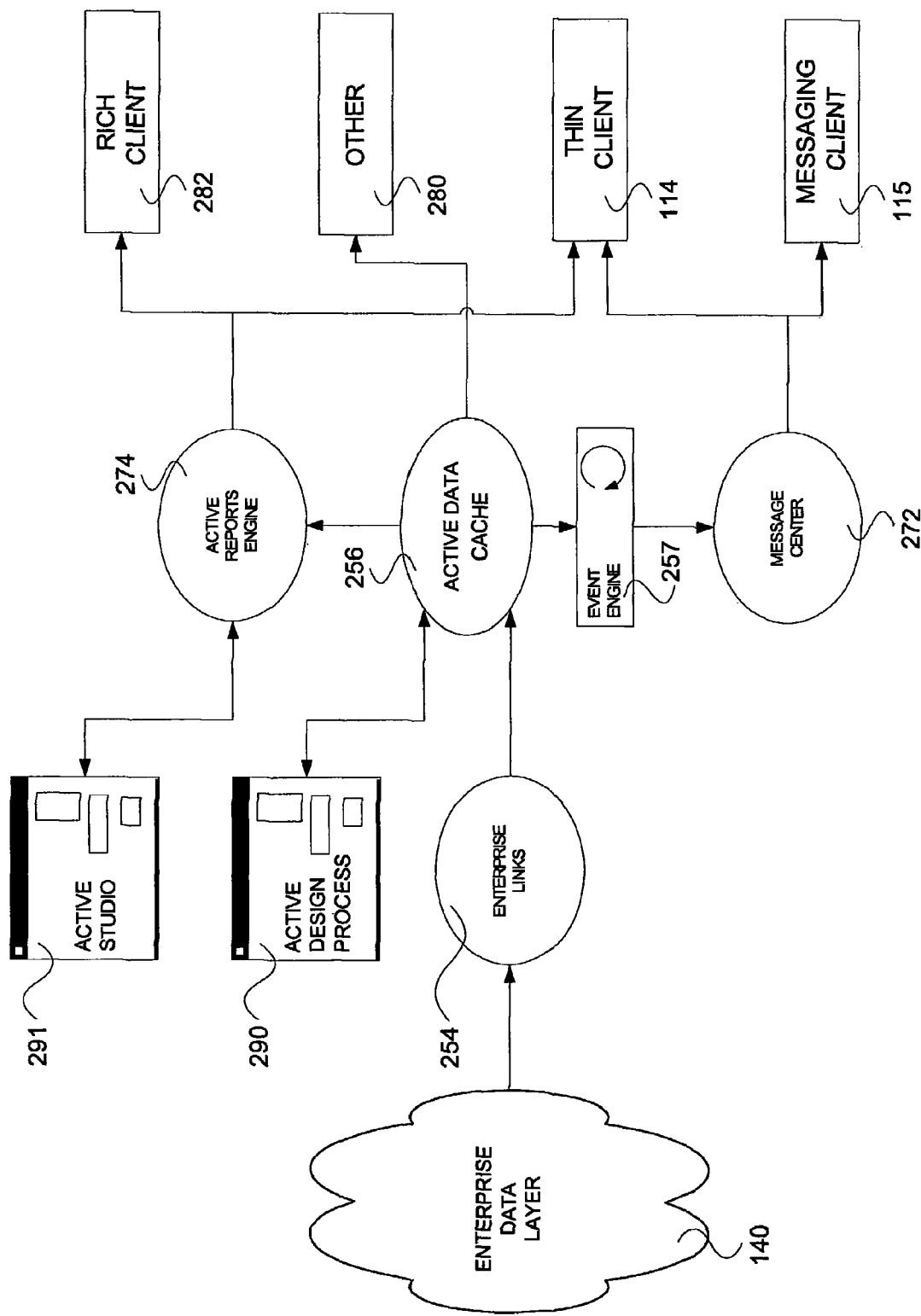
FIG. 3A illustrates, in accordance with one embodiment of the present invention, a simplified functional diagram displaying the active studio application.

FIG. 3A illustrates, in accordance with one embodiment of the present invention, a simplified functional diagram displaying the active studio 304 application of active data platform 210, as shown in FIG. 2B. In addition to active studio 304 application in active data layer 241, there is also a corresponding active studio 304 client in client layer 142, such as a web browser.

FIG. 3B-E illustrate, in accordance with one embodiment of the present invention, several simplified de-normalized tables as would be used in a casino's active data cache 256, as shown in FIG. 3A. Referring to FIG. 3B, a de-normalized table is shown describing payouts at specific gaming tables on the casino floor. For example, table 1, whose current pit boss is Jones, and whose current dealer is Brown, has a payout of $2000. Referring to FIG. 3C, a de-normalized table is shown describing the current location of players in a casino. For example, player Bill Smith, who is a high roller, is currently at slot machine #1. Referring to FIG. 3D, a de-normalized internal table is shown describing active server user profile information. For example, a system user with ID#1 prefers to receive notifications and alerts through email. Referring to FIG. 3E, a de-normalized table is shown describing the slot machine player locations, as well as slot machine statistics. For example, at slot machine #1, Jones is the responsible pit boss, current player is ID, the slot machine has been idle for 5 minutes, the payout over time has been $5000, and the number of plays to win on average is 2000.

Figure 4:
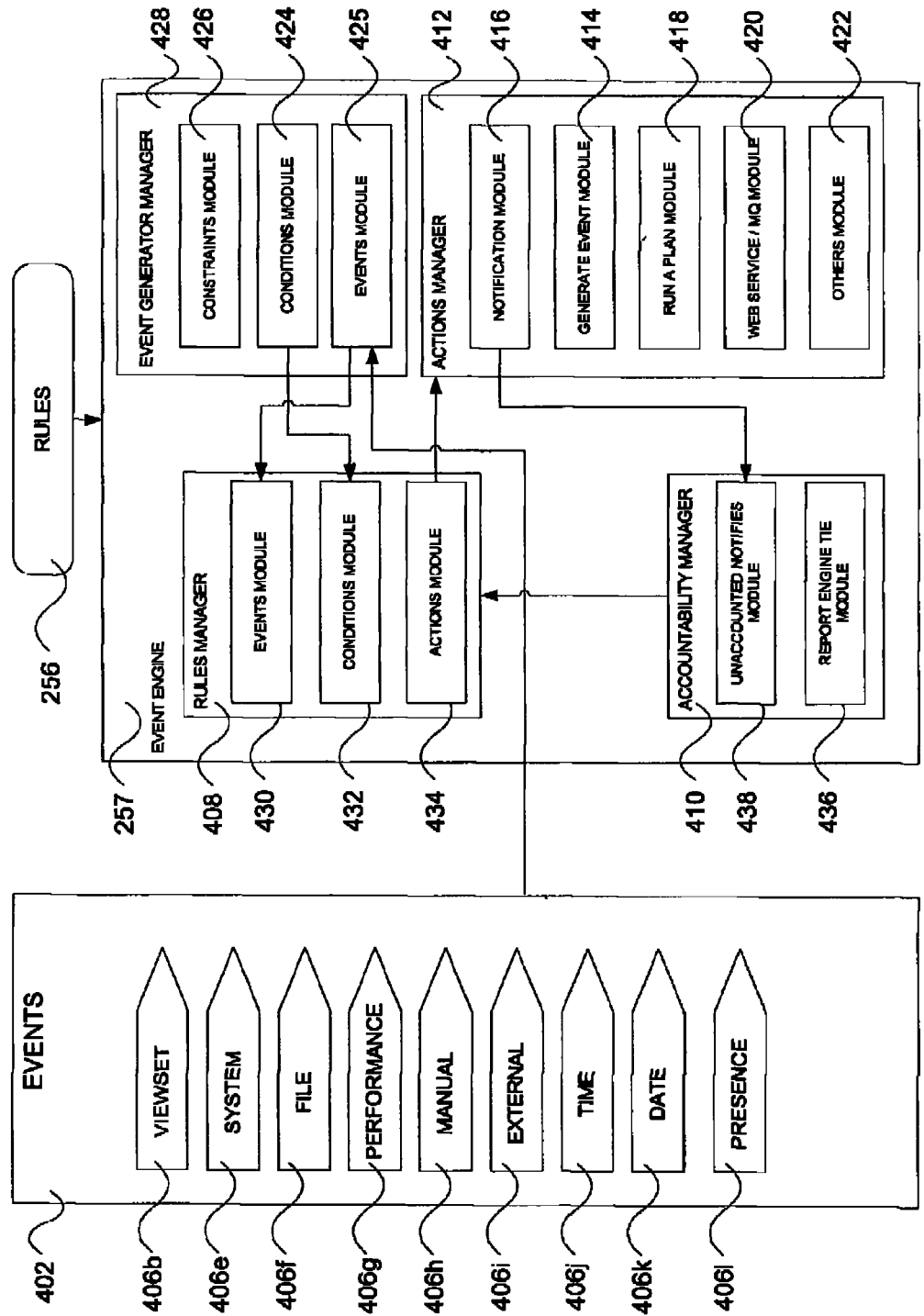
FIG. 4 illustrates, in accordance with one embodiment of the present invention, a simplified functional diagram displaying an event engine.

FIG. 4 illustrates, in accordance with one embodiment of the present invention, a simplified functional diagram displaying event engine 257, as shown in FIG. 3. Event engine 257 is configured to monitor for a variety of events 402 generated throughout the network, as well as within the active data platform itself. A viewset event 406*b* is a change to a modified data object, such as a database table with a filter. It would be generated by active reports engine 274, as shown in FIG. 2B. A system event 406*e* is generated from the underlying operating systems or application, for instance, a change in the virtual memory or a cache miss. A file event 406*f* is a change to a given file as stored in a file system. A performance event 406*g* is a change in a system's performance, such as virtual memory utilization or network latency. A manual event 406*h* is an event entered by a user. An external event 406*i* is an externally generated through an API, and is used for such things as functional system verification. A time event 406j is a change in the passage of time, similar to a timer. A date event 406k is a change in date. And, a presence event 462l is the discovery of a client instant messaging device that was previously offline, or the availability status of a recipient has changed.

Event engine 257 is further comprised of four logical components: event generator manager 428, rules manager 408, accountability manager 410, and actions manager 412. Event generator manager 428 maintains the state information of monitored events 402 for rules manager 408. Rules manager 408 is the primary event handler for the active data platform. Accountability manager 410 monitors the delivery status of all reports and alerts. And, actions manager 412 initiates actions based on input from the actions module 434 of the rules manager 408.

Event generator manager 428 maintains state information of monitored events 402 for rules manager 408. Constraint module 426 specifies the parameters that must be satisfied before evaluating an event and/or a condition and/or before applying the rule. Conditions module 424 maintains information for the corresponding conditions module 432 in rules manager 408. It further specifies attributes relevant to the specific event, other than constraints, which must be satisfied before the action associated with the rule may be taken. Events module 425 maintains event information for the corresponding events module 430 in rules manager 408.

Rules manager 408 further includes three components in order to manage active data: an events module 430, a conditions module 432, and an actions module 434. Events module 430 monitors all generated events 402 within the active data platform. Conditions module 432 filters out non-relevant events, and forwards the information to actions module 434, which in turn, initiates new system events based on criteria within rule sets 256. For example, all betting transactions are sent as events to event generator manager 428, which in turn sends the information to the events module 430 of rules manager 408. The conditions module 432 is configured to subsequently filter out all but the blackjack events. The actions module, based on rules 256, then creates an internal system event to instruct the active reports engine 274, as shown in FIG. 2B, to create a report for all blackjack transactions above a threshold, as described in rules 256.

Accountability manager 410 monitors the delivery status of all reports and alerts. It further includes an unaccounted notifies module 438, and a report engine tie module 436. The unaccounted notifies module 438 maintains the status of undelivered alerts and reports. That is, unaccounted notifies module 438 determines if a recipient cannot be reached, subsequently forwards a delivery-incomplete message to rules manager 408. Report engine tie 436 monitors for successfully received reports and alerts, and subsequently forwards a delivery-complete message to rules manager 408. For example, a receipt notification status message is received in accountability manager 410, which is subsequently processed. If the receipt notification status message comprises an acknowledgment, report engine tie module 436 further processes the message and forwards the information to rules manager 408. However, if an acknowledgment is not received, unaccounted notifies module 438 processes the message and forwards the information to rules manager 408, which in turn allows active data cache to escalate alerts and reports to alternate recipients, based on status and presence, should the original recipient be unavailable.

Actions manager 412 initiates events and actions based upon input from the actions module 434. It further includes a notification module 416, a generate event module 414, a run a plan module 418, a web service/MQ module 420, and an others module 422. Notification module 416 forwards any report and alert non-delivery messages to unaccounted notifies module 438. Generate event module 414 generates system events initiated by actions module 434 in rules manager 408. Run a plan module 418 executes script based on rules 256. Web service/MQ module 420 provides an interface to third-party web-services based on WSDL (web-service description language), as well as message queue applications. Others module 422 is an API that allows additional modules to be later added.

Figure 5:
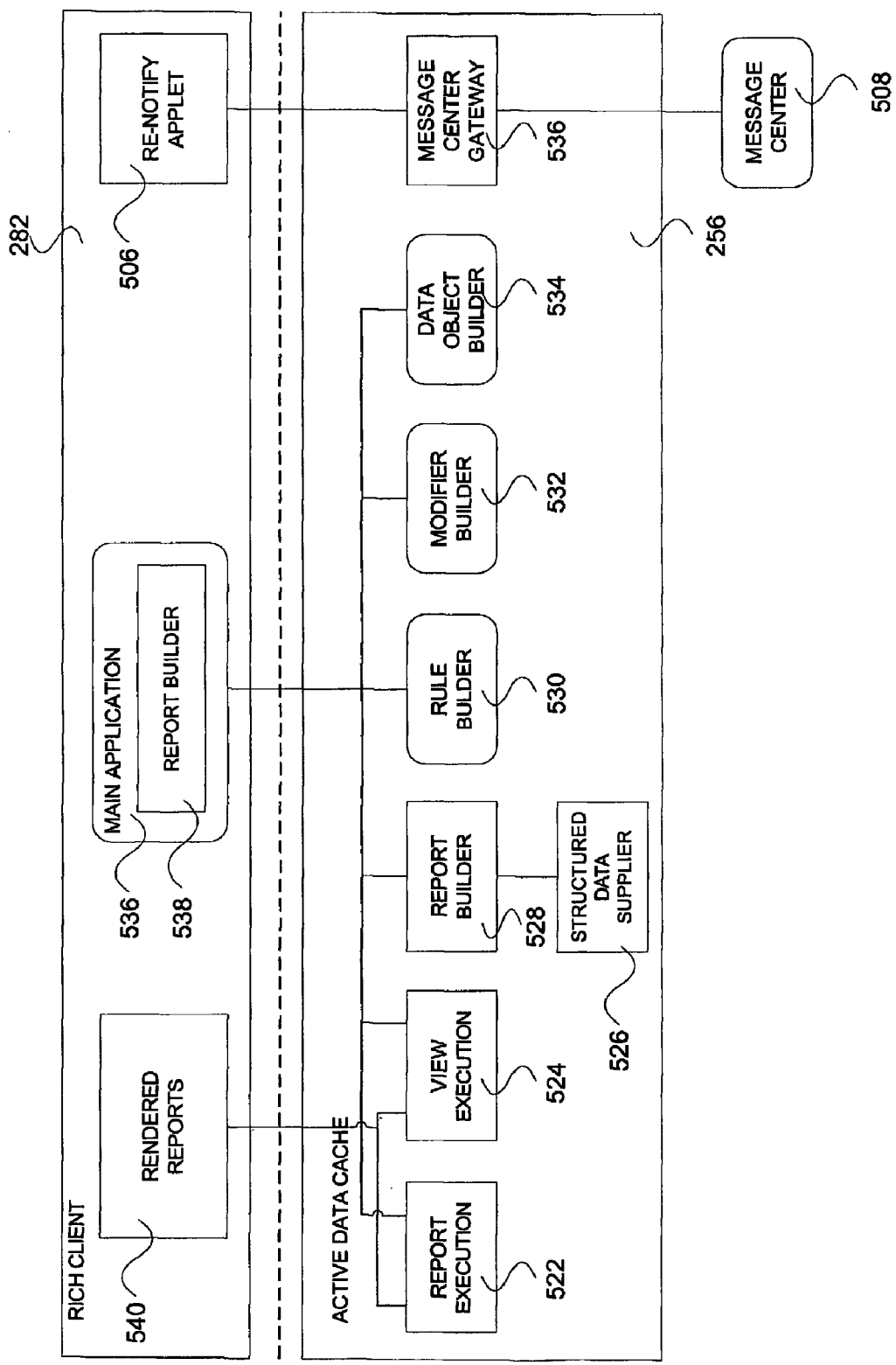
FIG. 5 illustrates, in accordance with one embodiment of the present invention, a simplified functional diagram displaying components of the rich client and active data cache.

FIG. 5 illustrates, in accordance with one embodiment of the present invention, a simplified functional diagram displaying components of rich client 282 and active data cache 256, as shown in FIG. 3.

Rich client 282 is comprised of a main application 536, a rendered reports 540 component, and a re-notify applet 506 component. Main application 536 provides the core environment for client interface to the active data cache 256. It comprises several functional components that can dynamically render incoming data streams from active data cache 256, and locally create reports, such as report builder 538. Rendered reports 540 functions as a viewer to display reports from active data cache 256 which already have been assembled. Re-notify applet 506 displays notification messages to the user.

In a non-obvious fashion, rich client 282 substantially maintains an open TCP-IP connection to active data cache 256, through the execution of blocking HTTP request in a second open browser window. Internet browsers normally implement HTTP, an asynchronous protocol that uses multiple short-lived synchronous TCP-IP connections to render the objects on a web page. For instance, a connection is opened, a picture is rendered, and the connection is closed. However, in the current invention, a web server periodically sends keep-alive messages to the second open browser window, in order to prevent a TCP-IP connection timeout. Through the use of this code, a TCP-IP connection is kept open, allowing data to be sent in a substantially continuous way to rich client 282, without having first to refresh the browser window. Thus, the dynamic rendering process in the primary browser window is more readily controlled. For example, the following JavaScript code may be executed by the second browser window:

Line 1: <scriptid='s1'>
Line 2: parent.ProcessActiveData('"+viewsetID+"', '"+strXML+"');
Line 3: s1.removeNode(true);
Line 4: </script> viewsetID indicates the viewset to which the active data applies, whereas strXML refers to an XML document describing new data. Line 1 indicates to the browser that the following section need not be rendered since it is a script section. The execution of line 2 causes the report in the main application (active studio or active viewer) browser to change. The execution of line 3 removes the script from the page. And line 4 indicates to the browser that the script section has ended.

Active data cache further comprises functional components that facilitate the generation of a report. These are: a report execution component 522, a view execution component 524, a report builder component 528, a rule builder component 530, a modifier builder component 532, data object builder component 534, a structured data supplier component 526, and a message center gateway 536.

Report execution 522 creates, caches, and then forwards specific reports based on configuration, to either rendered reports 540 for report builder 538. View execution 524 likewise creates and forwards views to report builder 538. Views are data objects that may be filtered. Report builder 528 pre-processes extracted information from multiple sources, and transforms the aggregated data into a format optimized for use in multiple reports. Rule builder 530 pre-processes stored rules from multiple rule caches for use in the generation of multiple reports. Modifier builder 532 pre-processes intermediate information transformations, such as additional metrics that the user wishes calculated and reported. Data object builder 534 pre-processes data objects into optimized formats for report execution component 522. Structured data supplier 526 forwards external pre-processed data to report builder 528.

Figure 6:
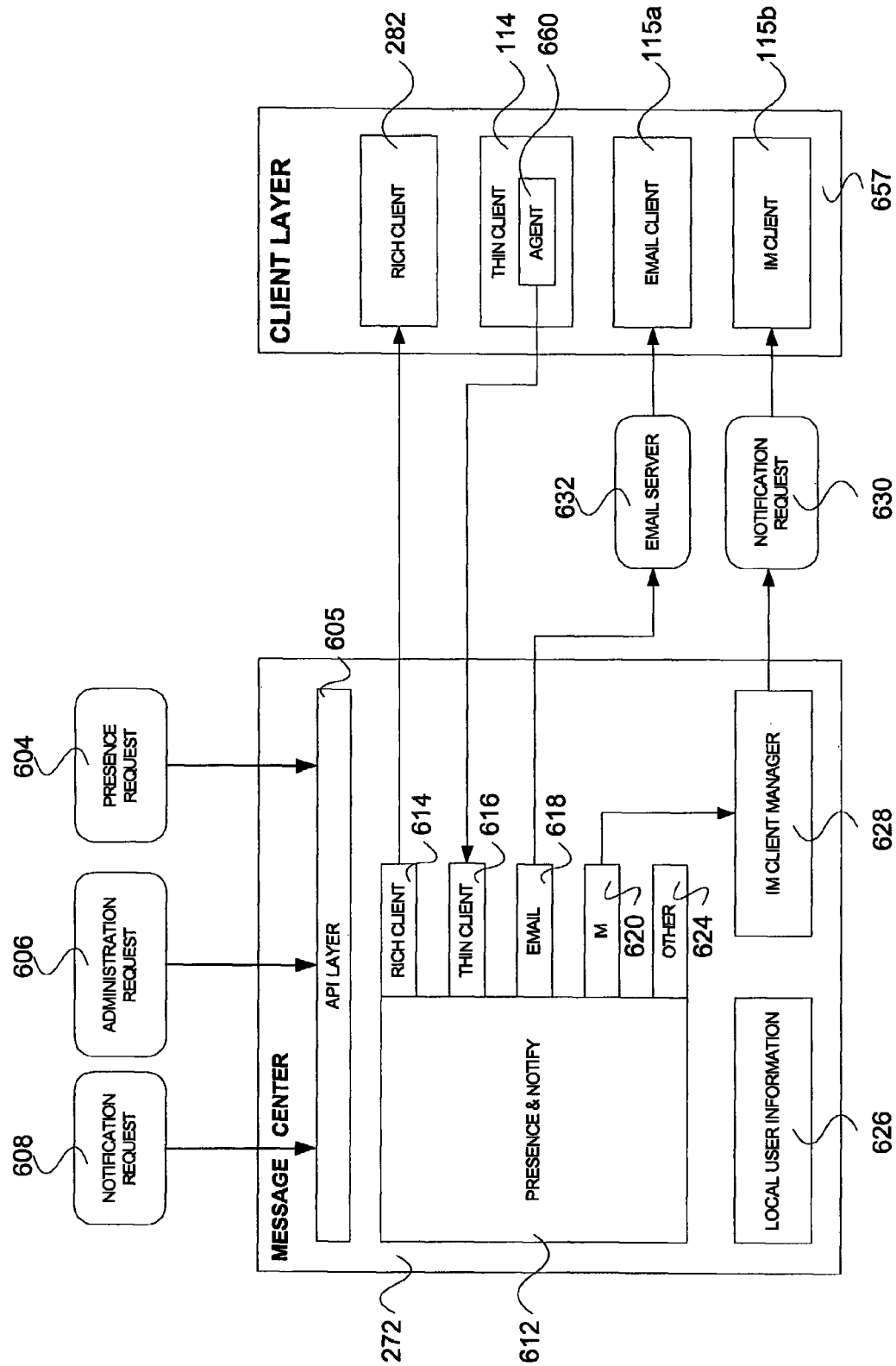
FIG. 6 illustrates, in accordance with one embodiment of the present invention, a simplified functional diagram displaying components of the message center.

FIG. 6 illustrates, in accordance with one embodiment of the present invention, a simplified functional diagram displaying components of message center, as shown in FIG. 3. Message Center 272 provides messaging functionality to the active data platform. It allows reports and alerts to be sent via heterogeneous channels to a plurality of clients. Message center 272 further includes an API layer 605, a presence and notify 612 module, a rich client 614 interface, a thin client 616 interface, an email interface 618, an IM interface 620, other interfaces 624, a local user information 626 module, and an IM client manager 628 module.

API layer 605 provides a uniform application interface for system generated events, such as notification request 608, administration request 606, and presence request 604. Presence and notify component 612 provides the main messaging infrastructure for the active data platform. It insures that the reports and alerts are properly routed to intended recipients. Local user information 626 maintains a local cache of user profile information, such as names, passwords, and delivery preferences.

Rich client interface 614 is further coupled to rich client 282, which provides the user with enhanced visualization functionality, such as the capability to graphically render streaming data. Thin client interface 616 is coupled to thin client 112, which further comprises agent application 660. Since thin client 114 is commonly a browser without presence functionality, agent 660 notifies presence and notify component 612 that a given report or alert is being viewed. Agent 660 is commonly an Active X component or ajava applet. Email interface 618 is further coupled to email server 632, such as an SMTP server, which forwards messages to email client 115a. IM interface is further coupled to IM client manager 628 which sends a notification request 630 to IM client 115b. Instant messaging (IM) is a means for sending small, simple messages that are delivered immediately to online users. It differs from email primarily in that its primary focus is immediate end-user delivery. Through an IM client application, a user can discover and immediately begin a text conversation, or chat session. Common public instant message systems include AOL Instant Messenger, MSN Messenger, Yahoo! Messenger, Microsoft Exchange 2000 IM, and Lotus Sametime.

For example, a casino's active data cache identifies particularly prolific gaming customer. The active data cache forwards a notification request 608 to message center 272. The presence & notify module 626 then determines if the intended user's device is present, and the user is available. If so, message center 272 forwards an alert through IM interface 620 to IM server 630, and finally to IM client 657.

Unlike like the prior art, the active data platform is general purpose, and is substantially customizable by entering new parameters in active design process 290 and the active studio 291, as shown is FIG. 3A. Furthermore enterprise links 254, also shown in FIG. 3A, allows active data platform to quickly adapt enterprise data sources to changing near-real time BI needs.

Figure 7A:
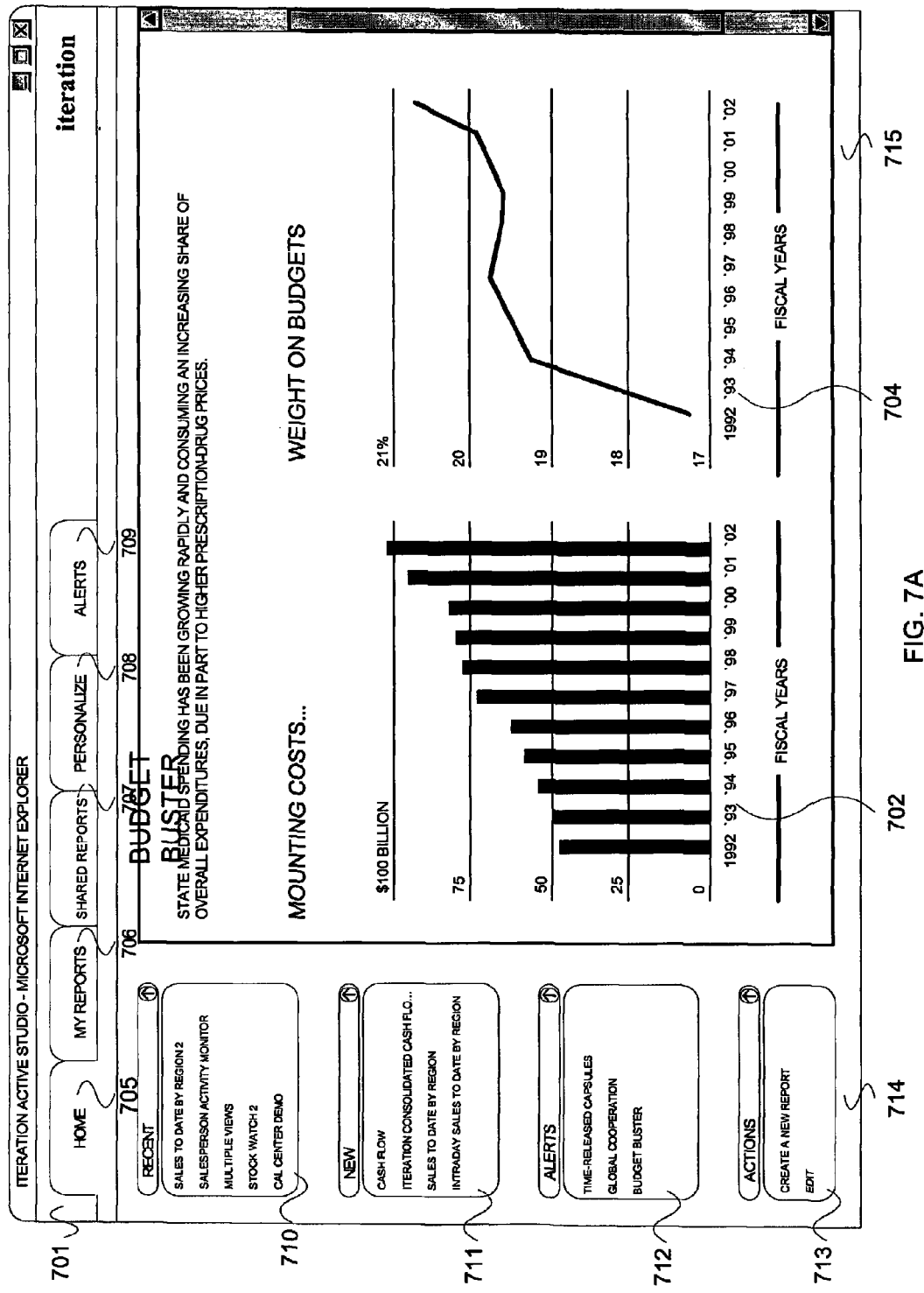
FIG. 7A-E illustrate, in accordance with one embodiment of the present invention, exemplary screen displays.

Referring now to FIG. 7A, an exemplary active studio screen display is shown according to an embodiment of the invention. This display is used by a user in order to easily manage the generation and secure delivery of data streams, reports, and alerts, without substantial additional computer programming.

The display is divided into three sections, a tab pane 701, a function pane 714, and a display pane 715. Tab pane 701 further allows the user to select one of various functional displays within active studio 304, such as: home 705, my reports 706, shared reports 707, personalize 708, and alerts 709. Home 705 comprises a summarized view of the user's most recent activities. My reports 706 comprises a summarized list of the user's created reports. Shared reports 707 comprises a summarized list of third-party reports to which the user has subscribed. Personalize 708 comprises administrative components that can allow the user to modify report delivery and display parameters. And alerts 709 comprises a summarized list of a user's active alerts.

Function pane 714 displays several functional list boxes within home 705 tab, such as: recent list box 710, new list box 711, list toolbox 712, and actions list box 713. Recent list box 710 displays the user's most recently accessed reports. The new list box 711 displays the user's new reports. The alerts list box 712 displays the user's currently active alerts. And the actions list box 713 allows the user to create and edit reports. Display pane 715 displays the corresponding result of the chose function of function pane 714. In this case, a dynamic financial report comprising a cost bar graph and a percentage change line graph. For example, if a user where to select intraday sales by region in the new list box 711, the corresponding dynamic intraday sales report would be displayed in display pane 715. As sales are booked through out the day, the sales chart would dynamically change as well.

Figure 7B:
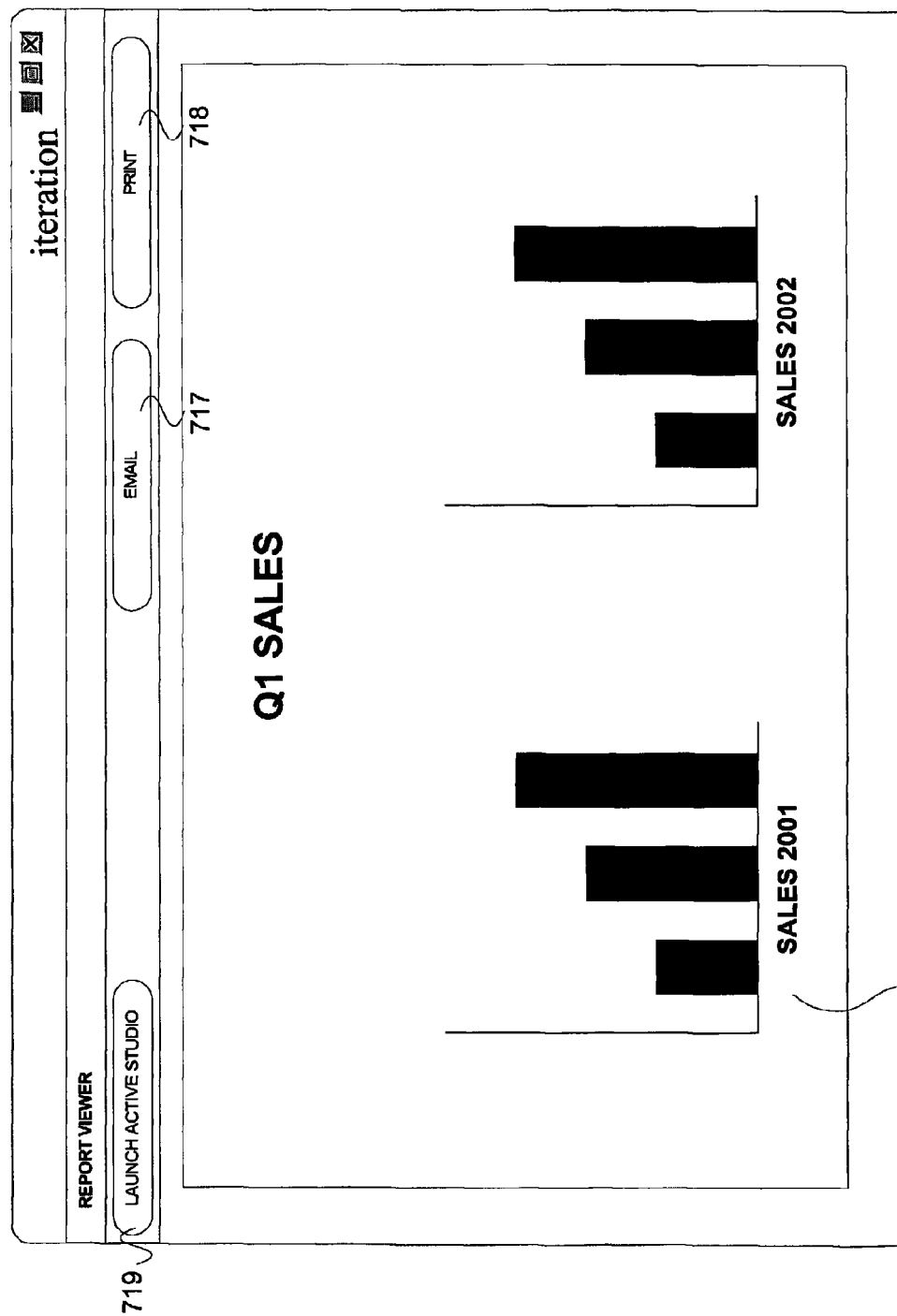

Referring now to FIG. 7B, an exemplary report viewer screen is depicted according to an embodiment of the invention. There are three functions available from this view, launch active studio 719, email 717, and print 718. Display pane 715 allows the user to view the selected report, in this case, a Q1 sales report. Launch active studio 719 allows the user to open the viewed report in the Iteration Active Studio. Email 717 allows the user to mail the viewed report to an email recipient. Print 718 allows the user to print out the viewed report on an attached printer.

Figure 7C:
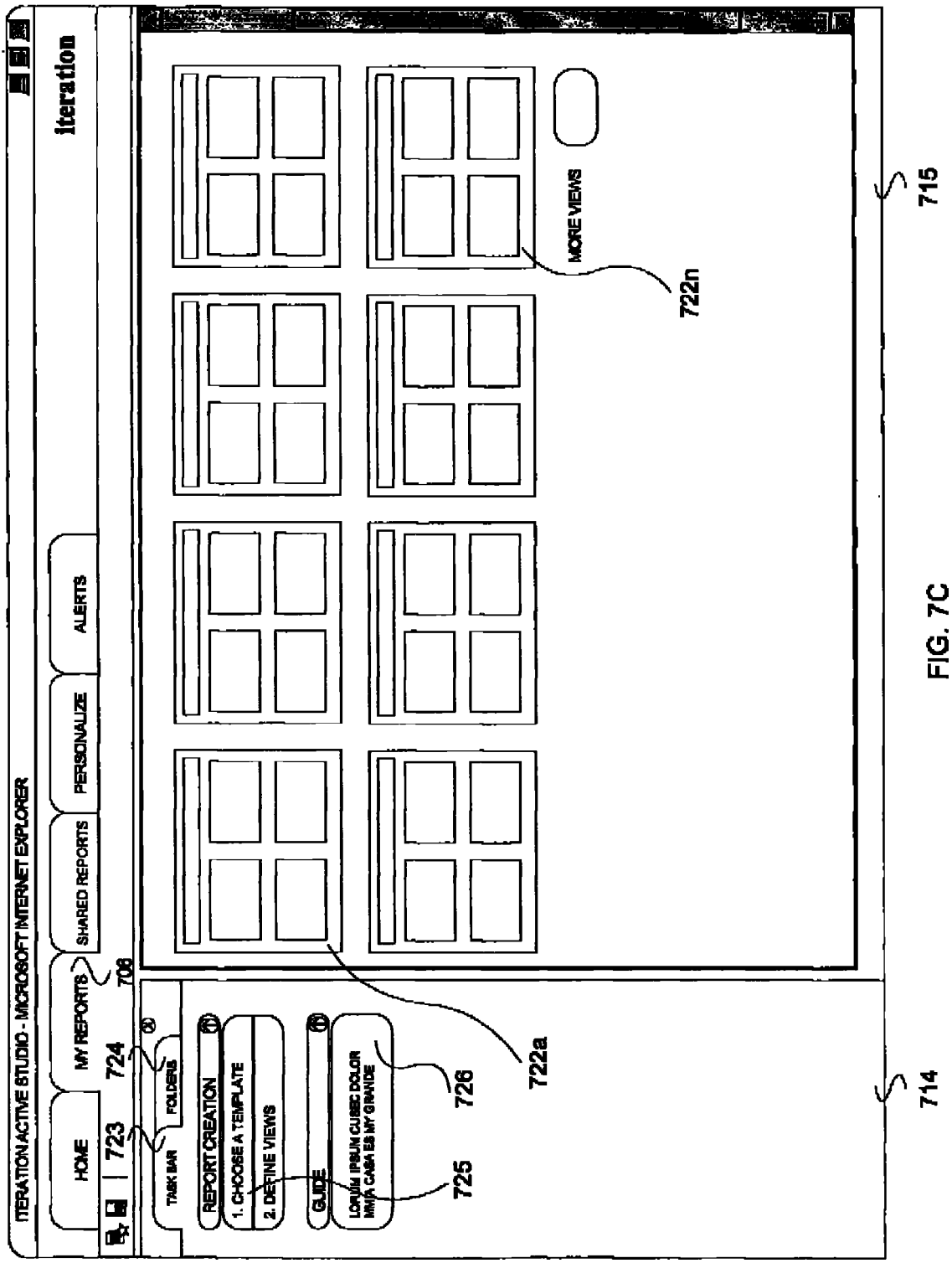

Referring now to FIG. 7C, the exemplary active studio screen display of FIG. 7A is shown with the components of my reports tab 706. Function pane 714 further displays two sub tabs, a task bar tab 723 and a folders tab 724. Task bar 723 tab allows the user to select various functions related to the current view, in this case, a report summary view. Folders 724 tab allows the user to organize created or stored reports in an hierarchical format. Two components within the task bar tab 723 are report creation 725 and guide 726. Report creation 725 allows the user to create new active data. Guide 726 provides a source of online help to the user.

Figure 7D:
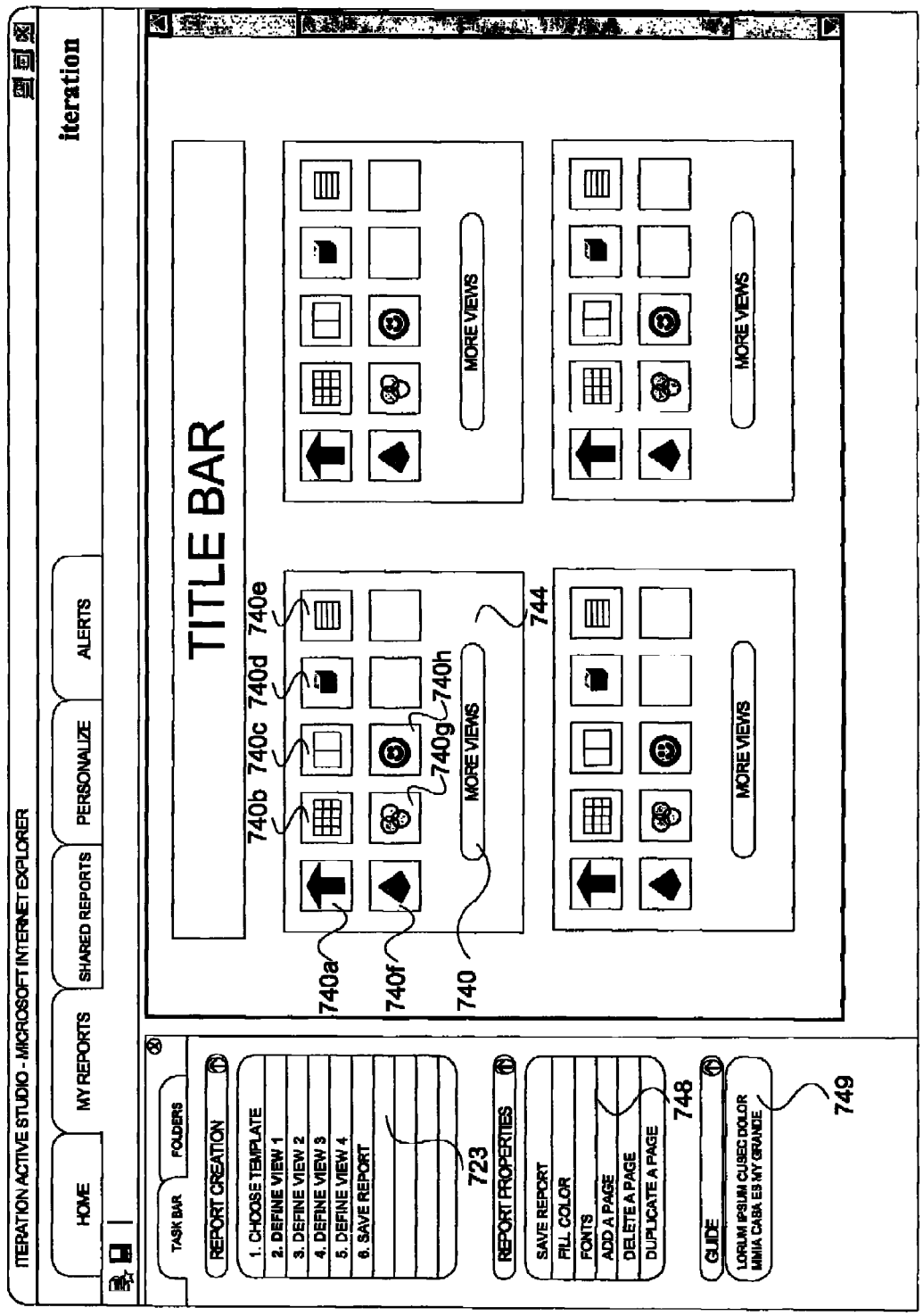

Referring now to FIG. 7D, the exemplary active studio screen display of FIG. 7C is shown with additional components of the my reports tab 706, such as the report creation toolbox 723, the report properties toolbox 748, and the guide window 749. The report creation toolbox 723 further comprises functions to easily create specific graphical views 740 of data, based on pre-defined templates. Common views are tables, pie graphs, bar graphs, line graphs, scatter graphs, columnar reports, form reports, geographic (map) views, crosstabs, and Excel integration. These views can be further modified in the report properties toolbox 748. For instance, a user can create an hourly report in which gambling customers are aggregated into different groups based on the value of their accumulated betting that day. The user selects a bar graph for the report, and changes the fill color and font type to the user's preference.

Figure 7E:
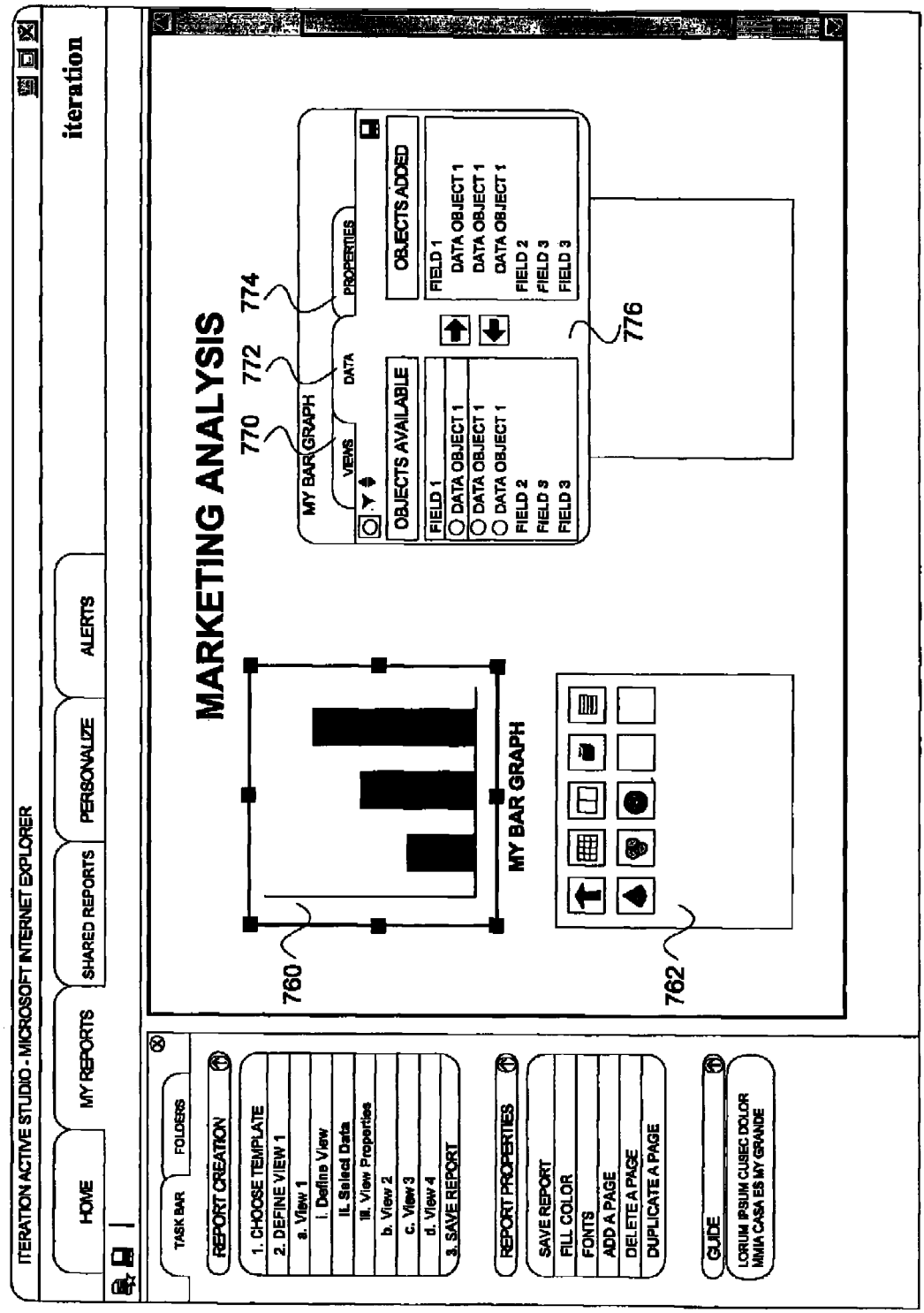

Referring now to FIG. 7E, the exemplary active studio screen display of FIG. 7C is shown with an additional example of the my bar graph 776 function window, which allows the user to further customize the selected report with specific data objects and files. In general, three types of attributes can be customized: views 770, data 772, and properties 774. Views 770 allows a user to modify the types of graphical displays available in which to view the current data, such as a bar graph, line graph, etc. Data 772 allows a user to select the specific data fields to be used in views 770. Properties 774 allows a user to modify other attributes, such as language, number formats, etc. In this case, the user has selected a bar graph template for the report, and has added four fields.

In another aspect of the invention, an Iteration instant messaging & collaboration server is advantageously employed to enable rich secure graphical collaboration in an instant messaging environment. Instant messaging systems commonly monitor the presence of devices, and availability state of users. Presence determines if the IM device is coupled to the given IM network, or at least reachable from the client. Status determines if the intended recipient is available to read and respond to the instant message. Common status categories also include descriptive information, such as "out to lunch", "busy", "away from desk", "important meeting", etc. For instance, the IM device may be turned on and available, but the user is in an important meeting and does not wish to be disturbed. The user would set the status to "important meeting," in order to notify other subscribed IM users that he will probably not respond to a text message until after the meeting.

These IM systems, however, commonly lack the capability for graphical peer-to-peer or multi-party collaboration. That is, while short text messages can be sent back and forth in an online chat meeting, there is no comparable means for sharing a graph or report. This would normally have to be compressed and transmitted ahead of time to each recipient, who would each then download, de-compress, and locally store the file. In situations where the underlying data is continuously changing, as temperatures would be in a chemical plant, and impromptu collaboration is desired, pre-mailing a graph would be very impractical, inefficient, and of marginal use to the problem at hand.

Furthermore, public IM systems are not particularly secure. They were originally designed for rapid information text conversations, called chat. IM protocols emerged and were established primarily without supervision from any standard bodies, such as the Internet Engineering Task Force. Subsequently, security was never originally considered and common instant messaging traffic is essentially unencrypted. Just about anyone on the network can secretly monitor a chat conversation.

Figure 8A:
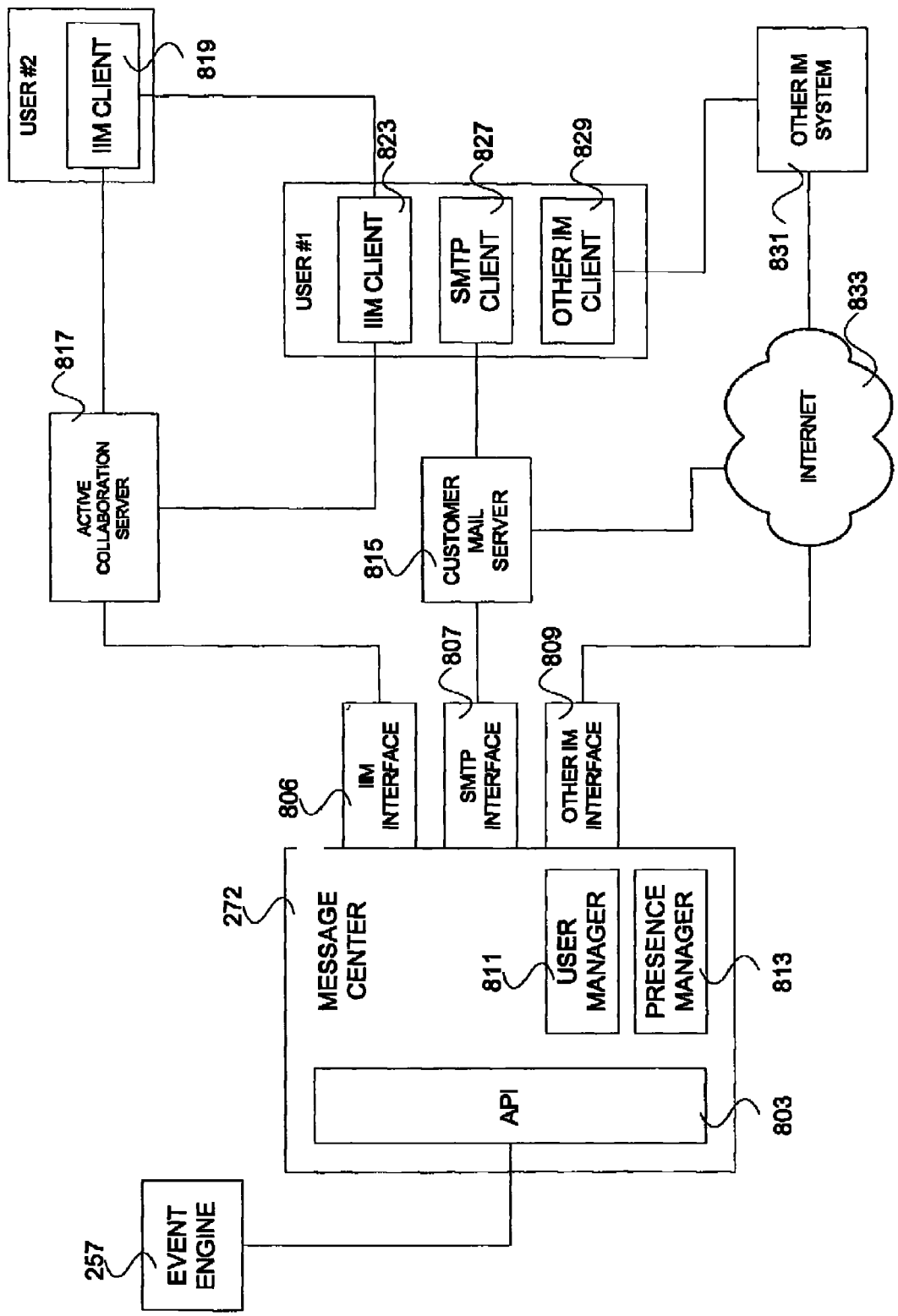
FIG. 8A-B illustrate, in accordance with one embodiment of the present invention, an active collaboration server advantageously employed to allow impromptu graphical collaboration between IM users.

FIG. 8A illustrates, in accordance with one embodiment of the present invention, an active collaboration server advantageously employed to allow impromptu graphical collaboration between IM users. As shown in FIG. 2B, event engine 257 forwards an event, such as a temperature change, to message center 272, through API 803. Event engine 257 monitors the information in active data cache 256 for pre-determined changes, or events. Message Center 272 provides messaging functionality to the active data platform, allowing reports and alerts to be sent via heterogeneous channels to a plurality of clients.

User manager 811 manages user profile information. Users create profiles based on rules, in which they describe events of which they want to be notified. Should such an event occur, user manager 811 notifies message center 272, which in turn contacts the user. Furthermore, user manager 811 selects alternative recipients, if the primary recipient is unavailable, based on user preference and availability status. For instance, user #1 has configured user manger 811 for notification of a specific event, for example a temperature change beyond a certain range. Furthermore, user #1 also wants user #2 to be notified should user #1 be unavailable. Once the event occurs, if user #1 is unavailable, message center 272 attempts to notify user #2. Presence manager 813 monitors for the availability of user devices on the network. For instance, in the previous example, user #1 has a wireless PDA and a SMS phone. If the event occurs, and the PDA is turned-off, an alert is sent to the SMS phone instead.

IIM (Iteration instant messenger) interface 806 provides an interface to the IIM client 819-823, an enhanced IM application that allows secure concurrent graphical collaboration and pen-based user input. In general, it is sometimes desirable to implement private instant messaging systems having enhanced capability (including different protocols, encryption capabilities, graphical processing/display capabilities, I/O capabilities, and/or the like) compared to public messaging systems (such as those available from Yahoo™, AOL™, and the like). IIM client is an example of a client in such a private instant messaging system.

IIM client 819-823 commonly connect through active collaboration server 817, which marshals collaboration request from multiple IIM clients, and combines connections whenever possible to improve overall system performance and scalability. Furthermore, active collaboration server 817 synchronizes the text and graphical portions of the IIM session to insure that all users view the same information at substantially the same time.

Active collaboration server 817 further enforces security protocols as implemented by the IIM client, in order to prevent unauthorized interception of the collaboration session. In one embodiment, IIM client 819-823 implements a Triple DES security protocol to protect the collaboration session and insure message integrity. Triple DES is an encryption algorithm whose security is based on a single secret key. Each key is generated (selected at random from all possible keys) for each particular collaboration session.

In another embodiment, only one user in an IIM collaboration session needs authorization to access a given alert or report. By virtue of being authenticated to the session, all other users will receive the alert or report with the security privileges of authorized user, for as long as these users participate in the session.

In addition to IIM interface 806, there is SMTP interface 807 and other IM interface 809. SMTP, or simple mail transfer protocol, is the most common protocol for sending email message on the internet. Through SMTP interface 807, message center 272 can forward email notifications with the event information to email server 815. Unlike IIM client 819-823, however, notification is not automatic. The user must first log onto mail server 815 with a SMTP client 827, such as MS Outlook and download the messages. Likewise, other IM interface 809 represents traditional IM interfaces to currently available IM systems 831, such as AOL Instant Messenger, MSN Messenger, Yahoo! Messenger, Microsoft Exchange 2000 IM, and Lotus Sametime. In contrast to SMTP, notification can be automatic, although communication is generally insecure. Furthermore, graphical collaboration is difficult.

For example, user #1 is a chemical engineer at a petroleum processing plant. He created a profile in user manager 811, in which he wants to be notified of specific event, such as a change in a process temperature beyond a certain range. The event occurs. Message center 272 forwards the notification to active collaboration server 817, through IIM interface 806. Seeing the temperature dynamically change on his device, user #1 realizes that he wants additional advice from user #2, his manager. Through his IIM device, he instructs message center 272 to initiate a request for collaboration with user #2. Receiving a collaboration request from his subordinate, user #2 accepts the connection. User #1's display is immediately rendered on User 2's device, upon which they collaborate on the matter at hand.

Figure 8B:
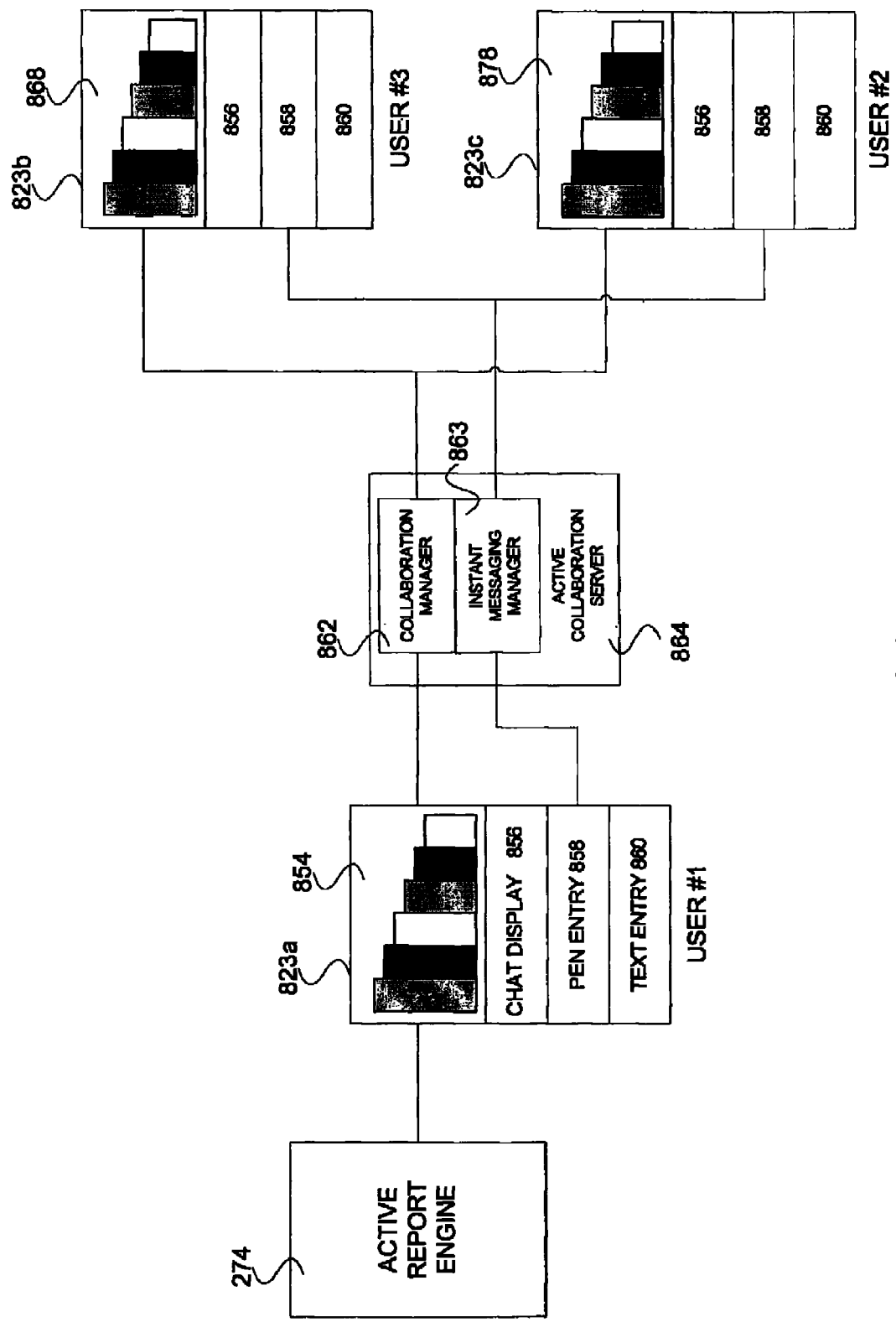

Referring to FIG. 8B, IIM client 823 and active collaboration server 817 as shown in FIG. 8A, are described in greater detail. The user interface of IIM client 823 is comprises of four panes: a graphical display pane 854, a chat text display pane 856, a pen entry pane 858, and a chat text entry pane 860. Graphical display pane 854 is the main rendering window for IIM client 823. It allows a user to make better sense of large amounts of dynamic data, presenting changing information in an easily accessible, graphical visual representation. Chat text display pane 856 displays IM messages in a formatted way, using a choice of colors and styles. Pen entry pane 858, allows the IM device to recognize a user's handwriting. Chat text entry pane 860 allows the user to enter text through a keyboard.

For example, user #1 is a network systems engineer monitoring traffic at a company's c-commerce web site. When network congestion reaches a certain point, active report engine 274 generates a report and forwards it to user #1. Realizing that customers are starting to have difficulty placing online orders, user #1 initiates a connection with user #2, the web site manager, and user #3, the customer service manager. Once both accept, user #1's display is immediately rendered on the other devices, upon which all can collaborate on the mater at hand.

Figure 9A:
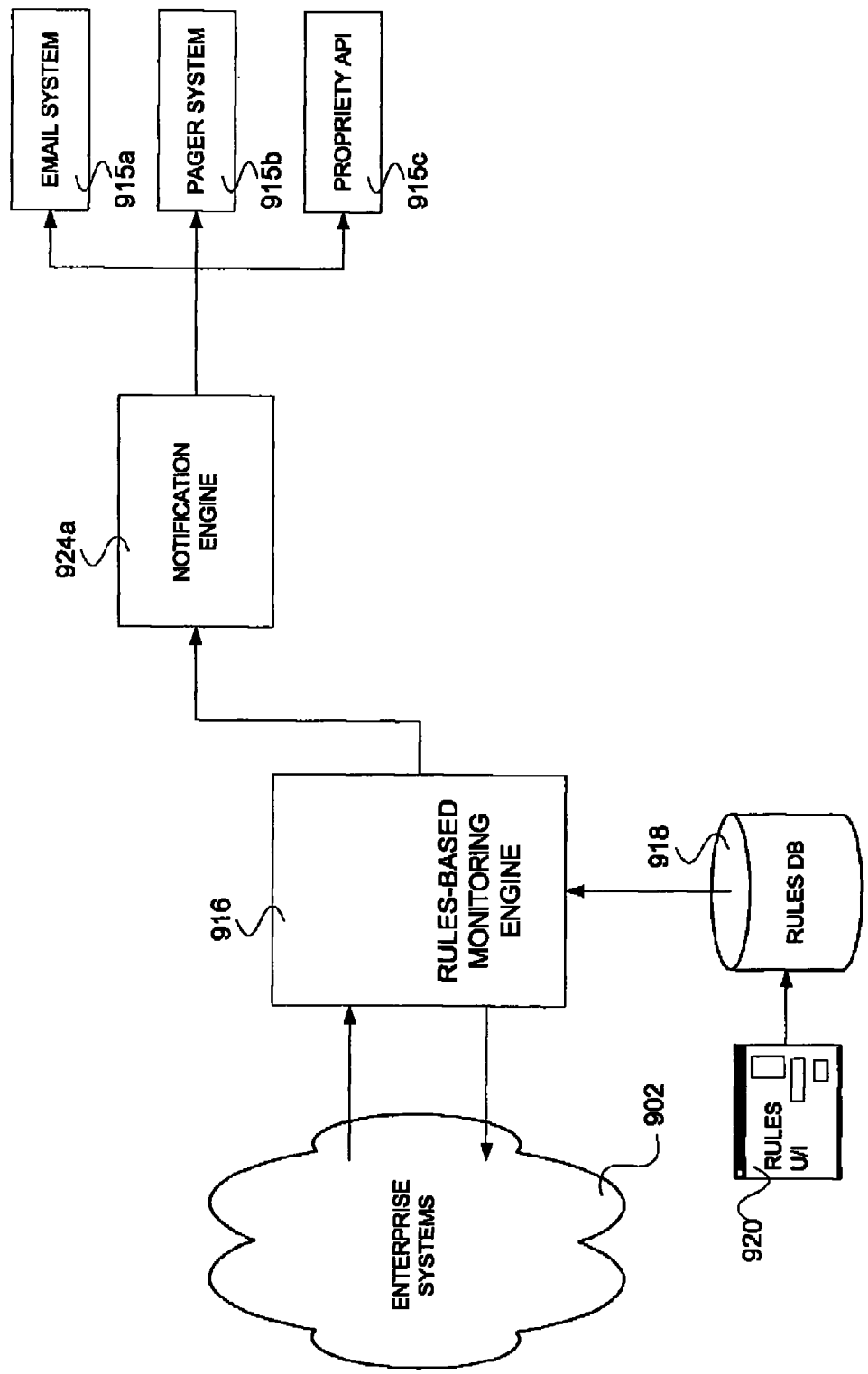
FIG. 9A-B illustrate, in accordance with one embodiment of the present invention, simplified functional diagrams of a rules-based monitoring engine with alert capability.

In another embodiment, an instant messaging manager is advantageously employed to rapidly alert intended recipients of data events. Referring to FIG. 9A, a simplified functional diagram is shown of a rules-based monitoring engine with alert capability, such as in a BI or OLAP application. Enterprise systems 902 comprise the series of applications commonly used to run and manage a business, such as OLTP, data warehouse, and OLAP. OLTP (online transaction processing) applications 902 are those enterprise systems that manage a company's basic transactions, such as order entry and billing systems. In order to conduct meaningful analysis, this information is often further placed in a more stable environment, optimized for random querying, such as a data warehouse. OLAP enables trained users to perform sophisticated ad hoc analysis of data stored in a data warehouse.

Rules-based monitoring engine 916 monitors the applications in enterprise systems 902 for pre-defined events. A rule is s pre-defined procedure comprising the event(s) to be monitored, and the subsequent action or transformation that is required. For example, the event can be a specific transaction, a change in a file size, the publishing of a report, etc. Rules U/I 920 is typically graphical application that allows a user to create sophisticated and complex rules, as well as store the rules in the rules db 918 for use by rules based monitoring engine 916. In this case, the subsequent action is an alert.

When a specific event occurs, rules-based monitoring engine 916 forwards an alert to notification engine 924*a*, which properly formats the alert and transmits it via email system 915*a*, pager system 915*b*, or another system through proprietary API 915*c*. Alerts sent to email system 915*a* can further contain an embedded link to a report generated by active reports engine 274, as shown if FIG. 2B.

For example, betting transactions would be normally stored in a casino's game transaction system. Wanting to be extra-attentive to high-rollers, a casino would configure the rules based monitoring engine 916 to observe for any customer whose betting exceeds a specified threshold, upon which an alert would be sent to the closest pit boss with an embedded link to the customer record.

Figure 9B:
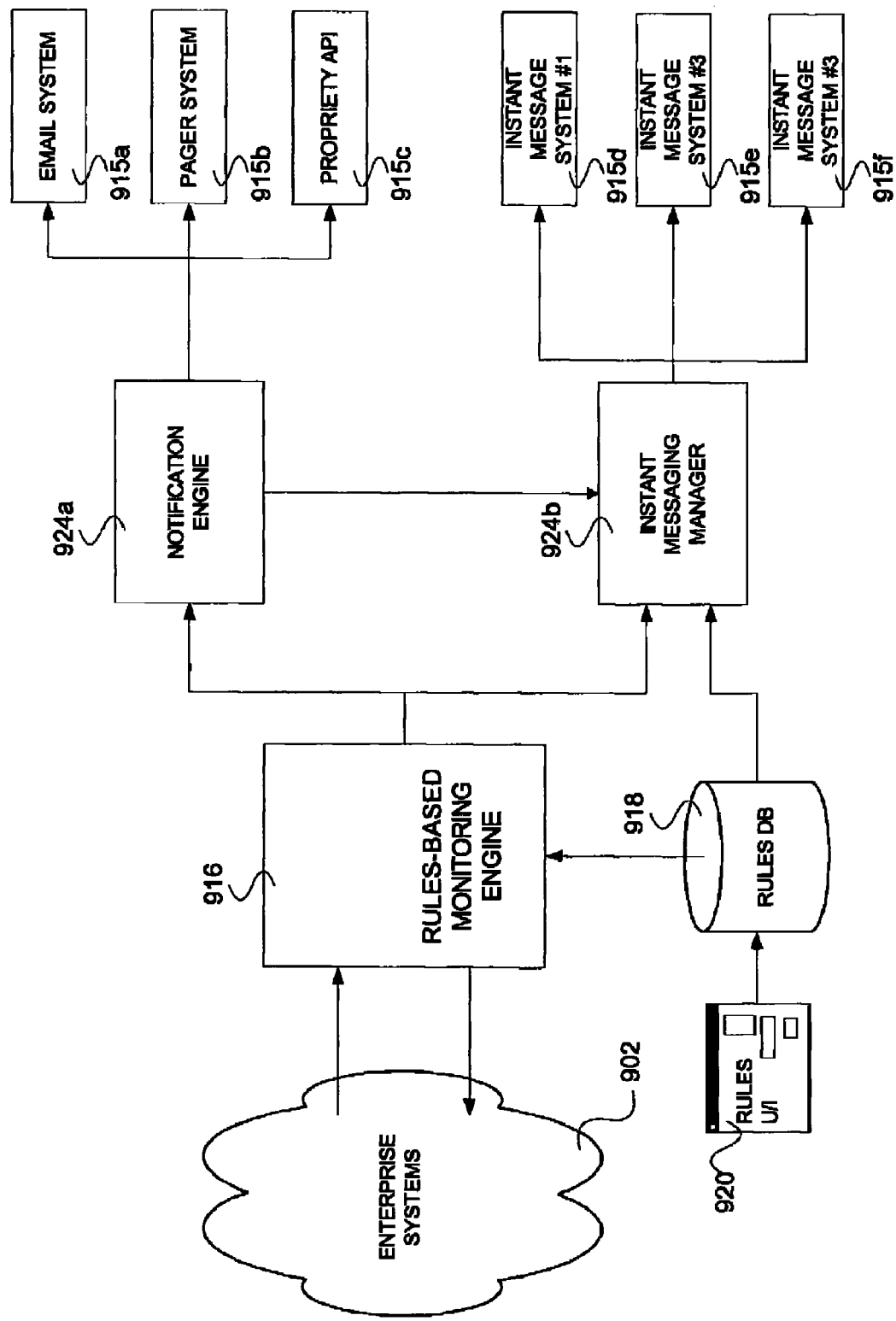

FIG. 9B, in accordance with one embodiment of the present invention, shows the simplified functional diagram of a rules-based monitoring engine with alert capability of FIG. 9A, with the addition of instant messaging manager 924*b*. Instant messaging (IM) is a means for sending small, simple messages that are delivered immediately to online users. It differs from email primarily in that its primary focus is immediate end-user delivery. Common public instant message systems 915*d-f* include AOL Instant Messenger, MSN Messenger, Yahoo! Messenger, Microsoft Exchange 2000 IM, and Lotus Sametime. Through a locally installed client application, a user can normally discover the presence of another user, and immediately begin a text conversation, or chat session. Many systems also have the capability for group chat sessions. Instant messaging manager 924*b* enables the rules based monitoring engine 916 to appear as an IM client to the various instant message systems 915. Therefore no additional software is needed, beyond the IM client application that is more than likely already installed.

As in FIG. 9A, there is shown a simplified functional diagram of a rules-based monitoring engine with alert capability, such as in a BI or OLAP application. Rules-based monitoring engine 916 monitors the applications in enterprise systems 902 for pre-defined events. Rules U/I 920 is typically graphical application that allows a user to create sophisticated and complex rules, as well as store the rules in the rules db 918 for use by rules based monitoring engine 916. In this case, the subsequent action is an alert.

Instant messaging manager 924*b* properly formats the alert as an instant message and transmits to the intended recipient through on of the various instant message systems 915*d-f*. Unlike notification engine 924*a*, however, instant messaging manager 924*b* also monitors the various instant message systems 915*d-f* for changes in state for any subscribed users. State is comprises of presence and status. Presence determines if the IM device is coupled to the given IM network, or at least reachable from the client. The given instant message system 915*d-f* normally determines the presence of individual IM clients, and broadcast the information to interested parties, such as the instant messaging manager 924*b*. Status determines if the intended recipient is able to read and respond to the instant message. Normally whether a recipient is available or not is a true or false question. However, it is common for recipients to customize the unavailable status with further descriptive information, such as "out to lunch", "busy", "away from desk", "important meeting", etc.

For instance, the IM device can be turned on and available, but the user is in an important meeting and does not wish to be disturbed. The user can set the status to "important meeting" notifying any other subscribed users that he will probably not be able to respond to the instant message until after the meeting. The rules-based monitoring engine 916, realizing that the user will not immediately read the instant message, will choose an alternative present and available user based on a pre-determined notification rule. Rules-based monitoring engine 916 can forward an alert to instant messaging manager 924b for immediate delivery to the intended recipient.

Referring now to FIG. 10A, simplified pseudo-code is illustrated as would be used by IM client manager 628, as shown in FIG. 6, to notify running processes of user status changes. In procedure 1, ProcessMessagesFromServer with a message argument, IM client manager 628 receives a message from an instant message system. It then determines whether it is a user status in procedure 7, case: UserStatuses. If so, then procedure 15 is called, Process_User_status_messages with an userStatusObjects collection argument. It then updates the user data structure at procedure 18, HashOfUserObjects.update, and subsequently notifies any active processes running on the active server platform of this status change.

FIG. 10B illustrates, in accordance with one embodiment of the present invention, simplified pseudo-code as would be used by IM client manager 628 to determine presence and status for IM clients. In procedure 1, the Boolean IsUserPresent is passed a user (i.e., IM name) and optional degree of presence arguments (i.e., available, non-available, etc.). Initially in procedure 4, if(!HashOfUserObjects.contains) with a user argument, the entered user name is compared to existing list of potential users registered with the active data platform. If not, an exception is thrown, and the procedure returns an error. If true, procedure 8, if(HashOfUserObjects[user].degree>degree) further checks to see if the optional degree of presence variable that was passed to procedure 1 is less than the degree of presence previously stored in the active data platform. The function then returns the result as either a true or false.

FIG. 10C illustrates, in accordance with one embodiment of the present invention, simplified pseudo-code as would be used by IM client manager 628 to subscribe to a specific IM user. In procedure 1, RegisterInterestInUser( ) is passed a user (i.e., IM name) and optional degree of presence arguments (i.e., available, non-available, etc.). This is passed to procedure 3, CollectionOfInterestingUsers.add, which subsequently registers interest in the user.

In another embodiment, an event engine is advantageously employed to substantially assure the examination of a report by a user. Many analytical products such as business intelligence (BI) and online analytical processing (OLAP) systems are capable of monitoring, scheduling, and broadcasting alerts via email or pager. These systems, however, cannot generally assure that the intended recipient promptly receives and reads the message. This presents a significant problem for time-sensitive information, where minutes or even seconds can make a difference.

In the current invention, the event engine monitors the state of transmitted alerts in an escalation table. Upon receipt of an alert, the user reviews the received report. This is commonly done by manually browsing for the report, or by clicking an embedded URL contained within the alert. If the user does not review the report within a specified time, the escalation table can further escalate the alert to another user based upon predefined rules. For instance, the alert is transmitted to the user's manager.

Figure 11:
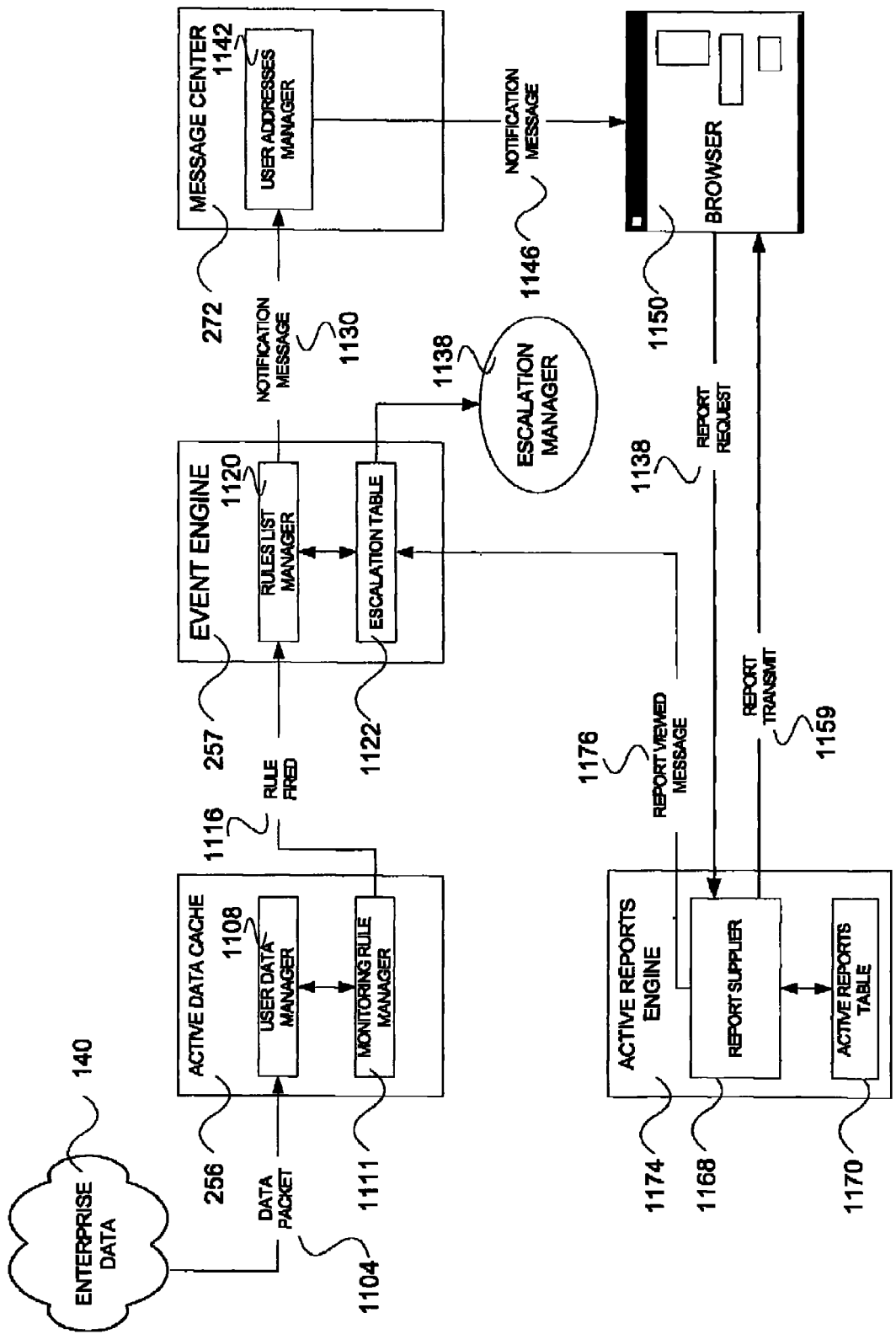
FIG. 11 illustrates, in accordance with one embodiment of the present invention, a simplified functional diagram of the active data platform with elements of the notification and escalation process.

Referring to FIG. 11, a simplified functional diagram displaying the active data platform is shown with elements of the notification and escalation process. Advantages include substantially improving alert accountability in business intelligence applications. That is, enabling the right person to receive critical information at the right time, and if not, escalating the information to the appropriate person.

Enterprise data 140 comprises those enterprise systems that manage a company's basic transactions, such as order entry and billing systems. Active data cache 256 monitors transaction data packets 1104 generated by enterprise data 140. Active data cache 256 further comprises user data manager 1108, which describes user event interest, and monitoring rule manager 1111, that analyzes data packet 1104 for specific events.

Should an event of interest occur, monitoring rule manager 111 forwards a rule fired message 1116 to the rules list manager 1120 of event engine 257. Rules list manager 1120 further comprises the subsequent actions required for the fired rule, such as the transmission of a notification message to a user, the execution of a subsequent rule, or the generation of an accountability escalation event. In this case, notification message 1130 is forwarded to message center 272. Rules list manager 1120 also places an entry into escalation table 1120, describing notification message 1130, the intended recipient, and the time the message was sent. If a report viewed message 1176 is not received within a pre-determined amount of time, a timeout occurs, and escalation table 1122 notifies escalation manager 1138, which in turn executes pre-configured escalation rules, such as notification of a different person or entity, or the calling of a web service.

Upon receiving notification message 1130, user address manager 1142 attempts to find a device address at which the user is currently available. Message center 272 further embeds a link in notification message 1146, through which the user can review the corresponding report from active reports engine 274.

The user subsequently receives notification message 1146 on his device, in this case, through a browser. If not already viewing the report, the user can either locate the report by manually entering information such as a URL, or can also simply click on an embedded link to the report.

Upon receiving a request, report supplier 1168 of report engine 274, generates the report from information in the active reports table 1170, and forwards it to user device 1150. A report viewed message 1176 is also generated and forwarded to escalation table 1122, which in turn deactivates the previous notification message entry.

For example, a large multi-site manufacturing organization, such as Ford Motor Company, would configure the active data platform to monitor manufacturing processing information, such as increasing part reject rates, or outright machine failures. Should a machine failure actually occur, an alert is forwarded to the appropriate manufacturing process engineer. The alert would contain an embedded link to the specific machine's status report, as generated by active reports engine 274. If the process engineer did not review the report within a few minutes (or any time period specified), a new alert would be immediately forwarded to the local plant manager for immediate action.

Figure 12:
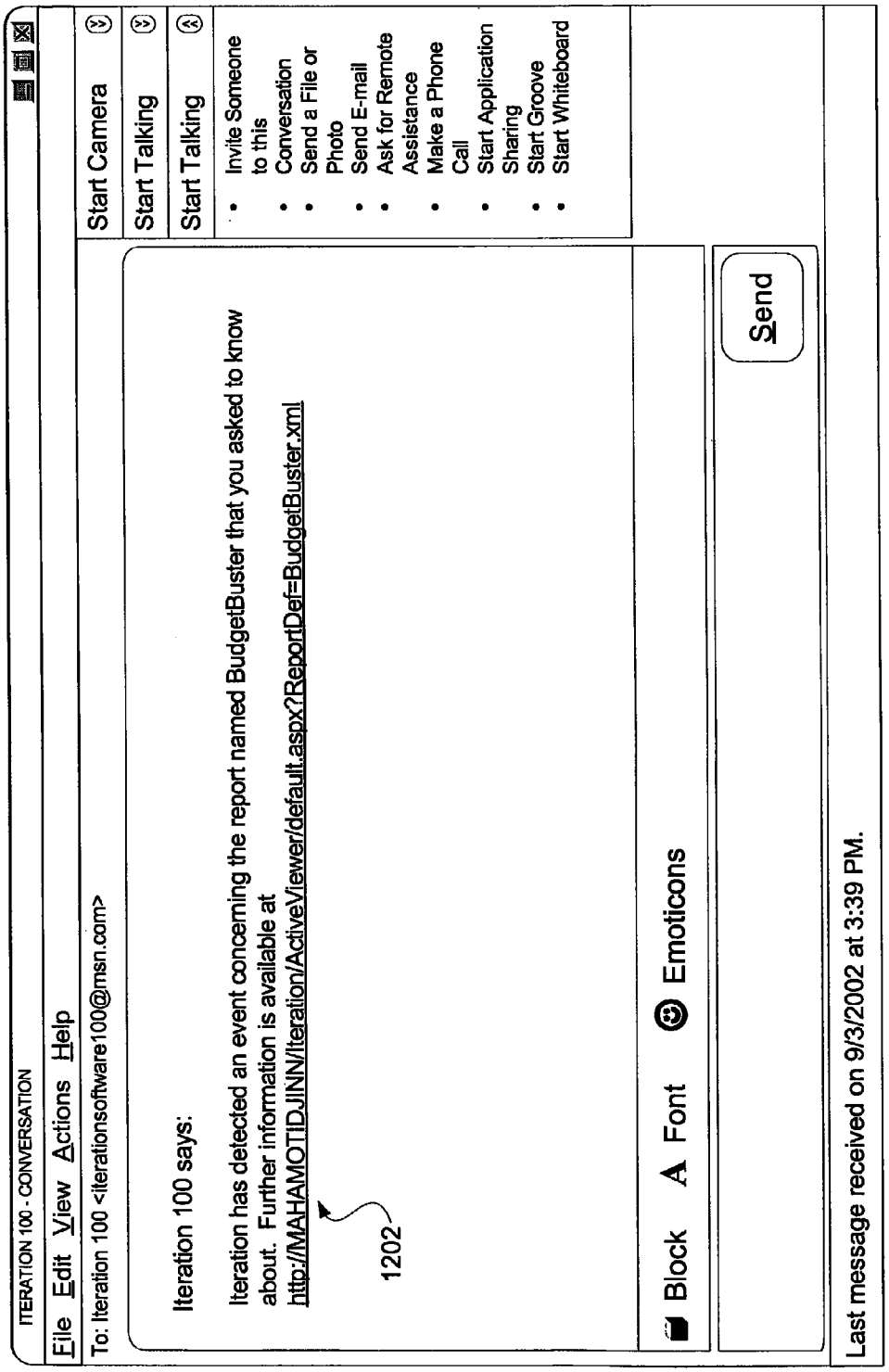
FIG. 12 illustrates, in accordance with one embodiment of the present invention, a simplified diagram of a common instant messaging client displaying a notification message.

Referring to FIG. 12, a simplified diagram of a common instant messaging client displaying notification message 1146 is shown in FIG. 10. In this case, an alert message with a link 1202 to the budgetbuster report is shown. Upon clicking link 1202, a report would open in a new browser window. Furthermore, a report viewed message 1176 would be generated and forwarded to escalation table 1122, as shown in FIG. 10.

In accordance with one aspect of the present invention, rule evaluation is advantageously distributed in order to improve efficiency. To further elaborate, a rule often comprises multiple interdependent components (i.e., event, constraint, condition, and action) that must be evaluated and acted upon.

The first component of a rule is the event, which specifies the event of interest. An example of an event is when the sales volume exceeds 5,000 units. If the sales volume exceeds 5,000 units, the event component is satisfied.

The second component of a rule is the constraint, which specifies the parameters that must be satisfied before evaluating an event and/or a condition and/or before applying the rule. A constraint is usually provided for efficiency reason and commonly comprises dates, times, and/or frequencies. For instance, if the specific event described in the event clause (e.g., sales volume in the previous example) does not need to be monitored over the weekend or between certain times or more often than a given frequency, then the constraint clause would instruct the event engine to that effect. Typically a constraint is evaluated to be either true or false. In one embodiment, if the constraint is evaluated to be false by the event engine, the satellite evaluation engine is informed accordingly and does not even need to spend its resources evaluating the event. Advantageously, efficiency is improved.

The third component of a rule is the condition, which further specifies other attributes relevant to the specific event, which attributes must be satisfied before the action associated with the rule may be taken. In the previous example, the condition may be to take action only if the sales volume that fires the event is achieved without any special promotion in place. Generally speaking, all conditions may be thought of as events but not all events are conditions.

The fourth component of a rule is the action, which determines the course of action taken should the event, constraint and/or condition components are satisfied. For instance, the sending of a notification to a specific person may be an action that needs to be taken if, as in the previous example, during a weekday (constraint satisfied), the sales volume exceeds 5,000 units (event satisfied) and the sales volume is achieved without any special promotion in place (condition satisfied).

It should be noted that a rule typically includes an action but a rule does not require all three other components, i.e., event, condition, and constraint. A rule may have one, two, or three of these components as desired by the rule designer. Furthermore, each of the event, condition, constraint, and action components may be a complex Boolean operation comprising multiple sub-components. A preferred embodiment, however, is a single event component per rule.

For example, an event may be satisfied if sales volume is greater than 5,000 and the total revenue is greater than $10,000 (a Boolean operation of two sub-events).

In order to reduce design complexity, a common solution has been to evaluate and execute these rules in a centralized event engine. It is found, however, that the information that needs to be monitored and evaluated can be found anywhere on the enterprise network. It is often the case that the information that must be monitored and evaluated (e.g., the event or condition) may be distributed in one or more machines (such as servers) remote from the computer executing the centralized event engine. In some cases, only 5% of the information may be relevant to a particular rule. Yet when the rule evaluation is centralized, all the data that needs to be monitored and evaluated must be transmitted across machine and/or process boundaries for the centralized event engine to perform its rule evaluation task. In a networked environment, the remaining 95% of the information that is needlessly sent represents an inefficient use of scarce network resources and bandwidth, as well as a detriment to performance.

In accordance with one embodiment of the invention, rule evaluation is distributed in one or more satellite evaluation engines local to or closer to the origin of the monitored information. The evaluation is distributed in satellite evaluation engines that are in communication with an event engine. Distributed rule evaluation allows the evaluation of a rule to take place with reduced bandwidth usage and delay. Since active data and the timely report/notification responsive to active data are important aspects of the active data platform, minimizing delay is an important consideration, and the distributed evaluation mechanism substantially furthers that goal.

To facilitate the implementation of distributed rule evaluation, it is highly preferable that a universal rule syntax be developed that allows the event engine to analyze any given rule and decides which portion of the rule should be distributed and which portion of the rule should be processed by the centralized event engine.

In accordance with one embodiment of the invention, a rule syntax is developed in which the four components of a rule (event, constraint, condition, action) are specified as clauses in a specific order to facilitate parsing.

For example, the following is a simplified example of a rule that may be executed:
 Clause 1: ON viewset.changed("QTD Sales")
 Clause 2: WITH OnlyDayWeek("MON-FRI")
 Clause 3: IF Time.Between(9,17) AND Date.EndofQuarter( )
 Clause 4: DO notify.send("Joe", "email")

Clause 1 describes the event to be executed by the satellite evaluation engine, in this case, the viewset application. The event is a change to QTD Sales information. Clause 2 comprises the constraint clause. It describes that the event will only be monitored from Monday to Friday. Clause 3 comprises the condition, further qualifying the situation that occasions the firing of the action. In this case, if the time was between 9:00 a.m. and 5:00 p.m. (i.e., 1700 hrs), and if the date corresponds to the end of the quarter. Clause 4 describes the action. In this case, the action is to send an email to user named Joe if the event, constraint, and condition are satisfied. Of course, these four components may be ordered in a different order if another syntax construct so dictates.

In accordance with one embodiment of the present invention, a rule is parsed to one or more core events, which are then distributed to one or more appropriate satellite evaluation engines to facilitate evaluation of the distributed event(s). In the previous example, the rule may be parsed and the event pertaining to the sales volume may be distributed to, for example, the satellite evaluation engine associated with the active data cache. The satellite evaluation engine then evaluates the monitored data (sales volume in this example) and communicates the result (which may be simply true/false or may include pertinent sales volume data) back to the event engine. Meanwhile, the event engine is offloaded from the task of handling that rule until the event is satisfied.

To further improve efficiency, the centralized event engine may not even parse all components of a rule until the event is satisfied. Thus, if an event is never satisfied, no resource has been wasted parsing the entire rule and preparing the centralized event engine and/or the satellite evaluation engine(s) to handle the other components (which may never need to be handled if the event is never satisfied). Further, the satellite evaluation engine may only send information back to the event engine if the event evaluates to be true. Thus, if the sales volume is below 5,000 in the previous example, no message is sent from the satellite evaluation engine to advantageously avoid wasting bandwidth. Of course, as mentioned earlier, the evaluation of an event may be held off by the satellite evaluation engine to further avoid wasting resource unless the constraint is evaluated to be true by the centralized event monitor.

If the event is evaluated to be true at the satellite evaluation engine (and assuming any applicable constraint is also evaluated to be true), the satellite evaluation engine informs the centralized event engine, which may then evaluate the condition using either the same or another satellite evaluation engine or using the centralized resource. If the same or a different satellite evaluation engine is also used to evaluate a condition, the event monitor may send out the parsed condition and ask for the result of the evaluation of the condition. As the exemplary syntax above indicates, each of the event, constraint, condition, and action may be (but not required in all cases) implemented as a function. Distributing rule evaluation thus may comprise using the appropriate satellite evaluation engine to make the required function call.

Figure 13:
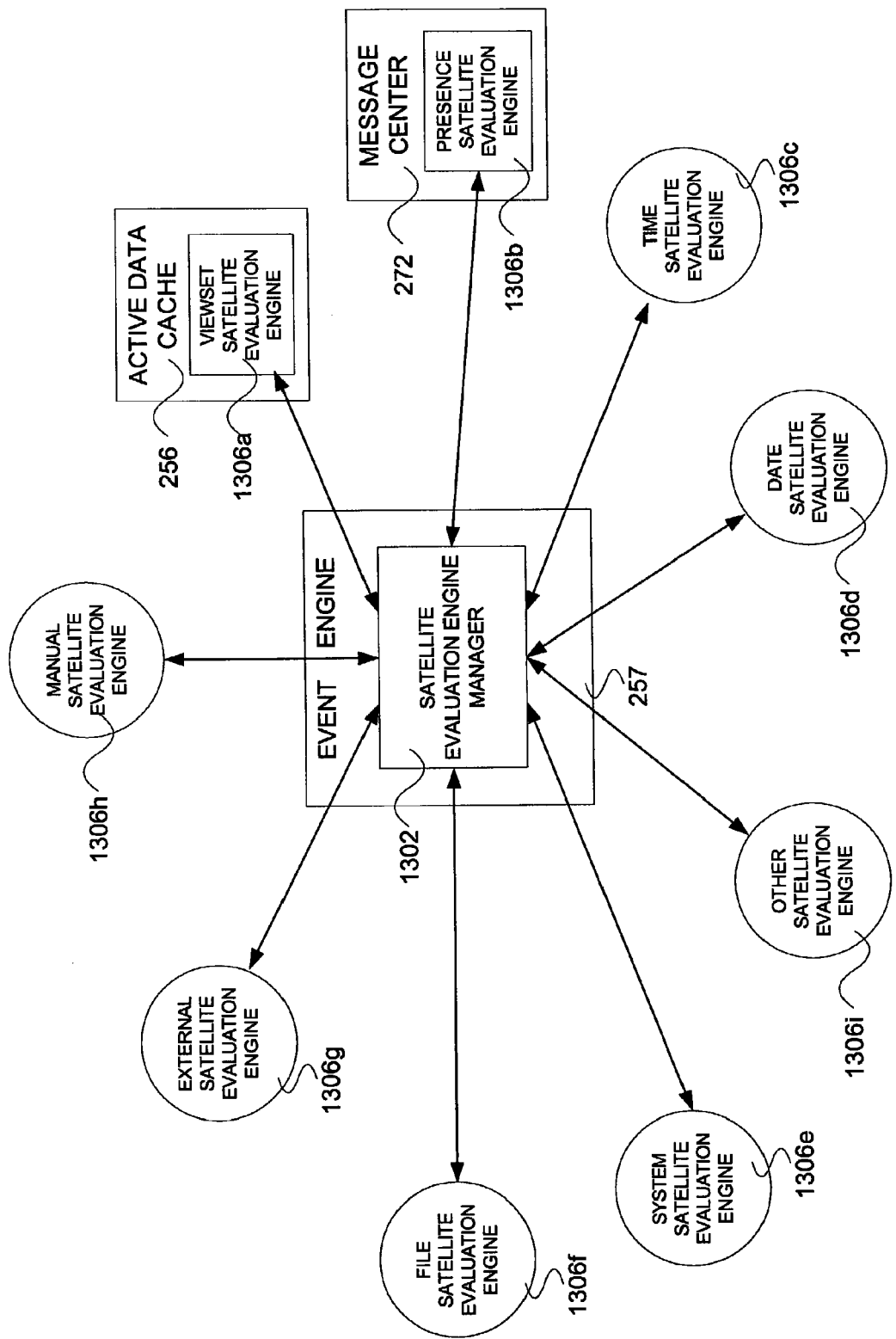
FIG. 13 illustrates, in accordance with one embodiment of the present invention, a simplified functional diagram of an active data platform in which distributed rule evaluation is implemented.

Referring to FIG. 13, in accordance with one embodiment of the present invention, a simplified functional diagram illustrating the more relevant components of an exemplary active data platform in which distributed rule evaluation is implemented. Event engine 257 employs a satellite evaluation engine manager 1302 to distribute and manage the evaluation of certain components of a rule in one or more event satellite evaluation engines. The distributed evaluation results are then received by monitor manager 1302 for use by event engine 257.

Satellite evaluation engines 1036a-1036h are some exemplary satellite evaluation engines employed by the active data platform of FIG. 13. Viewset satellite evaluation engine 1306a observes changes to database data objects, such as the modification of a database filter or certain change in the data in the active data cache. Presence satellite evaluation engine 1306b observes changes to the availability of devices and the status of users. Time satellite evaluation engine 1306c observes time changes. Date satellite evaluation engine 1306d observes dates changes. System satellite evaluation engine 1306e observes changes to the underlying operating systems or applications, for instance, a change in the virtual memory or a cache miss. File satellite evaluation engine 1306f observes changes to a given file as stored in a file system. External satellite evaluation engine 1306h observes externally generated events through an API. These external events can be used for integration with other applications.

Other satellite evaluation engine 1306i represents additional events that can be programmatically monitored by event engine 257.

In accordance with another embodiment of the present invention, there is provided a universal function call syntax to facilitate the task of distributing certain aspects of rule evaluation to one or more satellite evaluation engines. As discussed above, the rule syntax allows an event, a constraint, a condition, or an action to be specified as a function. Thus, the function call syntax may have the following construct:

satname.funcname (argument$_1$, argument$_N$)

where satname is the name of the satellite evaluation engine. Funcname, which is separated from satname by a symbol such as a dot, is the name of the function. The arguments represent optional arguments of the function.

By creating a universal function call syntax, the invention substantially simplifies the task of specifying that a particular satellite evaluation engine should handle a particular event or condition. Furthermore, the function syntax improves scalability in that when a new satellite evaluation engine is added to the system, only the satellite evaluation engine name needs to be changed and the remainder of the syntax may be reused. Also, if a new event or condition is specified vis-à-vis an existing satellite evaluation engine, only the function name needs to be changed.

In one embodiment, a rule template library may be provided to allow users to leverage on work done by others. A rule template is simply a rule with certain argument(s) not completely specified. For example, a rule template may specify that if the sales volume exceeds 5,000 on a weekday and no special promotion is involved then notify person X. In this case, person X represents the argument that remains to be filled out to turn the rule template into a rule instance. In this example, the filling out of the person may be automatically accomplished by filling in the missing argument with the identity of the user accessing the rule template. In other cases, the missing arguments may be filled out by the user wishing to employ the rule template.

Of course the user can always edit existing rules (i.e., complete rule instances) to fit his needs. For example, the user can access an existing report and edit the rules therein to modify the arguments related to the event, condition, constraint, and/or action so that the newly created report would contain the information needed. The universal rule syntax renders it simple to implement rule templates and makes it easy for users to convert a rule template to a rule instance or to modify an existing rule to fit his needs.

In another aspect of the current invention, an active data architecture is advantageously employed to maintain application execution over an intermittent network connection. In one embodiment, the intermittent network connection is a wireless network, such as 802.11b. In another embodiment, the intermittent network connection is a wired network, such as Ethernet. In another embodiment, the data transmitted on the intermittent network connection is XML. In another embodiment, the data transmitted on the intermittent network connection is DHTML.

Modern data networks, such as the Internet, allow packets to arrive at their destination by multiple paths. However, since different portions of the network may be congested to different degrees, transmitted packets can sporadically arrive. Should the arrival delay between successive packets become sufficiently long, an intermittent connection results. Furthermore, in wireless networks, an intermittent network connection may also be caused by ambient radio interference, or by dead pockets, caused by multi-path. Multi-path is interference caused when signals bounce around between obstructions, creating multiple reflections of the same signal. Small changes in the spatial relationship between the transmitter and the receiver (i.e., by walking around) can substantially alter the extent of multi-path interference, and the subsequent degree of network connection intermittence.

For many applications, such as static web pages, an intermittent network connection is tolerable. Though potentially bothersome to a user, the utility of the web page is generally not diminished by the waiting a few minutes. For others, such as streaming applications, an intermittent network connection is problematic. These applications may require a continuous supply of packets in order to properly function, since they are generally designed to receive, buffer, render, and discard packets over a period of time. And although buffering a surplus of packets may improve perceived latency, upon depletion, the streaming application can freeze and even drop the connection altogether. Since this often requires the connection to be actively reestablished, should a user be subsequently preoccupied, reestablishment of the connection could be substantially delayed. Furthermore, in situations where the streaming information may be both urgent and dynamic, such as with active data, an opportunity for the user to react may be entirely lost.

A more optimum solution may be to provide functionality that allows the streaming application to temporarily pause and passively re-establish the connection for the user. In one embodiment, the streaming application comprises a communications browser window coupled to a rendering browser window, wherein the communications browser window maintains the connection, and the rendering browser window renders the received data stream. In yet another embodiment, this coupling is established through Microsoft JScript. In yet another embodiment, this coupling is established through Javascript. In yet another embodiment, the data stream is comprised of a set of event notifications. In yet another embodiment, the last rendered display is statically maintained during the reconnection period. In yet another embodiment, the user is notified that the connecting was lost.

Figure 14:
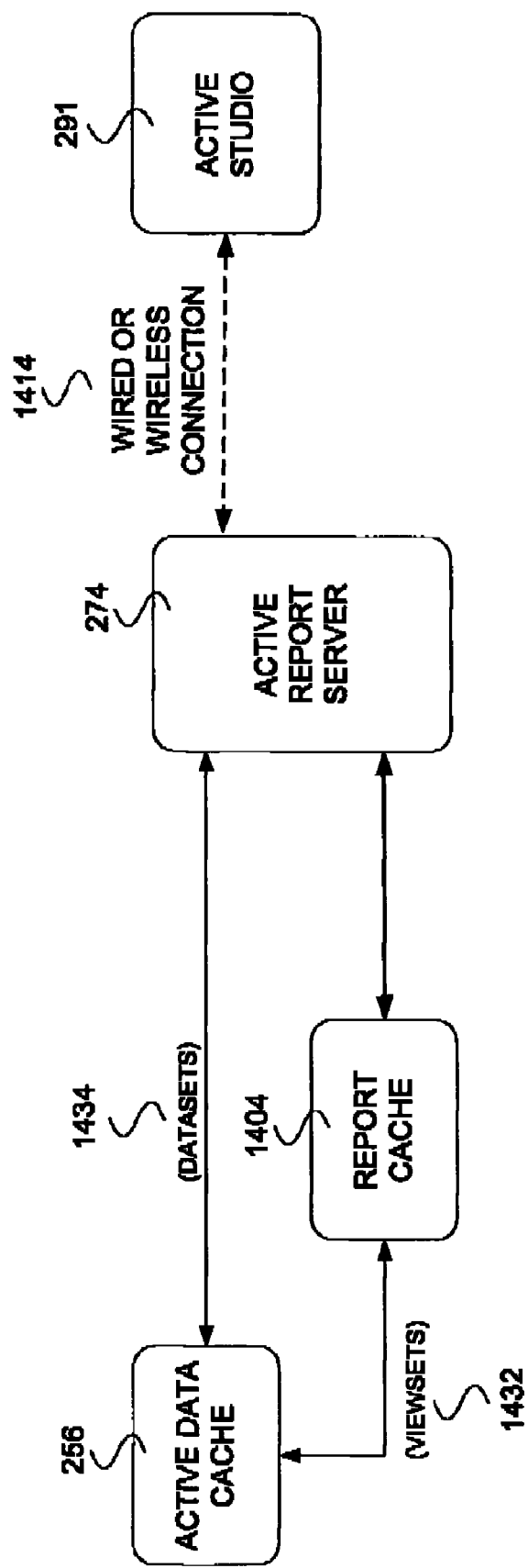
FIG. 14 illustrates, in accordance with one embodiment of the present invention, a simplified functional diagram displaying elements of the active data platform.

FIG. 14 illustrates, in accordance with one embodiment of the present invention, a simplified functional diagram displaying elements of the active data platform 210, as shown in FIG. 2B. As previously described, active data cache 256 is the core repository for the active data platform. Active data cache 256 provides datasets 1434 and viewsets 1432 to active report server 274, which are in turn, are forwarded to active studio 291. Active report server 274 can convert the received data into a format suitable for rendering on active studio 291, such as DHTML. Datasets 1434, used to produce data streams, are dynamic de-normalized representations of information in active data cache 256. Viewsets 1432, used to product reports, are static de-normalized representations of information in active data cache 256. They commonly comprise an initial snapshot of a recordset in combination with periodic active data updates. Each of these, in turn, is forwarded from active report server 274 to active studio 291, through connection 1414. In one embodiment, this connection is wired (i.e., Ethernet). In another embodiment, this connection is unwired (i.e., 802.11b). In an effort to further optimize active data cache 256 performance, viewsets can be stored in report cache 1404, which is coupled between active data cache 256 and active report server 274. If the connection is lost, between active studio 291 and active report server 274, the last received copy of the data is retransmitted.

Active studio 291 is further comprised of communications browser window coupled to a rendering browser window, wherein the communications browser window maintains the connection, and the rendering browser window renders the received data stream. In one embodiment of the present invention, a first rendering browser window establishes the connection by rendering an initial web page. The rendering browser window, in turn, instantiates a second communications browser window to receive and then forward updates to the rendering browser window. However, unlike in a common web page, the communications browser window maintains an open connection, never fully receiving the web page from the web server (e.g. since periodic active data updates are being received). Should the connection be interrupted (generating a JScript onload event), the communications browser may automatically attempt to reestablish the connection, and reload the web page again.

Figure 15A:
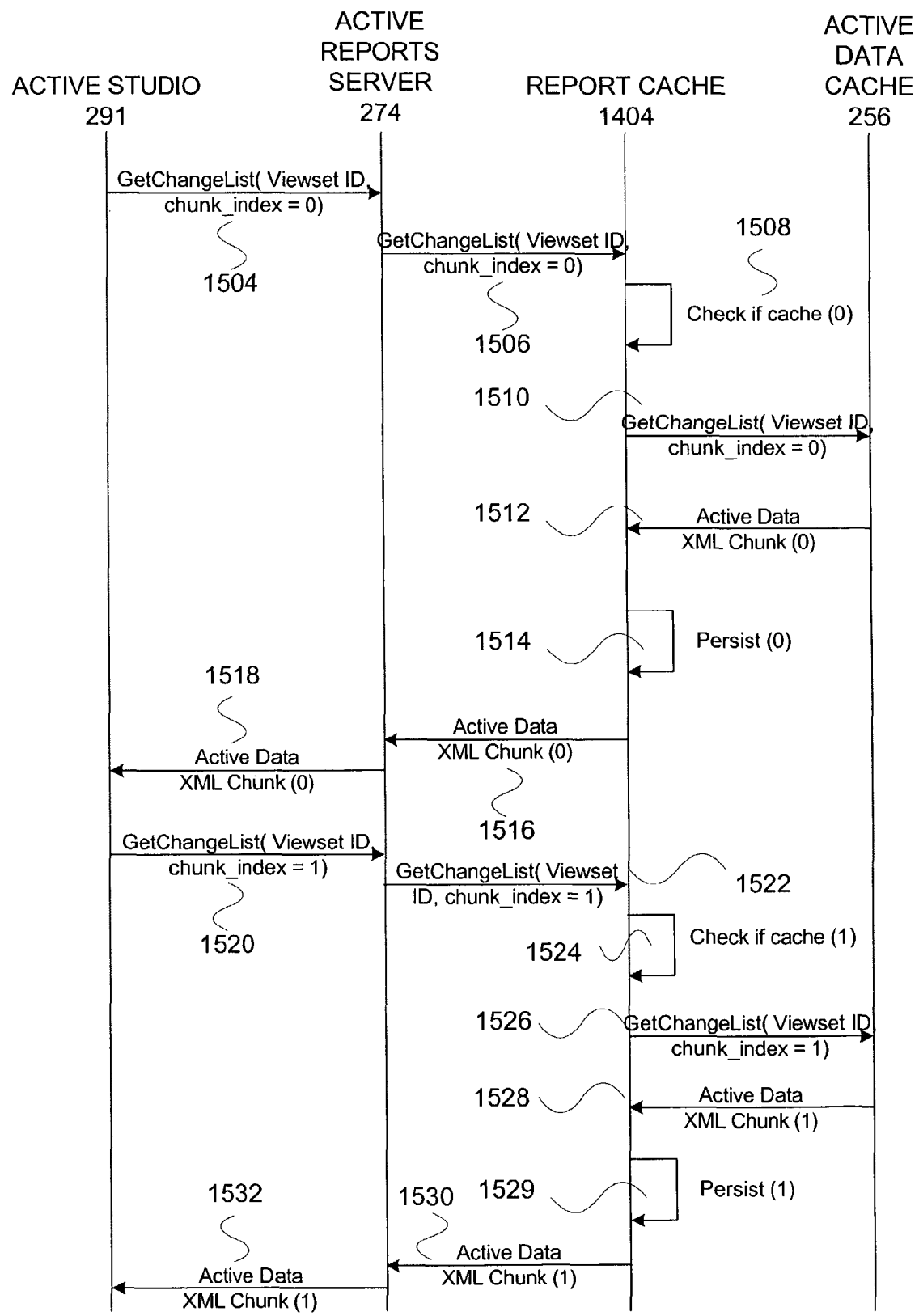
FIG. 15A illustrates, in accordance with one embodiment of the present invention, a simplified functional diagram showing a sequence transactions for maintaining application execution over an intermittent network connection.

FIG. 15A illustrates, in accordance with one embodiment of the present invention, a simplified functional diagram showing a sequence transactions for maintaining application execution over an intermittent network connection. For instance, an active studio application receiving a data stream on a tablet PC with a wireless connection.

The functional components shown in FIG. 15A are presented horizontally for the purposes of illustration (i.e., active studio 291, active reports server 274, report cache 1404, and active data cache 256). Once the connection has been initialized, active studio 291 requests a segment of data, or a chunk, from active reports server 274 at step 1504 (GetChangeList (Viewset ID, chunk_index=0)). Since in this example, it is the initial chunk, the chunk_index number is 0. Active reports server 274, in turn, forwards the request at step 1506 to report cache 1404. Report cache 1404 then determines if it contains the requested segment of data at step 1508 (Check if cache (0)). Since it is the first request, the segment is not available. Report cache 1404, in turn, forwards the request at step 1510 to active data cache 256. Active data cache 256 generates the chunk and forwards it back to report cache 1404 at step 1512 (Active Data XML Chunk (0)). Report cache 1404 forwards the chunk to active reports server 274 at step 1516, as well as maintaining a local cached copy at step 1514 (Persist (0)). Active Reports server 274, in turn, forwards the chunk to active studio 291 at step 1518.

The process would again be repeated for the next chunk of data. That is, active studio 291 requests the next segment of data, or a chunk, from active reports server 274 at step 1520 (GetChangeList (Viewset ID, chunk_index=1)). Active reports server 274, in turn, forwards the request at step 1522 to report cache 1404. Report cache 1404 then determines if it contains the requested chunk of data at step 1524 (Check if cache (1)). Chunk 1 is not available in the cache, since it is the first time that the chunk has been requested. Report cache 1404, in turn, forwards the request at step 1526 to active data cache 256. Active data cache 256 generates the chunk and forwards it back to report cache 1404 at step 1528 (Active Data XML Chunk (1)). Report cache 1404 forwards the chunk to active reports server 274 at step 1530, as well as maintaining a local cached copy at step 1529 (Persist (1)). Active Reports server 274, in turn, forwards the chunk to active studio 291 at step 1532. The process would again be repeated for the next chunk of data.

Figure 15B:
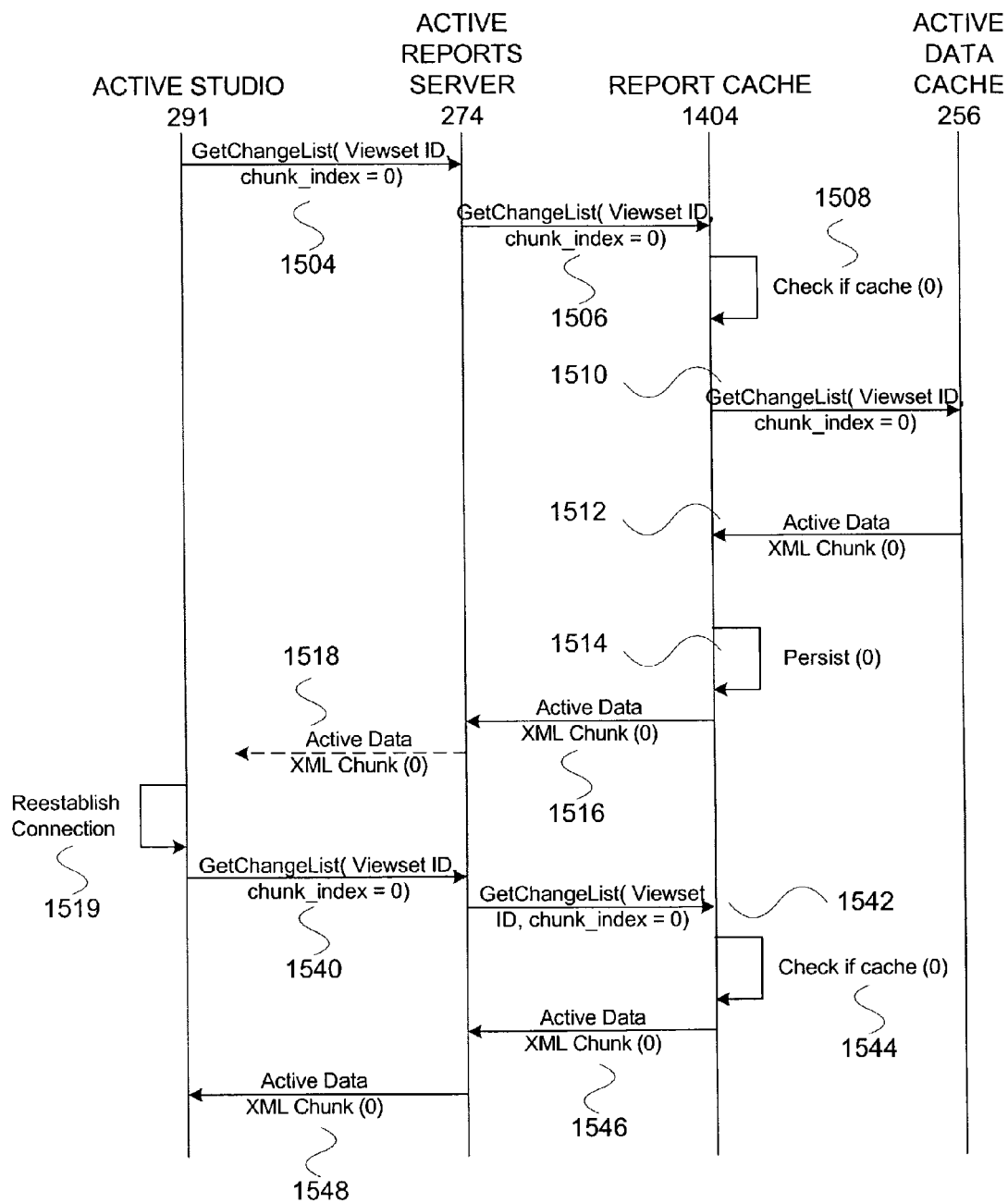
FIG. 15B illustrates, in accordance with one embodiment of the present invention, a simplified functional diagram showing a sequence transactions in which a connection is reestablished in intermittent network connection.

FIG. 15B illustrates, in accordance with one embodiment of the present invention, a simplified functional diagram showing a sequence transactions in which a connection is reestablished in intermittent network connection. As in FIG. 15A, the components are presented horizontally for the purposes of illustration (i.e., active studio 291, active reports server 274, report cache 1404, and active data cache 256). Once the connection has been initialized, active studio 291 requests a segment of data, or a chunk, from active reports server 274 at step 1504 (GetChangeList (Viewset ID, chunk_index=0)). Since in this example, it is the initial chunk, the chunk_index number is 0. Active reports server 274, in turn, forwards the request at step 1506 to report cache 1404. Report cache 1404 then determines if it contains the requested segment of data at step 1508 (Check if cache (0)). Since it is the first request, the segment is not available. Report cache 1404, in turn, forwards the request at step 1510 to active data cache 256. Active data cache 256 generates the chunk and forwards it back to report cache 1404 at step 1512 (Active Data XML Chunk (0)). Report cache 1404 forwards the chunk to active reports server 274 at step 1516, as well as maintaining a local cached copy at step 1514 (Persist (0)). Active Reports server 274, in turn, forwards the chunk to active studio 291 at step 1518.

At this point, however, the connection is interrupted and subsequently reestablished at step 1519. The last chunk that was received is once again requested at step 1540, (GetChangeList (Viewset ID, chunk_index=0)). Active reports server 274, in turn, forwards the request at step 1542 to report cache 1404. Report cache 1404 then determines if it contains the requested segment of data at step 1544 (Check if cache (0)). In this instance, since the chunk had previously been requested, a copy has been cached. Report cache 1404, in turn, resends the chunk to active reports server 274 at step

1546. Active Reports server 274, in turn, forwards the chunk to active studio 291 at step 1548, passively completing the request.

Figure 15C:
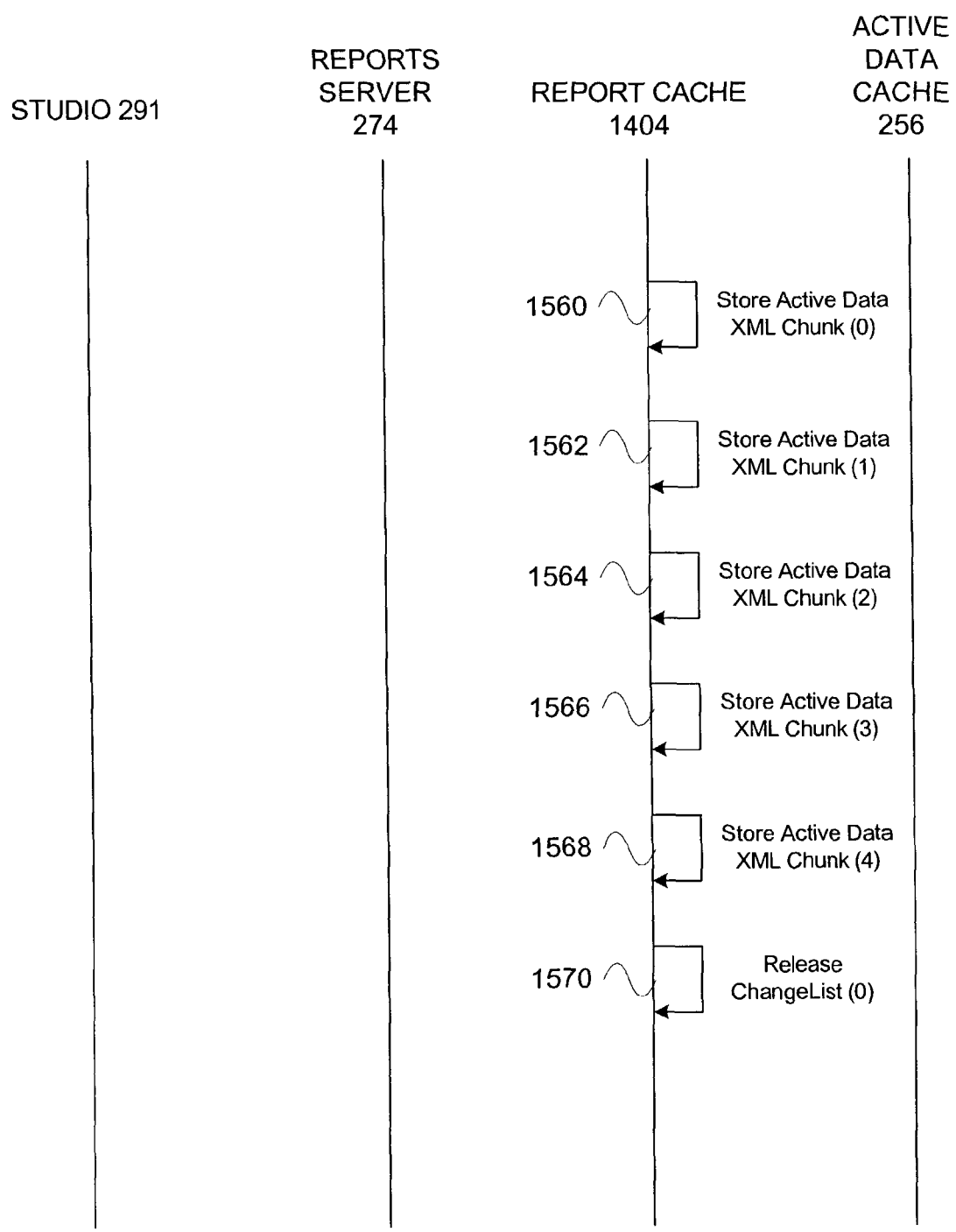
FIG. 15C illustrates, in accordance with one embodiment of the present invention, a simplified functional diagram showing a sequence transactions in which a chunk in report cache is cleared.

FIG. 15C illustrates, in accordance with one embodiment of the present invention, a simplified functional diagram of showing a sequence transactions in which a chunk in report cache 1404 is cleared. As active data XML chunks (1560-1568) are requested and subsequently forwarded to active studio 291, they are also stored at report cache 1404. After a fixed number of these active data XML chunks have been accumulated, earlier ones are discarded (since they may no longer be relevant). For example, after active data XML chunk (4) is received, active data XML chunk (0) is discarded at release changelist (0) 1570.

In another aspect of the current invention, a browser can natively print a report in a substantially WSYIWIG format. The pervasiveness of browser technology has simplified the deployment enterprise software applications. Instead of mandating the installation of proprietary clients, which often can be costly to implement and frustrating to use, users can access the same enterprise applications through common Internet browsers, such as Netscape Navigator or Microsoft Internet Explorer. And in the case of Explorer, the browser is further integrated into the underlying operating system, requiring no additional installation.

Web page functionality was further enhanced with the introduction of embedded scripting languages, such as Microsoft JScript and Netscape Javascript. These scripting language instructions, embedded in the HTML page, can be subsequently interpreted and executed on the client browser, producing results that the user sees (i.e., drop down boxes, enhanced menus, popup windows, etc.).

Traditionally, web pages were designed to be viewed on many different platforms, from text-only terminals, to Macintoshes, to handheld computers. Since there was no way to know how the web page would be displayed (i.e., availability of fonts, ability to render images, etc.) the browser was designed to optimize the web page structure into a format that its host computer is equipped to display. In practice, it was therefore entirely possible for the web page to render differently on the screen of its reader than it did on the screen of its author. Furthermore, since the browser was primarily concerned with rendering the web page, and not in printing it, browser printed output was often problematic. For simple or small web pages, this was not necessarily a problem, since the entire rendered web page could be printed on a single printed page. However, the columnar or tabular reports generated by enterprise applications often would often span multiple printed pages.

Unlike modern word-processors, such as Microsoft Word, browsers do not generally print WYSIWYG ("What You See Is What You Get"). That is, web pages may be rendered without respect to the selected printer. Printing a web page generally causes the appropriate printer driver to map the rendered web page display to each printed page. However, the appearance of the printed page is generally dependent on client configuration (i.e., screen resolution, margin settings, paper size, paper orientation, type of printer, etc.). Since the web page was not originally rendered with the printer limitations in mind, as would be the case with a word processor, portions of the web page may be unexpectedly chopped off.

Furthermore, since printer drivers generally understand only the displayed screen pixels and not data objects, such as text or figures, portions of the rendered web page will either be lost (if they exceed the page's printable width), or printed on the following page (if they exceed the page's printable length). The result is text or figures that are split across a printed page boundary. And, unlike a word processor, navigation bars and sidebars will be printed as well. Any page breaks and frame boundaries, created by the web page designer, will also cause the print driver to forward subsequent pixels to the following page.

A possible solution is to copy the rendered data into a WYSIWYG application, like Microsoft Word, and then print. Simply copying, however, is problematic since it can be both time-consuming and error-prone. In the process of pasting data from the browser into the application, original formatting may be lost. And although text in paragraph form will simply wrap, remaining readable, tables and columns may transfer misaligned, causing information from one column or cell to appear to be in another. Careful error checking may therefore be required to insure data integrity. For particularly large reports, this may require several hours of work, creating a printing disincentive, and hence reducing the effectiveness of the enterprise application as a whole.

Another possible solution is for the web server to generate the web-page in a proprietary WYSIWYG format, such as in Microsoft Word or Adobe Acrobat. This, too, can be problematic since it requires the installation of a third party application which may further increase cost and complexity, or may not be available for a given client device. The browser, in essence, again becomes a proprietary client. Furthermore, the use of a proprietary format may also produce large documents, substantially increasing download latency.

Yet a third solution may be for the web server to provide a link for a separate printer friendly web page. Such a page would leave out navigation bars and sidebar information. A single web page, however, can be very large, again increasing download latency. Furthermore, printer friendly usually refers to the web page's printable width, and not its printable length. Since there is generally no way for the web server to discover the local client's configuration settings, figures and text may still be split across two printed page boundaries.

A more optimum solution may be to provide functionality that allows the browser to natively print active reports in a substantially WSYIWIG format. The active data architecture comprises two general types of reports: continuous columnar and tiled. Continuous columnar reports are comparable to common accounting spreadsheets in that they usually have column and report titles, as well as aggregate cells (i.e., subtotals, sums, etc.). These reports generally summarize or analyze some aspect of the underlying data, and are generally intended to be printed out in total. Tiled reports, by comparison, are more comparable to Microsoft PowerPoint slides. They can simultaneously comprise both lists (i.e., a sequential list of text and numbers without aggregates) and graphical display objects (i.e., charts, graphs, office web components, etc.). Furthermore, the tiled reports are optimized to allow the user to select and print just the relevant portion of the list.

Figure 16A:
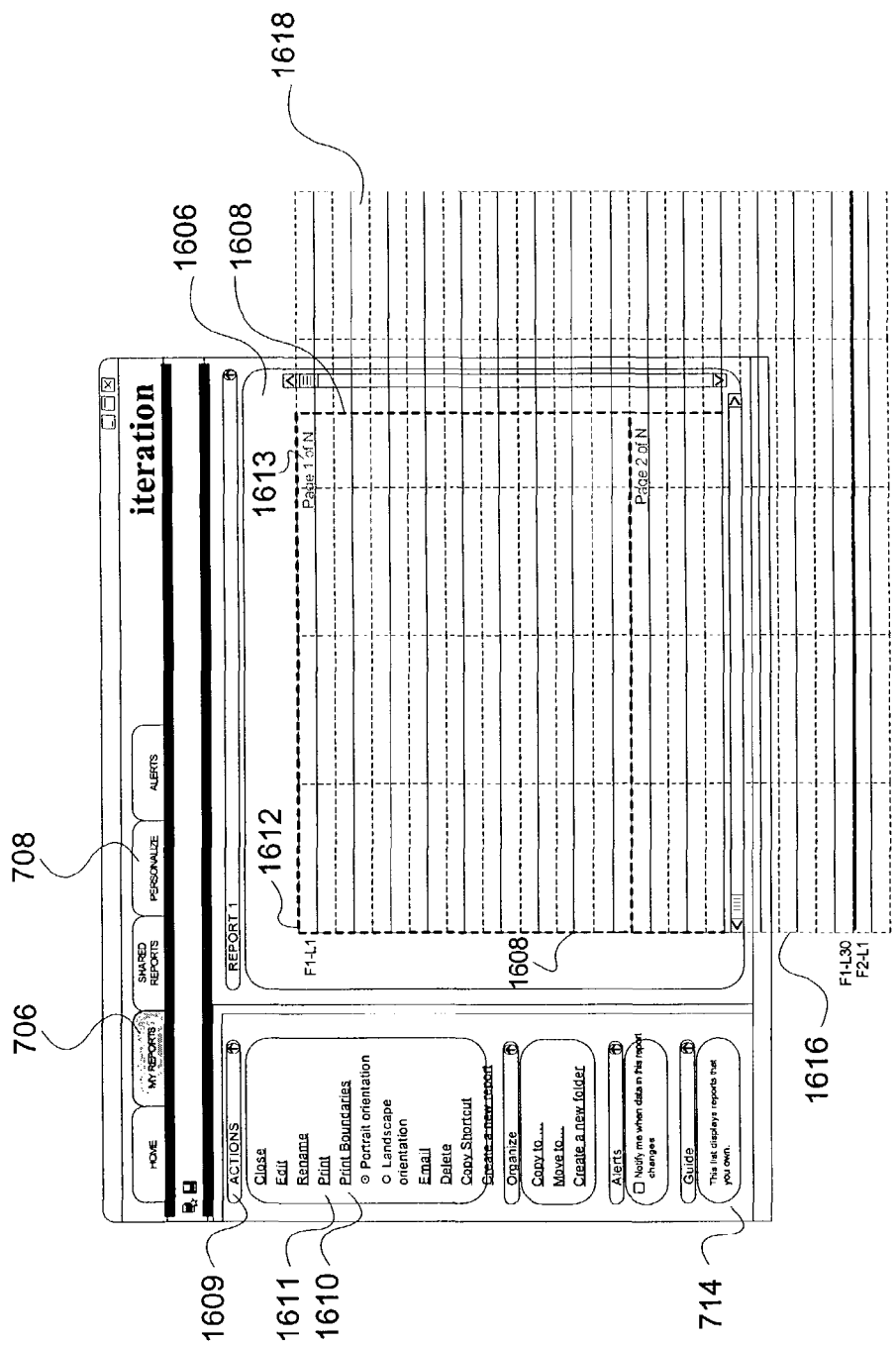
Figure 16B:
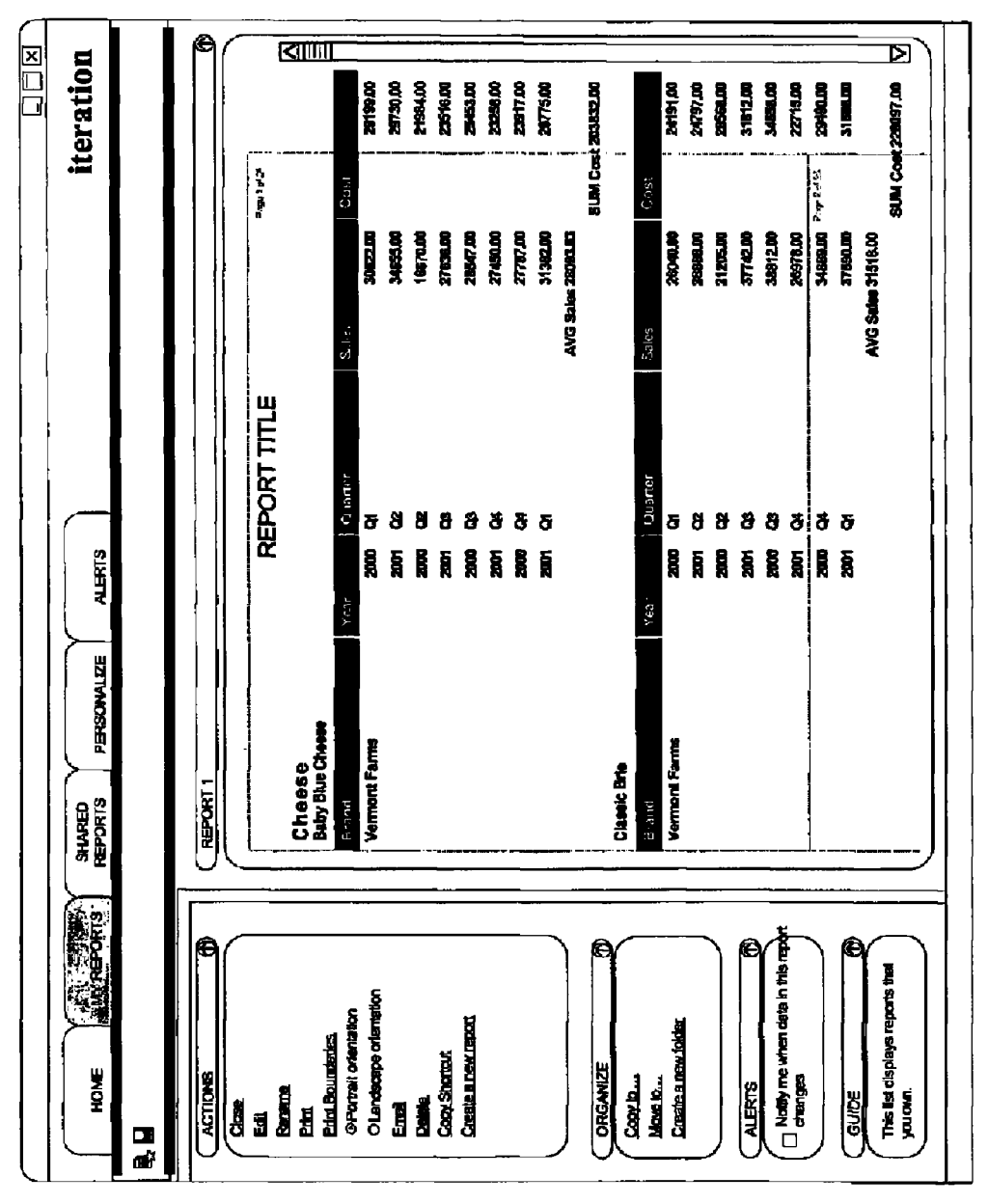

Referring now to FIGS. 16A-B, the of the active studio screen display of FIG. 7A is shown, in which continuous columnar report 1618 is shown in browser in display pane 715, according to one embodiment of the invention. FIG. 16A shows a simplified example of the generic schematic of continuous columnar report 1618, whereas FIG. 16B shows a simplified example of the rendered continuous columnar report.

Since transferring large web pages can be slow, the current invention transmits the continuous columnar report to the client browser in a series of smaller frames, each optimized to reduce latency. These frames are then rendered in separate independent browser windows, which are contiguously positioned without frame borders, to give the impression of a single large web page. The first frame, slightly larger than the display window, would generally render relatively quickly, creating the perception that the entire web page has arrived (since the hourglass is no longer visible), although subsequent frames may still be rendering. However, once the user manually scrolls down from the first frame, subsequent frames should have substantially rendered.

In this example, two frames are displayed, a first frame 1612 and a second frame 1616. The first frame 1612 has thirty lines (F1-L1 to F1-L30), while the second frame 1616 also has thirty lines, although only two lines (beginning at F2-L1) are displayed for purposes of illustration. The each line is further comprised of cells which may further include display elements (i.e., active data elements, aggregate elements, report titles, header text, footer text, etc.) contiguously arranged. Since the first frame 1612 is larger than display pane 1606, both vertically and horizontally, a user would subsequently need to use the scroll bars to see the hidden portions of the frame.

Active reports, unlike normally rendered web pages, can further be manipulated and customized by the users when in edit or print preview mode. For instance, columns can be re-sized (both width and height), re-positioned (swapping one column with another), and re-formatted (font type, font size, line borders, background color, etc). Function pane 714 further displays several functional list boxes within home 705 tab, such as actions list box 1609 which further comprises a print function 1611 (which allows the user to print the rendered report) and a print boundaries function 1610.

In traditional browser printing, printer output can be previewed by using the browser's print preview function. This function takes computer and printer configuration information (i.e., such as page size, orientation, margins, etc.), calculates the total amount of screen pixels that can fit on a printed page, and renders a static picture of that page in a new print preview window. As previous discussed, portions of the web page beyond the print boundaries will be chopped off. Any portion of the web page exceeding the printed page width will be completely lost, while any portion exceeding the printed height will be printed on the next page, potentially splitting text and figures between two contiguous pages. Furthermore, since the print preview window is essentially a static snapshot, the user is generally unable to manipulate elements on the page to fit within the displayed print boundaries.

In a non-obvious fashion, print boundaries function 1610 superimposes a set of non-printable guides 1608 identifying the printable areas of the columnar report, as rendered in display pane 715. Vertical row positioning can be further optimized to insuring that a page break does not occur in the middle of a row. Furthermore, unlike the traditional static print preview window, the user can manipulate the rendered report to fit within the displayed guides, allowing the active report to be printed in a substantially WYSIWYG manner. That is, users can both re-sized and re-positioned columns, as well as re-formatted font types and sizes.

Figure 16C:
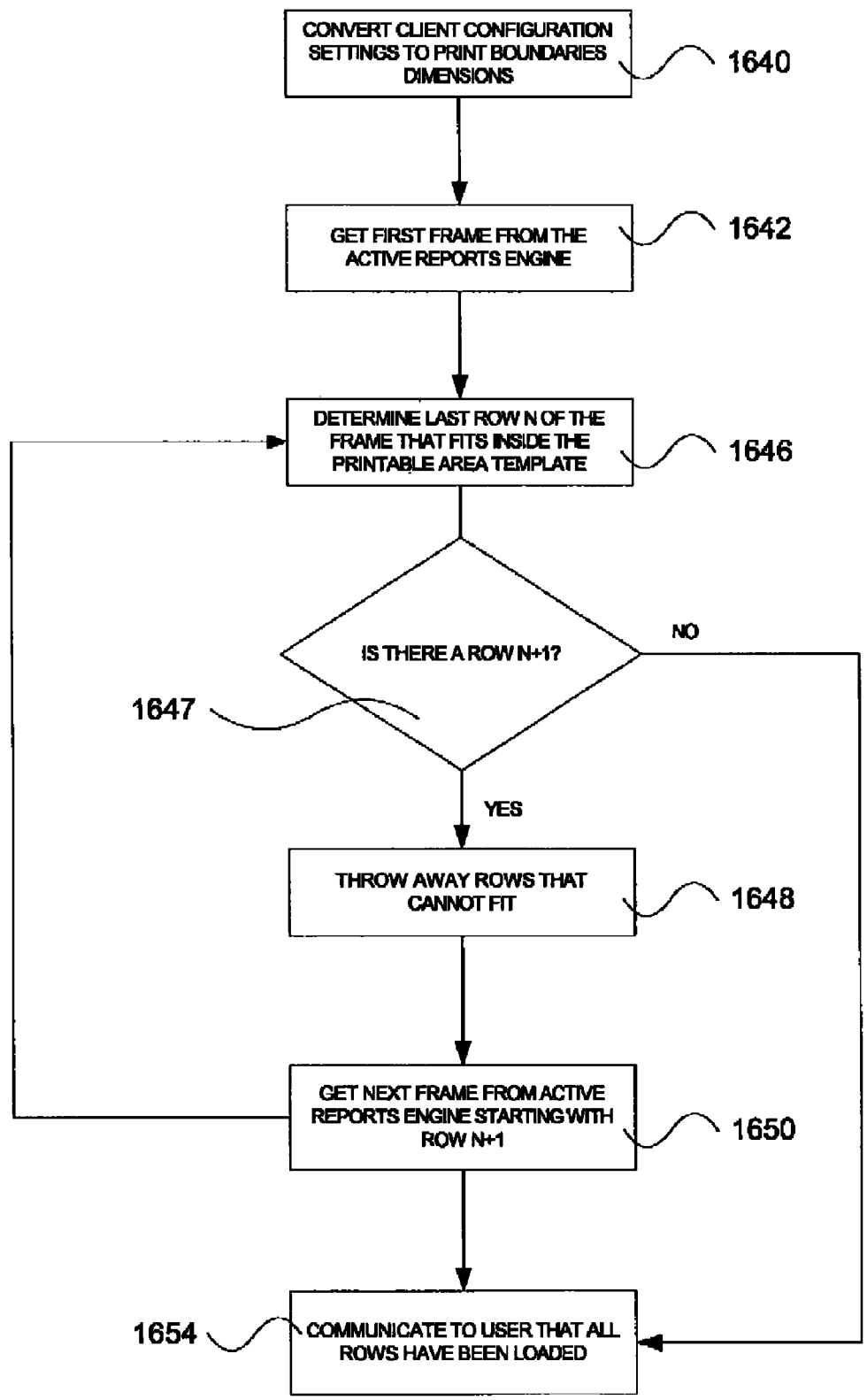
FIG. 16C illustrates, in accordance with one embodiment of the present invention, a flow chart showing steps for rendering the print boundaries on the active report.

FIG. 16C is a flow chart showing steps for rendering the print boundaries on the active report. Initially, the user selects the print boundaries function 1610, as shown in FIG. 16A, where upon client configuration settings are converted to print boundary dimensions at step 1640. That is, configuration information (i.e., page size, page orientation, margins, screen resolution, etc.) is used to calculate a printable area template in screen pixels, with page breaks automatically being generated by the browser between successive frames. The browser then requests the active reports engine to transmit the first frame at step 1642. As previously described, frames comprise a set of rows, further including the active data elements. The area of the received frame is then compared the printable area, wherein the last row N of the frame that fits inside the printable area is determined at step 1646. Should there exist at least one additional row at step 1647, it is subsequently thrown away at step 1648. The next frame is then retrieved from the active reports engine, starting with row N+1, at step 1650, and step 1646 is repeated again. If there are no additional rows, the user is notified that all rows have been loaded at step 1654. In one embodiment, a message appears on the user display stating that more pages are being loaded. Once step 1654 completes, the message is removed. In another embodiment, as the frames are displayed, a message comprising the frame sequence number is placed in the corner of each frame. Once step 1654 completes, the message also includes a total frame number.

Figure 17A:
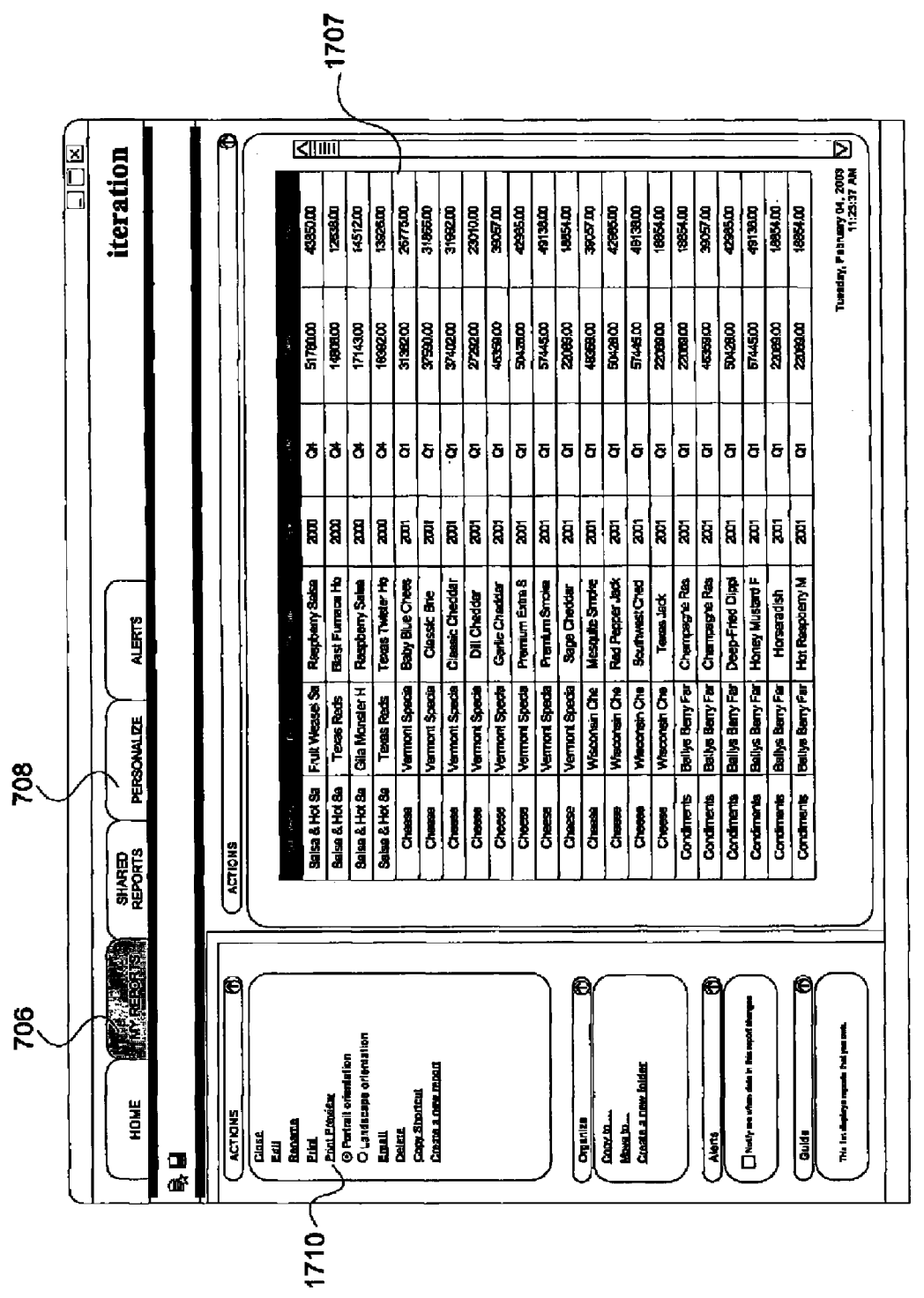
Figure 17B:
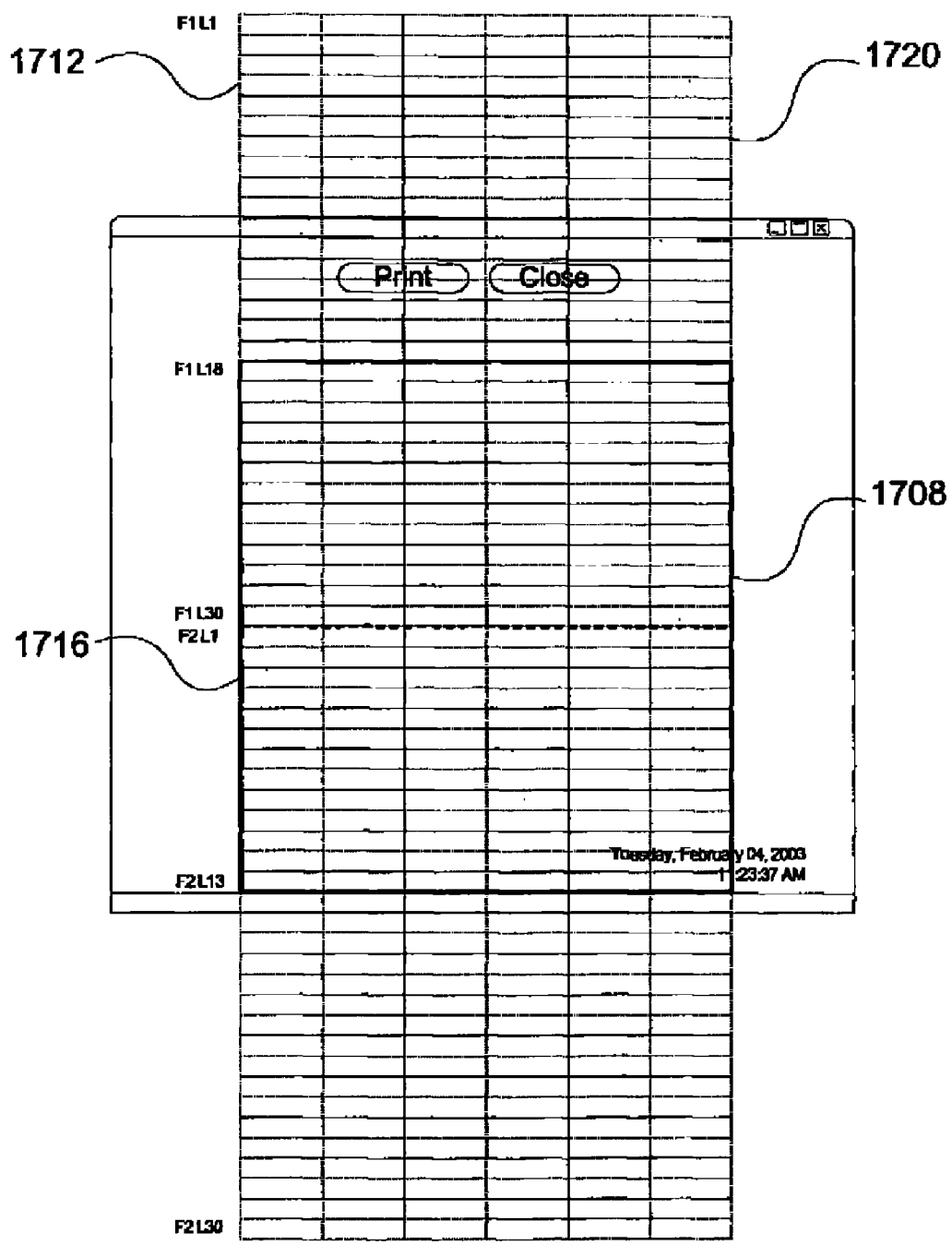

Referring now to FIG. 17A, the of the active studio screen display of FIG. 7A is shown, in which a titled report is being rendered according to one embodiment of the invention. In this example, a single list is displayed in display pane 715. Like the previously described continuous columnar report, as shown in FIGS. 16A-B, user-perceived performance is also optimized through the transmission of a series of smaller frames. The parent frame, loading first, comprises many key frame elements, and is further responsible for loading subsequent pages. However, unlike the continuous columnar report, titled reports do not display print boundaries. Instead, the user selects print preview 1710, which opens a modified print preview window with the previously received frames, as shown in FIGS. 17B-C. FIG. 17B shows a simplified example of the generic schematic of list report 1720, whereas FIG. 17C shows a simplified example of the rendered list report. Lists displayed within the print preview window allow the user to select a portion to print, in contrast to the columnar report in which the entire report is printed.

Referring to FIG. 17B, two frames are displayed, a first frame 1712 and a second frame 1716. The first frame 1712 has thirty lines (F1-L1 to F1-L30), while the second frame 1716 also has thirty lines (F1-L1 to F1-L30). The each line is further comprised of cells contiguously arranged in columns, such as active data elements, report titles. The printable area 1708 is automatically determined based on client configuration, as previously described. The user can scroll up or down to find the relevant portion to print. In a non-obvious fashion, unlike a traditional browser's print preview function, lists within the titled report can be further manipulated and customized by the users in edit or print preview mode. For instance, columns can be re-sized (both width and height), re-positioned (swapping one column with another), and re-formatted (font type, font size, line borders, background color, etc). Furthermore, unlike the columnar report, the titled report attempts to fit the entire report within the print boundaries. Once the user selects the appropriate information, the titled report can be printed by selecting print button.1742.

Figure 17D:
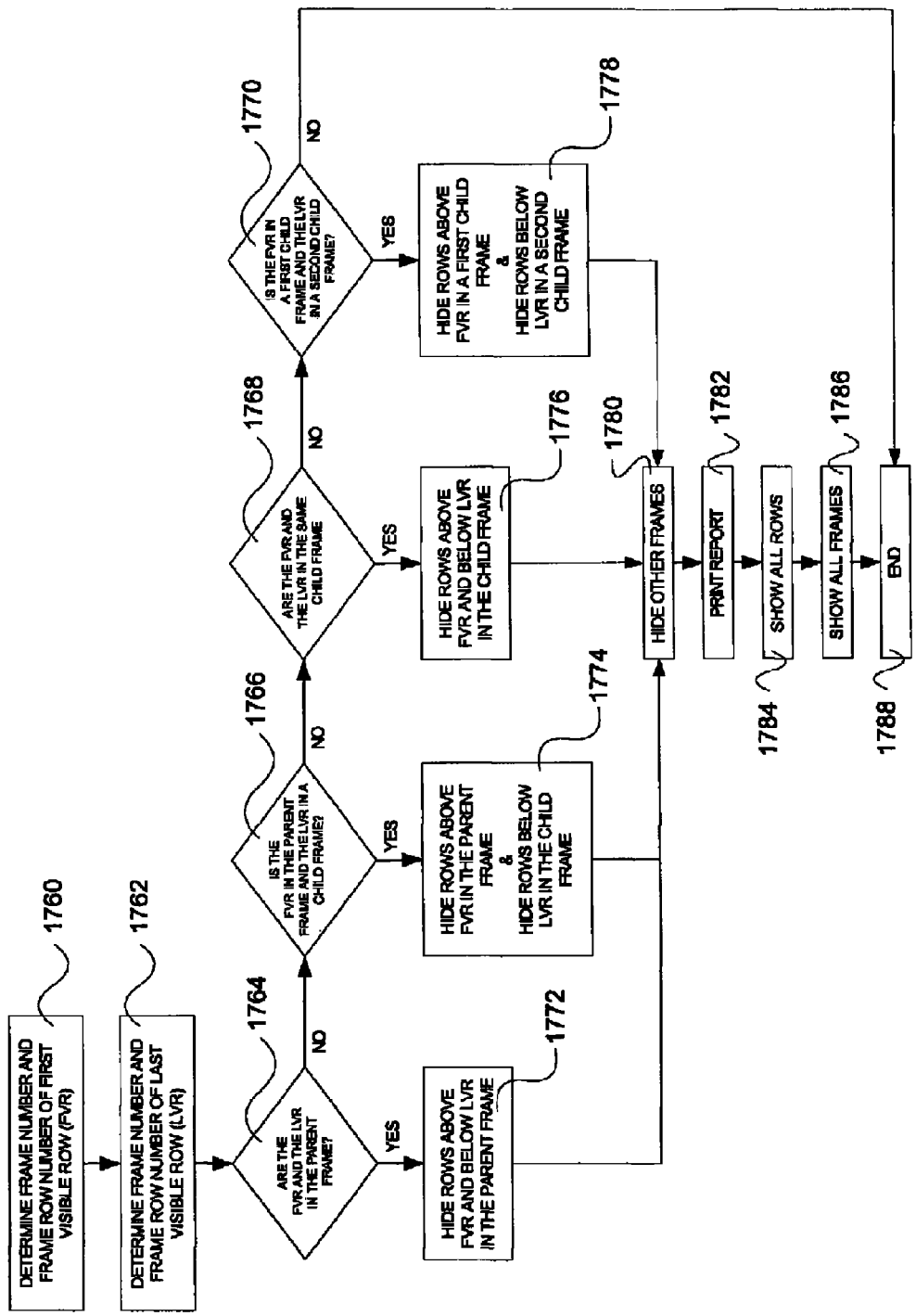
FIG. 17D illustrates, in accordance with one embodiment of the present invention, a flow chart showing steps for printing the section of the list within the print boundaries.

FIG. 17D is a flow chart showing steps for printing the section of the list within the print boundaries. Initial, the user selects the print button 1742, as shown in FIG. 17C, whereupon the frame number and the row number of the first visible row (FVR) and last visible row (LVR) are determined in steps 1760-1762. That is, the first row and last row that are displayed in the print preview window. Vertical scroll bar 1710 allows the user to select new segments of the list.

Depending on the set of rows selected, there are four possible situations that must be addressed. The first test determines if the FVR and the LVR are both within the parent frame at step 1764. If so, the rows above the FVR and below the LVR in the parent frame are hidden, at step 1772. If not, a second test determines if the FVR is in the parent frame and the LVR is in a child frame, step 1766. If so, the rows above the FVR in the parent frame, and the rows below the LVR in the child frame, are hidden at step 1774. If not, a third test determines if the FVR and the LVR are in the same child frame at step 1768. If so, the rows above the FVR and below the LVR are hidden in the child frame at step 1776. If not, a final test determines if the FVR is in a first child frame and the LVR is in a second child frame, at step 1770. If so, the rows above the FVR in the first child frame, and the rows below the LVR in the second child frame, are hidden at step 1778. At this stage, the remaining frames are hidden, at step 1780. Since the remaining visible rows fit within the printed page, the vertical scroll bar also disappears. The titled report is forwarded to the printer, at step 1780. At this point, all rows that were previously hidden are made visible, returning the vertical scroll bar, at step 1782.

Figure 18A:
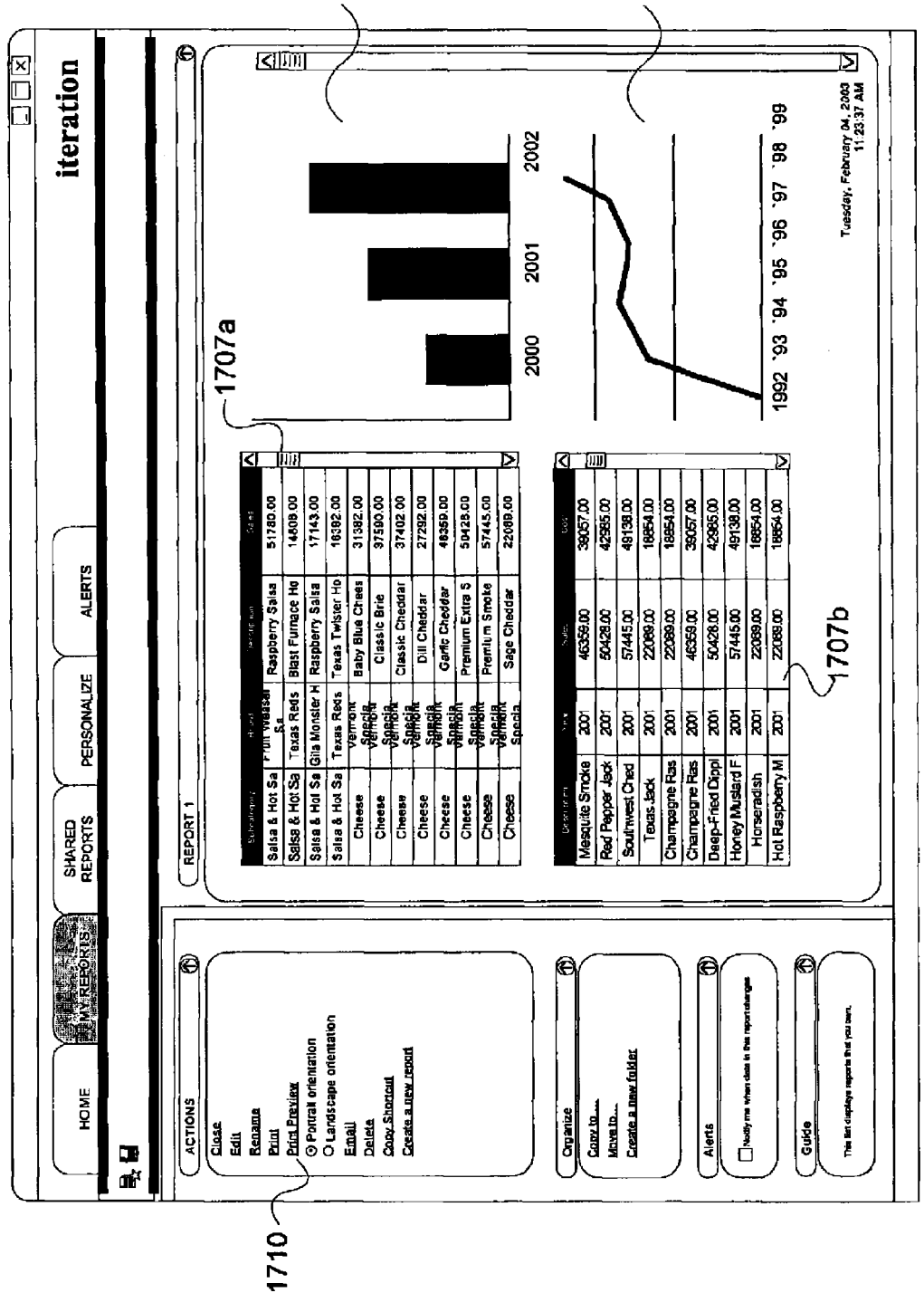
FIGS. 18A-B, illustrate, in accordance with one embodiment of the present invention, an active studio screen display in which a titled report is being rendered.
Figure 18B:
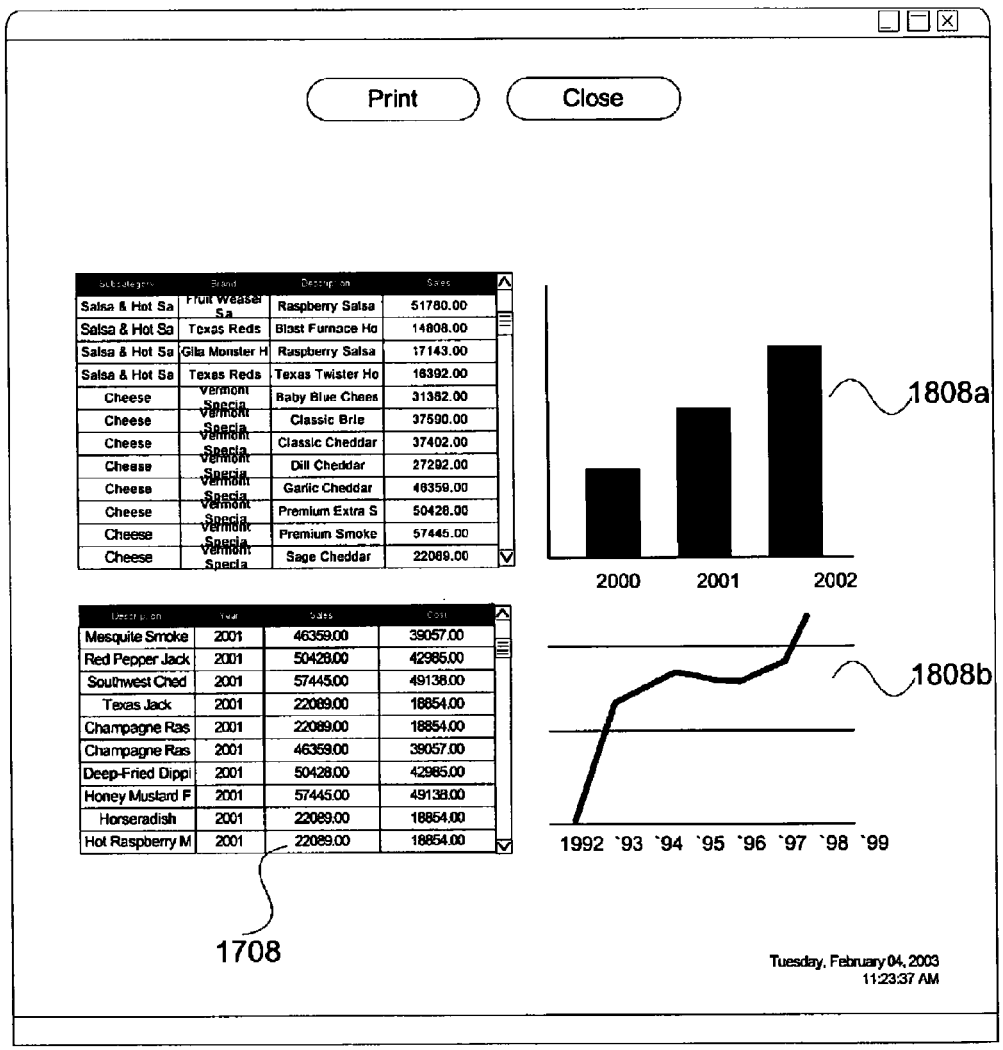

Referring now to FIGS. 18A-B, the of the active studio screen display of FIG. 7A is shown, in which another titled report is being rendered according to one embodiment of the invention. In this example, the titled report is a composite of multiple elements: a set of lists 1707, as displayed in FIG. 17, and a set of graphical display objects 1802. As described previously, users can manipulate and customize the lists by re-sizing, re-positioning, and re-formatting columns. Graphical display objects 1802 can also be further customized by changing chart type, fill color, and font size and style. In general, graphical display objects 1802 are automatically resized to fit on the printed page.

Figure 19:
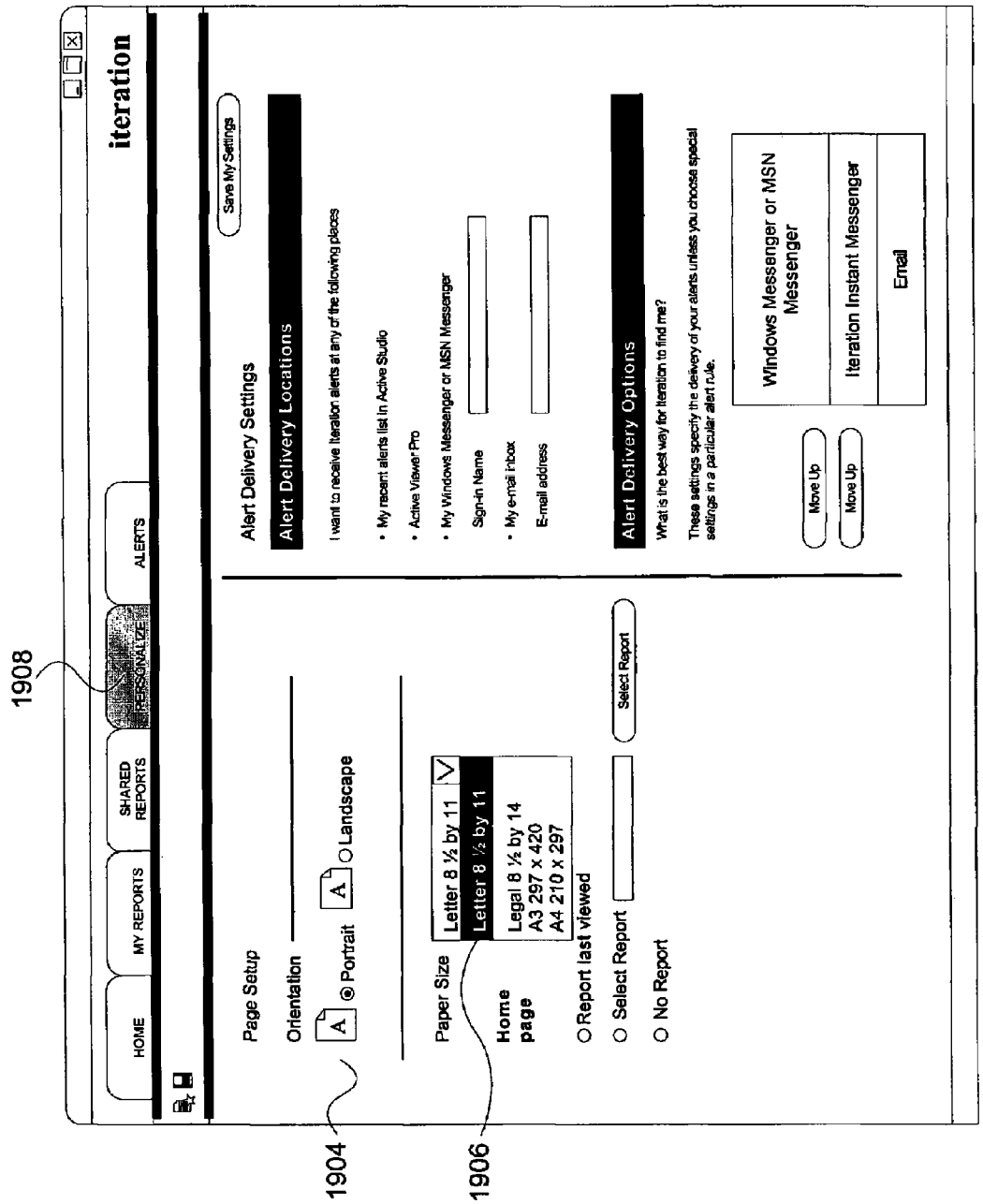
FIG. 19 illustrates, in accordance with one embodiment of the present invention, an active studio screen display further showing the personalize tab.

Referring now to FIG. 19, the active studio screen display of FIG. 7A is shown, further showing the personalize tab1908. Here, the user configures printer information, such as orientation 1904 and paper size 1906. This is in addition to the regular browser printer configuration information, since browser scripting languages (i.e., JScript, Javascript, etc.) generally cannot access this information directly.

In another aspect of the current invention, a user's rich client interface can automatically be optimized according to a set of characteristics. In one embodiment, the set of characteristics includes screen resolution. In another embodiment, the set of characteristics includes orientation. In yet another embodiment, the set of characteristics includes a specific open window. In yet another embodiment, the set of characteristics includes a specific task.

Client devices are becoming smaller, faster, mobile, and more ubiquitous. Mobile, handheld computers, computing appliances, and smart telephones allow computer support to be built into task situations. Such situations include new physical environments, where computers have been impractical up to now, and also new social environments, where, previously, computers imposed a formidable barrier to social interaction.

Many of these devices include displays that are substantially similar to traditional computer monitors. It is not uncommon for these devices to have both a portrait mode and landscape mode, depending on user preferences and application context. For instance, in a smart phone with a relatively small display, a contact list may be shown in a portrait mode to maximize the number of viewable entries, while a web browser would be displayed in a landscape mode, to maximize the display width.

Many devices also have sophisticated graphical operating systems that can simultaneously run multiple applications. These applications often allow users to customize their working environment, often called a workspace, in order to work more efficiently. A workspace configuration commonly comprises a set of customized application and display settings. Common application settings include printing preferences, visual style, mouse interaction, and keyboard shortcuts. Whereas display settings include rearranging, relocating, and resizing movable elements, such as toolbars and windows. These settings can often be saved and displayed again in subsequent sessions. In some applications, such as Adobe Illustrator, the settings are saved upon exiting the application. In others, such as Netscape Navigator, the settings must be saved by the user.

However, applications generally do not automatically optimize the user's workspace based on a change between portrait mode and landscape mode. Some applications simply relocate windows that would otherwise be outside the display boundary. The result may be a workspace that appears overly cluttered with overlapping windows. Other applications both relocate and proportionately resize windows. Although reducing clutter, the result also minimizes the effective work area. That is, if the change is from portrait to landscape mode, the display areas on the sides are not used. And if the change is from landscape to portrait mode, display areas at the top and bottom are not used. Still others do nothing, allowing windows to fall outside the display area. The result is that in many of these applications, the user must manually rearrange, resize, and relocate workspace elements in order to effectively user the application in the changed mode.

In a non-obvious fashion, the current invention allows an application to select a workspace configuration, from a set of default or user-defined workspace configurations, based on a set of characteristics. In one embodiment, the set of characteristics includes resolution. In another embodiment, the set of characteristics includes orientation. In yet another embodiment, the set of characteristics includes a current user task. In yet another embodiment, the set of characteristics includes time. In yet another embodiment, the workspace configuration is stored on a device other than the client device (i.e. the active data cache). In yet another embodiment, the workspace configuration can be retrieved to an alternate client device.

Figure 20:
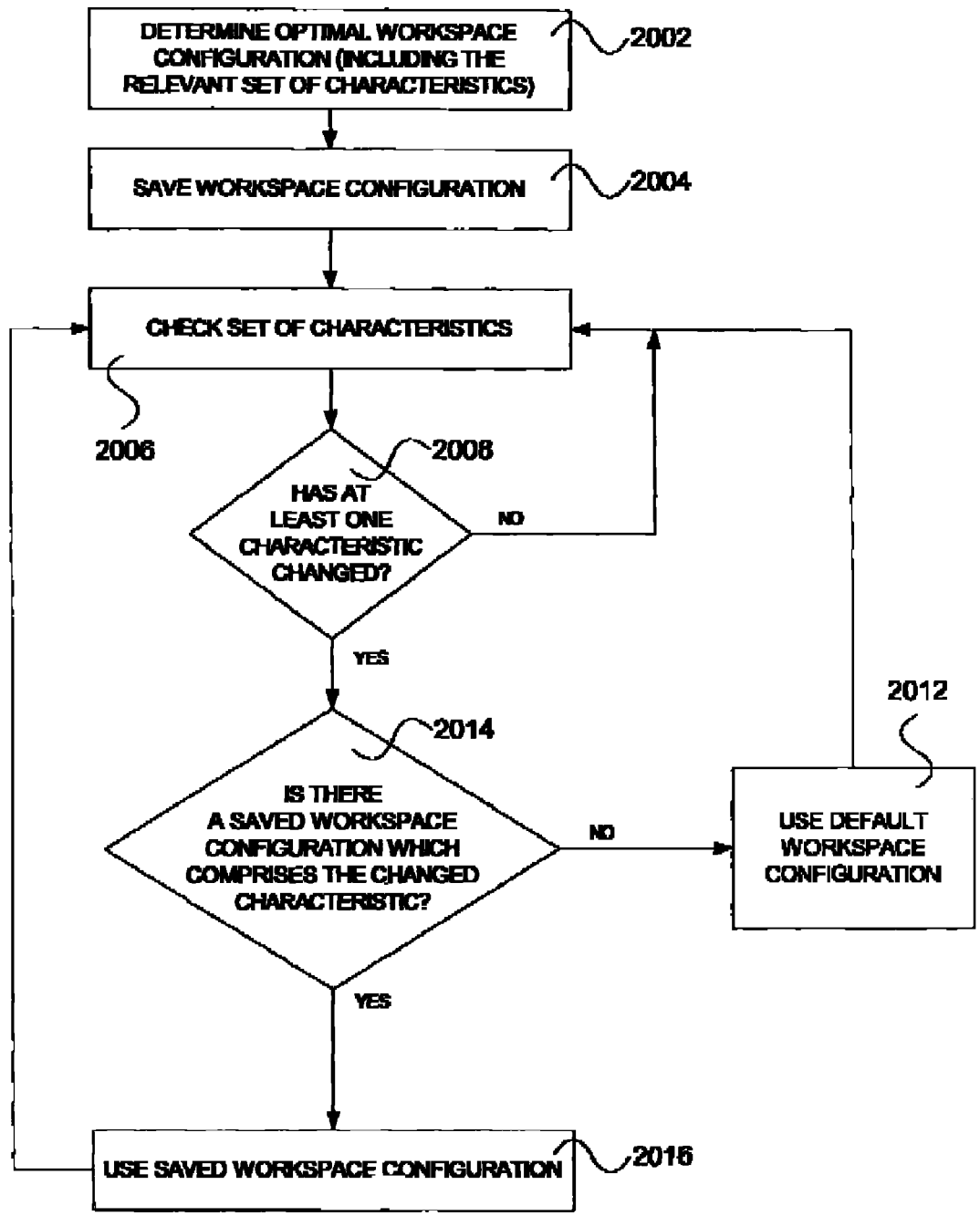
FIG. 20 illustrates, in accordance with one embodiment of the present invention, a flow chart is displaying steps for changing a user's workspace configuration.

Referring now to FIG. 20, in accordance with one embodiment of the present invention, a flow chart is displayed showing steps for changing a user's workspace configuration. Initially, the user may determine an optimal workspace configuration at step 2002. This may include the size and location of windows on the display desktop, as well as the position of menus. It may also include user-defined short-cut keys and printing preferences (e.g. such as the default printer). The workspace configuration is then saved at step 2004. In one embodiment, the workspace configuration is automatically saved upon exiting the application. In another embodiment, the workspace configuration is manually saved by the user.

The characteristics are then checked at step 2006. For example, has the screen resolution changed from 800×600 to 1024×768, or has the orientation changed from portrait to landscape. At step 2008, if at least one characteristic has changed, the application determines if a saved workspace configuration exists which comprises the changed characteristics at step 2014. If at step 2008, no characteristics have changed, the characteristics are then again checked at step 2006.

If at step 2014, a saved configuration is found which comprises the changed characteristic, it is used at step 2016. The characteristics are then again checked at step 2006. If at step 2014, a saved configuration is not found, a default workspace configuration is used at step 2012. This default configuration is not optimized for any specific user, but rather includes generally accepted user preference. For instance, if possible, windows should not overlap. The characteristics are then again checked at step 2006.

Figure 21A:
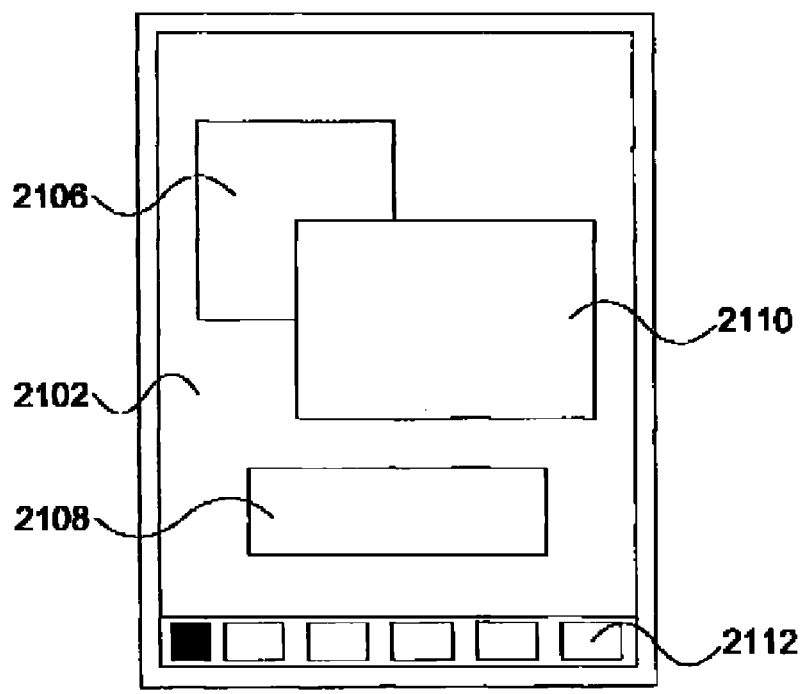
FIGS. 21A-B illustrate, in accordance with one embodiment of the present invention, screen displays for a device that can be used in both a portrait and landscape mode.
Figure 21B:
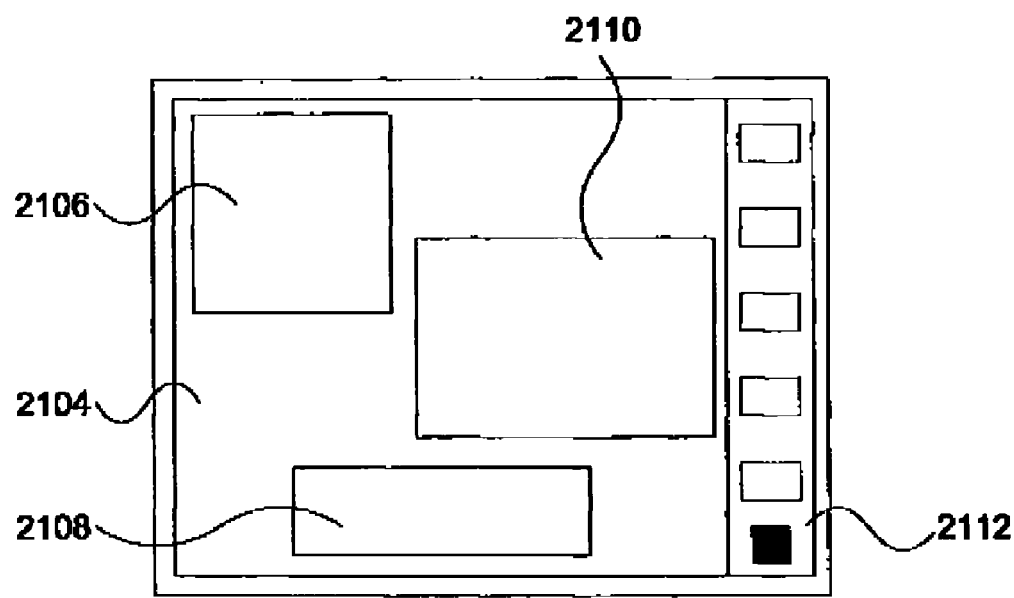

Referring now to FIGS. 21A-B screen displays are shown for a device that can be used in both a portrait and landscape mode, according to one embodiment of the invention. Referring to FIG. 21A, the device is shown in portrait mode (i.e., the display height is proportionately greater than the display width). The display comprises three regular windows 2106-2110 and a menu bar 2112. As the user changes the orientation as shown if FIG. 21B, the elements have repositioned themselves based on the user's workspace configuration. For example, windows 2106 and 2110 overlapped in the portrait orientation of FIG. 21A, but do not in the landscape orientation of FIG. 21B. Furthermore, the menu bar has also repositioned itself from the bottom of the display in FIG. 21A to the right side of the screen in FIG. 21B.

Figure 22A:
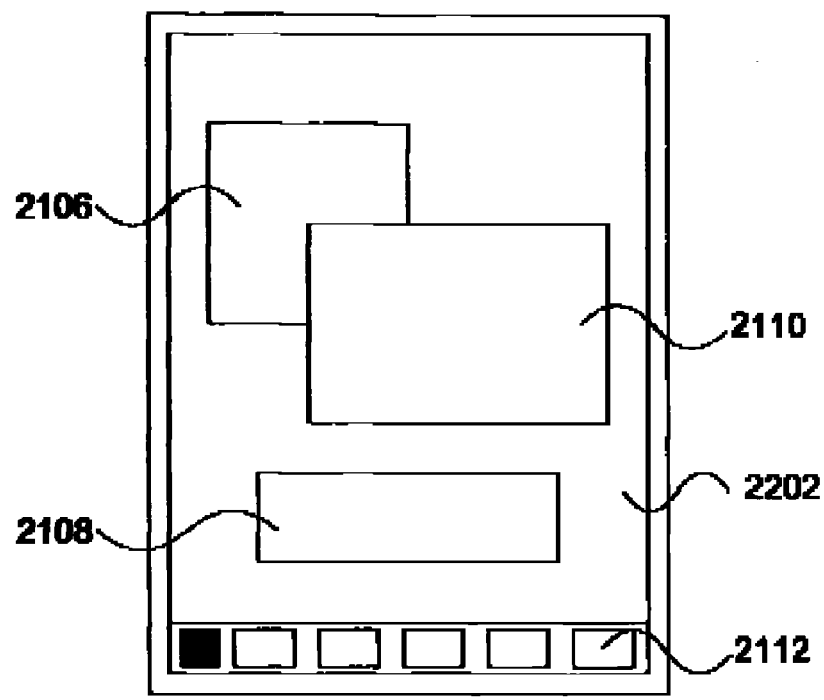
FIGS. 22A-B illustrate, in accordance with one embodiment of the present invention, screen displays for a device that can be used in both a portrait and landscape mode in which the screen resolution has changed.
Figure 22B:
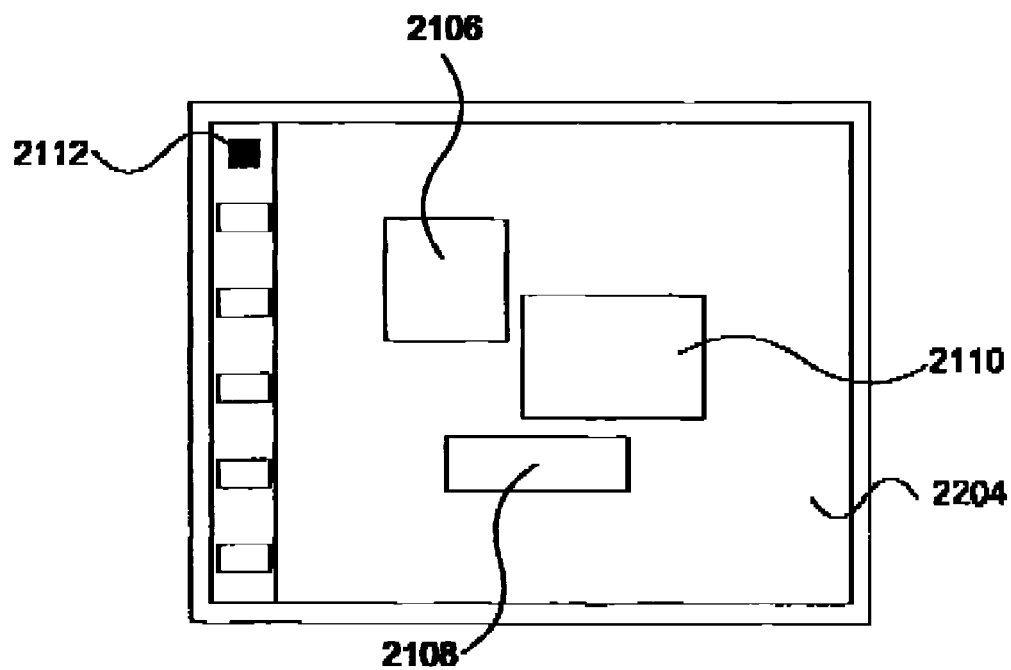

Referring now to FIGS. 22A-B screen displays are shown for a device that can be used in both a portrait and landscape mode in which the screen resolution has changed, according to one embodiment of the invention. Referring to FIG. 22A, the device is shown in portrait mode. The display comprises three regular windows 2106-2110 and a menu bar 2112. As the user changes the orientation as shown if FIG. 22B, the user also changes screen resolution. As in FIG. 21B, the elements have repositioned themselves based on the user's workspace configuration. But, the elements also appear smaller because the screen resolution has changed (e.g. from 800×600 in FIG. 22A to 768×1024 in FIG. 22B). Furthermore, the menu bar has also repositioned itself from the bottom of the display in FIG. 22A to the left side of the screen in FIG. 22B.

In accordance with another aspect of the present invention, there are provided innovative methods and arrangements for efficiently displaying cross-tab data. As the term is employed herein, cross-tab data refers to aggregate data displayed in a cell of a table, which aggregate data is a mathematical function of other data items associated with other cells in the same table.

$$Da = f(D1, D2, D3 \ldots Dn) \quad \text{(Equation 1)}$$

Depending on the type of cross-tab analysis desired, the mathematical function f in Equation 1 above may represent any desired mathematical and/or statistical function. Da represents the aggregate data displayed in an aggregate data cell in the table, and D1-Dn represent data items displayed in other cells of the same table.

Figure 23:
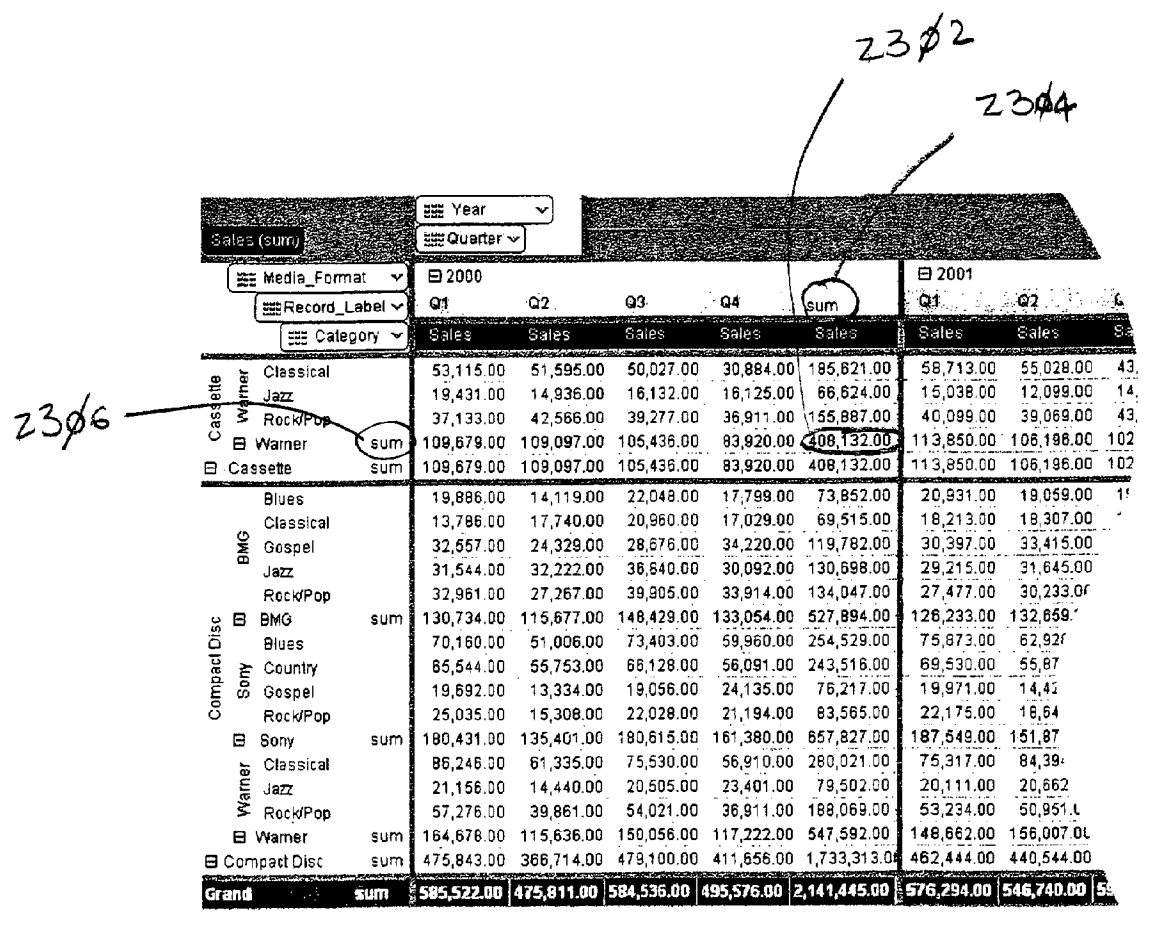

Generally speaking, the cells that contain values D1-Dn are cells that are disposed in the same row or in the same column with the aggregate data cell. With reference to FIG. 23, aggregate data cell 2302 containing the value 408,132.00 displays the value that is the sum of the three cells above cell 2302 in the same column (i.e., the cells that contain values 185,621.00, 66,624.00, and 155,887.00). Aggregate data cell 2302 also displays the value that is the sum of the four cells to the left of cell 2302 in the same row (i.e., the cells that contain values 109,679.00, 109,097.00, 105,436.00, and 83,920.00).

With reference to FIG. 23, both the column function (reference number 2304) and the row function (reference number 2306) are identical, i.e., each is a sum function. In this case, the value in aggregate data cell 2302 is the same irrespective of whether the column function (2304) or the row function (2306) is employed to calculate the value in aggregate data cell 2302.

A situation arises when the column function differs from the row function. Suppose, for example, that the column function is a sum function while the row function is an average function. In this case, the value in the aggregate data cell 2302 differs depending on whether the row function or the column function is employed to calculate the value in data cell 2302. The difficulty lies in deciding which value to display in aggregate data cell 2302.

One possible solution is to furnish an extra cell to facilitate the display of the aggregate data for both the column function and the row function, i.e., showing both the sum of the three cells above aggregate data cell 2302 and the average of the four cells to the left of aggregate data cell 2302. However, this approach doubles the space requirement for displaying aggregate data, thereby disadvantageously reducing the space available to display other data. Further, the simultaneous display of two aggregate data cells, one for each of the column function and the row function, may confuse users who are already familiar with the paradigm of viewing a single aggregate data cell at each intersection of a row and a column.

Figure 24:
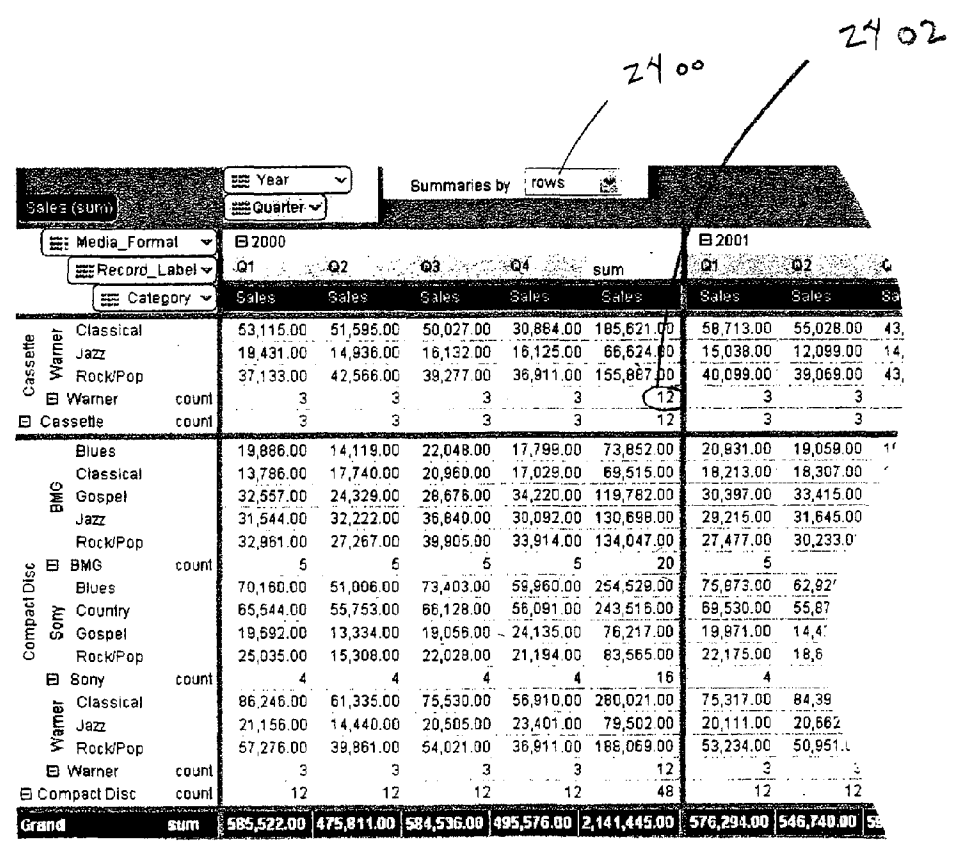

In accordance with one aspect of the present invention, there is provided a user-selectable function selector for determining whether the aggregate data cell disposed at the intersection of a row and a column would display the result calculated in accordance with the row function or with the column function. FIG. 24 shows one implementation wherein the user-selectable function selector is implemented as a choice in a drop-down list 2400 that the user can select. The drop-down list is but one way to facilitate user selection and other conventional techniques for facilitating user selection may also be employed.

In the example of FIG. 24, the user has selected to employ the row function to calculate the data to be displayed in the aggregate data cells of the table, such as aggregate cell 2402. In this case, aggregate data cell 2402 shows the total count of the count values of the four cells to the left of aggregate data cell 2402 (i.e., of the cells containing values 3, 3, 3, and 3).

Figure 25:
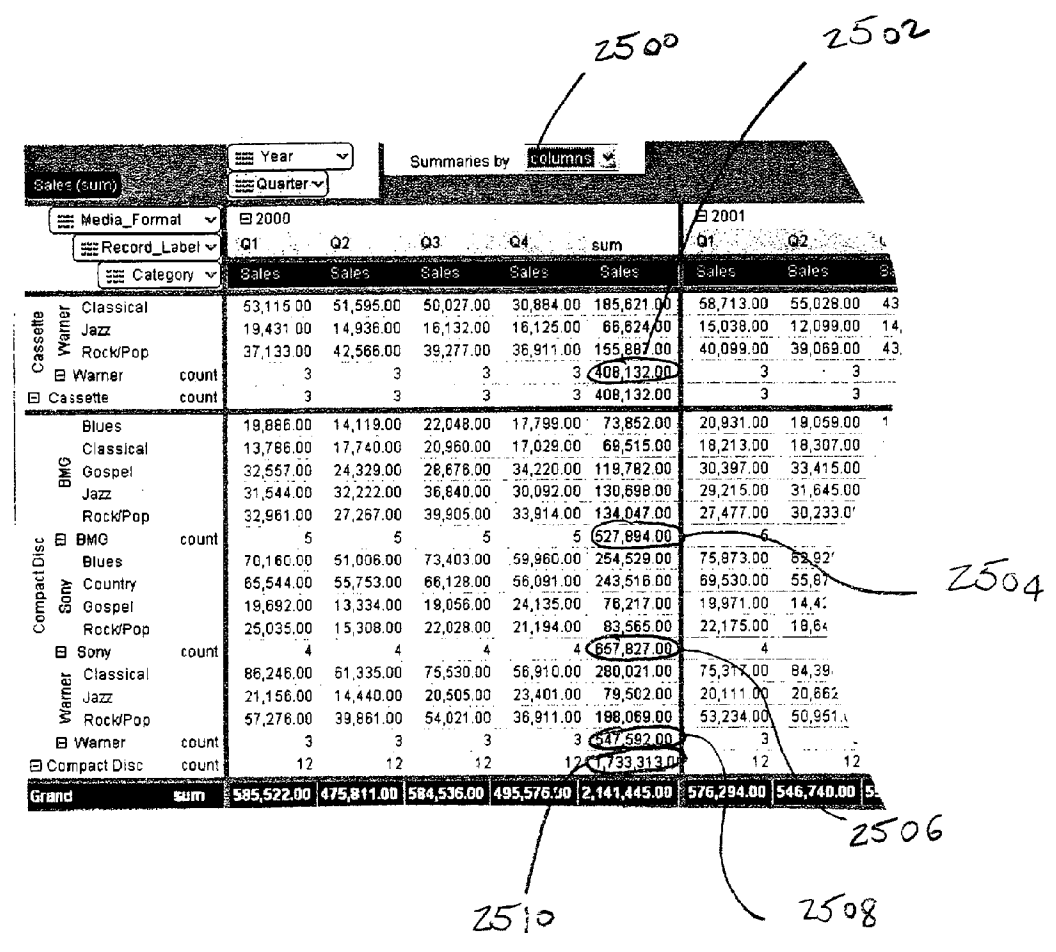

FIG. 25 shows the example wherein the user has toggled the user-selectable function selector 2400 of FIG. 24 to employ the column function to calculate the data to be displayed in the aggregate data cells of the table, e.g., aggregate data cell 2502. Thus, aggregate data cell 2502 shows the sum of the data values in the three cells above aggregate data cell 2502 (i.e., of the cells containing values 185,621.00, 66,624.00, and 155,887.00). By toggling the user-selectable display selector, the user can view different values in the aggregate data cells (depending on whether the row function or the column function is selected) while other data values in other cells may stay the same.

Note that it is not required that the value in the aggregate data cell must represent an aggregate of the values in the cells immediately adjacent to the aggregate data cell in the same row or the same column. For example, aggregate data cell 2510 is an aggregate of other aggregate data cells 2504, 2506, and 2508, which are not adjacent in the same column. As mentioned, the column function is employed since the user has selected in user-selectable function selector 2500 that the column function be employed to calculate the aggregate data value. It should be kept in mind that although the sum function is employed as an exemplary aggregate function in FIG. 25, the aggregate function may well be any desired mathematical/statistical function, e.g., average, mean, min, max, count, and the like. Further, the column function and the row function in the table, e.g., the table of FIGS. 24 and 25, may be user selectable, if desired.

As can be appreciated from the foregoing, the provision of the user-selectable function selector advantageously allows the user to select whether the row function or the column function will be employed to calculate the aggregate value displayed in an aggregate data cell at the intersection of a row and a column of a cross-tab table. Furthermore, the provision of the user-selectable function selector does not require the use of additional aggregate data cells to display aggregate data and/or require user to become familiarized with another way of displaying cross-tab data. With the present invention, only a single aggregate data cell with a single aggregate data value is provided at the intersection of a row and a column, which aggregate data value changes according to the selection made by the user-selectable function selector. Accordingly, efficient space utilization and user-friendliness are preserved while furnishing the user with a way to access both the row function aggregate data and the column function aggregate data.

In another aspect of the current invention, a report cache is advantageously employed in order to optimize network performance and scalability. In one embodiment, the report cache stores sets of data in memory. In another embodiment, the report cache stores sets of data on a hard drive. In yet another embodiment, the report cache stores sets of data as sets of memory mapped files.

Modern enterprise architectures often comprise distributed application elements connected across a data network, and optimized for task and usage. A common reason is scalability, since different portions of the enterprise architecture can be expanded without disruption to other elements. In the current invention, active data cache is coupled to various enterprise data sources, and subsequently offloads the caching of viewsets to a report cache. Active report server, in turn, requests and subsequently formats portions of the cached viewsets for proper rendering in active studio (i.e., transformation from XML to HTML), which may be located on the client device. A single client device can also comprise multiple simultaneously opened viewsets. Hence, the active data cache may scale with the volume of enterprise data, the report cache may scale with the number of opened viewsets, and the active reports server may scale with the number of users.

The active data cache is generally optimized for sequential access. That is, it receives, transforms, forwards, and subsequently discards active data. In one embodiment, this is done through the use of a forward-moving cursor (a variable that runs through a stored database table in one direction). While accessing data through a forward-moving cursor can make the active data cache very fast, is can also make other forms of access very inefficient or practically impossible (i.e., random access).

In a non-obvious fashion, a report cache is advantageously employed in order to optimize network performance and scalability, by offloading the caching of viewsets from the active data cache memory. A viewset (static de-normalized representations of information in active data cache) often comprises an initial large recordset of data, and a series of smaller changelists that represent subsequent changes to the recordset. Since browsers are often incapable of rendering a web page beyond a certain size (e.g. usually several megabytes), the client browser (through active studio) may request a much smaller subset of the recordset. However, since there is no guarantee that subsequent user requests will be sequential, the report cache is optimized for random access. For example, a recordset of over 1 million rows is forwarded from the active data cache to the report cache, along with a steady stream of changelists. Rows 1-100 are, in turn, forwarded to active studio on the user's device. The user then scrolls down, or moves to another page, and wishes to receive rows 1134-1233, followed by 8455-8554, and then 20-119. Without the use of a report cache, the active data cache would have to provide the rows. However, since active data cache is optimized for a forward moving cursor, and not random access, non- sequential row requests would be inefficient or impossible. Instead, the active data cache would have to keep all produced viewsets in memory to allow random access to them, potentially overwhelming the limited storage capability of the active data cache and its ability to process new active data.

The report cache is further optimized through the use of memory-mapped files. In one embodiment, memory-mapped files allow the report cache to map and access smaller portions of the recordset into memory as needed, without having to read the entire file into memory first. That is, when the report cache needs to access a set of rows in a recordset, a specific range of memory addresses are requested from the operating system, similar to accessing a byte array in memory. The operating system, in turn, automatically brings the appropriate pages from the hard drive, and maps them onto its memory space for efficient and rapid access by the report cache.

Figure 26:
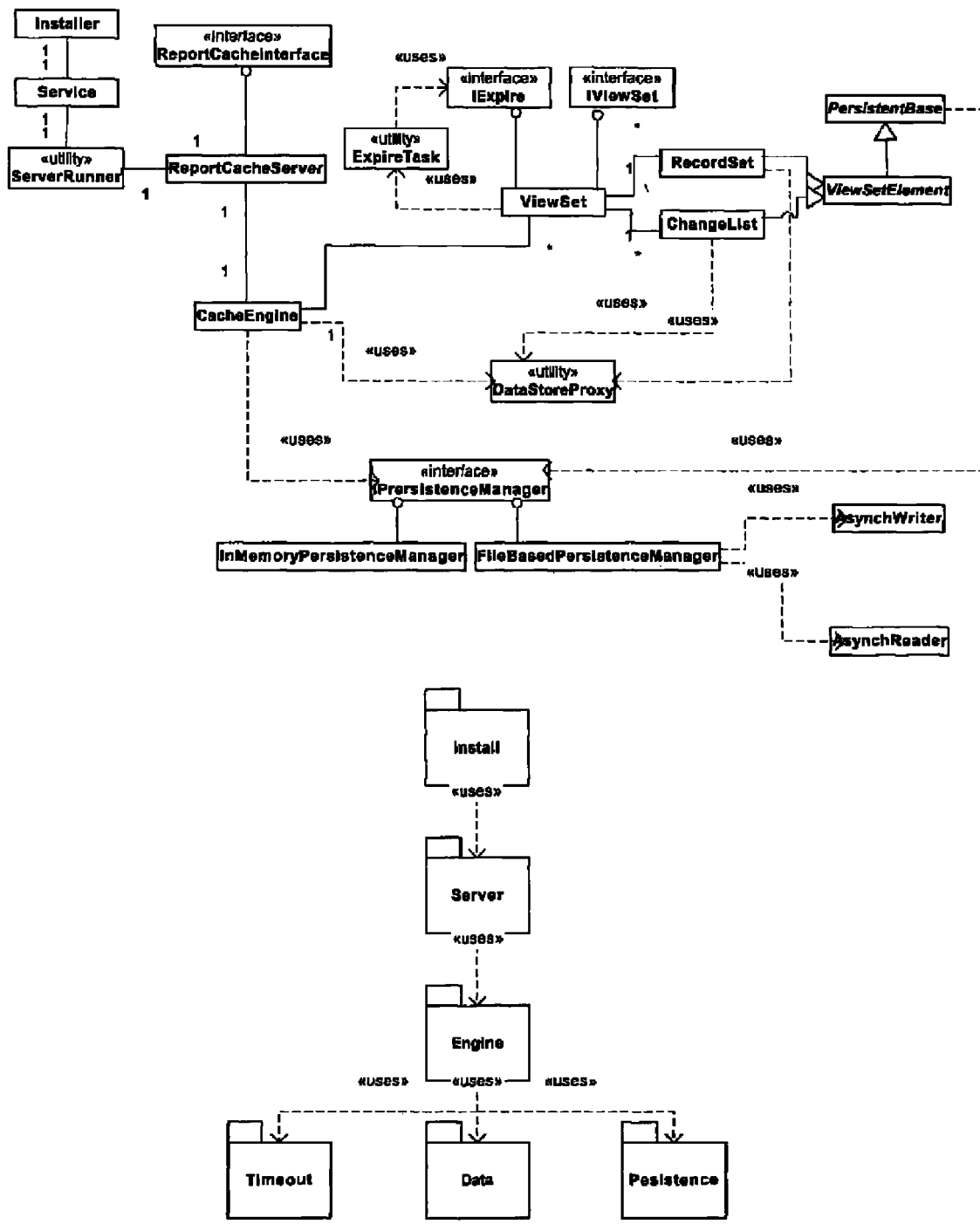

In another embodiment, asynchronous I/O is used for hard drive access. In common synchronous I/O, a process thread within an application must wait until a hard drive access is completed, in order to be informed of the success or failure of the operation. The execution of the process is blocked while it waits to be notified by the operating system. In a non-obvious fashion, processes within the report cache can initiate transfers to the hard drive using asynchronous I/O and still continue to execute. Instead of being blocked, the operating system notifies report cache once the transfer is complete. Non-blocking operations allow the report cache to continue to process other reads and writes to other memory-mapped files, further optimizing performance. Referring now to FIG. 26, a simplified UML class diagram is shown of software classes that comprise the report cache application, according to one embodiment of the invention.

In another embodiment, the file management system, combines read and writes in order to reduce disk access overhead which can be substantial (e.g., a single hard drive access can be over a million times slower than access to memory). In another embodiment, the physical files are of a fixed size. As active data is discarded and replaced, the same physical files are used, subsequently reducing external fragmentation on the hard drive. That is, the data would be stored in a substantially contiguous sequence of bits on the hard drive, instead of a set of non-contiguous linked fragments. Fragmentation can slow data access over time, as each fragment of a file must be accessed for the entire file to be read in.

While this invention has been described in terms of several preferred embodiments, there are alterations, permutations, and equivalents which fall within the scope of this invention. For example, although reference is given to Sagent Business Intelligence Solutions, it should be understood that the invention can also integrate with other business intelligence and ETL solutions. It should also be noted that there are many alternative ways of implementing the apparatuses of the present invention. It is therefore intended that the following appended claims be interpreted as including all such alterations, permutations, and equivalents as fall within the true spirit and scope of the present invention.

Advantages of the invention include optimizing the presence-aware delivery of relevant information a device in a timely manner, and rendered in a dynamic format. Additional advantages include the continuous extraction of information from data sources without the need for manual queries, or the need of additional user training.

Having disclosed exemplary embodiments and the best mode, modifications and variations may be made to the disclosed embodiments while remaining within the subject and spirit of the invention as defined by the following claims.

What is claimed is:

1. In a network including a first device coupled to a client device, said first device including a first cache and a second cache, a method of optimizing delivery of a set of data elements from said first device to said client device, the method comprising:
- retrieving from a data source within the network said set of data elements, including a first subset of said set of data elements, a second subset of said set of data elements, and a third subset of said set of data elements;
- caching in the first cache the retrieved set of data elements, the first cache being optimized for sequential access;
- determining a plurality of viewsets based on the retrieved set of data elements, wherein at least one viewset of the plurality of viewsets includes a changelist representing a change to a data element;
- transferring said first subset of said set of data elements to said client device;
- determining whether the second cache contains the plurality of viewsets;
- providing the plurality of viewsets from the first cache to the second cache if the second cache does not contain the plurality of viewsets;
- caching the plurality of viewsets in the second cache, the second cache being optimized for non-sequential access;
- receiving a request from said client device for a fourth subset of said set of data elements, in response to receiving the request:
  - selectively retrieving from said second cache a viewset of the plurality of viewsets corresponding to the fourth subset of said set of data elements, wherein said fourth subset is comprised of non-sequential data elements from at least two of said first subset of said set of data elements, said second subset of said set of data elements and said third subset of said set of data elements; and
  - transferring said viewset corresponding to the requested fourth subset to said client device.

2. The method of claim 1, where said client device includes a rich client.

3. The method claim 1, where said client device includes a web browser.

4. The method of claim 1, wherein said set of data elements further comprises DHTML.

5. The method of claim 1, wherein said set of data elements further comprises XML.

6. The method of claim 1, wherein said set of data elements further comprises active data.

7. The method of claim 6, wherein said active data includes datasets and viewsets.

8. The method of claim 1, wherein said network further comprises a packet network.

9. The method of claim 1, wherein said network further comprises a wireless network, and the method further comprising:
- verifying if the transfer of said viewset corresponding to the requested fourth subset to said client device has completed; and
- retransferring said viewset corresponding to the requested fourth subset if the transfer of said viewset corresponding to the requested fourth subset to said client device was not completed.

10. An apparatus for optimizing delivery of a set of data elements in a network, comprising:
- a processor for determining a plurality of viewsets based on the set of data elements, wherein at least one viewset of the plurality of viewsets includes a changelist representing a change to a data element, the processor is further configured to determine whether the plurality of viewsets is stored at a second cache;
- a first device having a first cache for storing a first subset of said set of data elements, a second subset of said set of data elements, and a third subset of said set of data elements, wherein said first subset of said set of data elements, said second subset of said set of data elements, and said third subset of said set of data elements are retrieved from a data source, and the second cache for storing the plurality of viewsets, the first cache optimized for sequential access and the second cache optimized for non-sequential access;
- a client device; and
- a network connection for coupling said first device to said client device, wherein upon request by said client device for a fourth subset of the said set of data elements, said first device selectively retrieves from said second cache a viewset of the plurality of viewsets corresponding to the fourth subset of said set of data elements, wherein said fourth subset is comprised of non-sequential data elements from at least two of said first subset of said set of data elements, said second subset of said set of data elements and said third subset of said set of data elements, the plurality of viewsets being retrieved from the first cache to the second cache if the second cache does not contain the plurality of viewsets; and said first device transfers said viewset corresponding to the requested fourth subset to said client device.

11. The apparatus of claim 10, where said client device includes a rich client.

12. The apparatus of claim 10, where said client device includes a web browser.

13. The apparatus of claim 10, wherein said set of data elements further comprises DHTML.

14. The apparatus of claim 10, wherein said set of data elements further comprises XML.

15. The apparatus of claim 10, wherein said set of data elements further comprises active data.

16. The apparatus of claim 15, wherein said active data includes datasets and viewsets.

17. The apparatus of claim 10, wherein said network further comprises a packet network.

18. The apparatus of claim 10, wherein said network further comprises a wireless network, and wherein said first device verifies if the transfer of said viewset corresponding to the requested fourth subset to said client device has completed, and said first device retransfers said viewset corresponding to the requested fourth subset if the transfer of said viewset, corresponding to the requested fourth subset, to said client device was not completed.

19. A method of optimizing delivery of a set of non-sequential data elements from a first device to a client device, the first device including a first cache and a second cache, the first device coupled to the client device in a network, the method comprising:
- receiving from a data source a set of data elements;
- caching in the first cache the received set of data elements, the first cache being optimized for sequential access;
- generating, based on the received set of data elements, a plurality of viewsets, wherein each viewset of the plurality of viewsets is a static de-normalized representation of one or more data elements of the set of data elements, and wherein at least one viewset of the plurality of viewsets includes a list of changes to a data element;
- determining whether the second cache contains the plurality of viewsets;

caching the plurality of viewsets in the second cache, the plurality of viewsets being retrieved from the first cache to the second cache if the second cache does not contain the plurality of viewsets, the second cache being optimized for non-sequential access;

receiving a request from the client device for the set of non-sequential data elements, in response to receiving the request:

selectively retrieving from the second cache a viewset of the plurality of viewsets corresponding to the set of non-sequential data elements; and transferring the viewset corresponding to the set of non-sequential data elements to said client device.

* * * * *

UNITED STATES PATENT AND TRADEMARK OFFICE
CERTIFICATE OF CORRECTION

| | | |
|---|---|---|
| PATENT NO. | : 7,899,879 B2 | Page 1 of 1 |
| APPLICATION NO. | : 10/391544 | |
| DATED | : March 1, 2011 | |
| INVENTOR(S) | : Broda | |

It is certified that error appears in the above-identified patent and that said Letters Patent is hereby corrected as shown below:

On page 4, in column 2, under "Other Publications", line 42, delete "Nerwork" and insert -- Network --, therefor.

On page 4, in column 2, under "Other Publications", line 47, before ""Sametime" delete "Ff".

In the drawings:
On sheet 10 of 45, in figure 5, Reference Numeral 530, line 6, Delete "BULDER" and insert -- BUILDER --, therefor.

In column 6, line 38, delete "he" and insert -- the --, therefor.

In column 8, line 16, delete ""busy"status," and insert -- "busy" status, --, therefor.

In column 11, line 43, delete "ajava" and insert -- a java --, therefor.

In column 15, line 34, delete "c-commerce" and insert -- e-commerce --, therefor.

In column 15, line 42, delete "mater" and insert -- matter --, therefor.

In column 16, line 45, delete "on" and insert -- one --, therefor.

In column 25, line 16, delete "WSYIWIG" and insert -- WYSIWYG --, therefor.

In column 28, line 52, delete "button.1742." and insert -- button 1742. --, therefor.

Signed and Sealed this
Eleventh Day of October, 2011

David J. Kappos
*Director of the United States Patent and Trademark Office*